March 2, 1965 W. F. BARTLETT ETAL 3,171,896

TIME DIVISION MULTIPLEX COMMUNICATION SYSTEM CONFERENCE CIRCUIT

Filed July 26, 1960 23 Sheets-Sheet 1

INVENTORS.
WILLIAM F. BARTLETT
BARRIE BRIGHTMAN

BY F. H. Henson

ATTORNEY

TIME DIVISION MULTIPLEX COMMUNICATION SYSTEM CONFERENCE CIRCUIT

Filed July 26, 1960 23 Sheets-Sheet 3

CALLING LINE STORE-122

March 2, 1965 W. F. BARTLETT ETAL 3,171,896

TIME DIVISION MULTIPLEX COMMUNICATION SYSTEM CONFERENCE CIRCUIT

Filed July 26, 1960

23 Sheets-Sheet 4

CALLING LINE STORE-122

March 2, 1965 W. F. BARTLETT ETAL 3,171,896

TIME DIVISION MULTIPLEX COMMUNICATION SYSTEM CONFERENCE CIRCUIT

Filed July 26, 1960 23 Sheets-Sheet 5

FIG.5 CALLING LINE AND TRUNK MATRIX-124

TIME DIVISION MULTIPLEX COMMUNICATION SYSTEM CONFERENCE CIRCUIT

Filed July 26, 1960 23 Sheets-Sheet 7

FIG. 7 TERMINATING LINE STORE-128

TERMINATING LINE STORE-128

TERMINATING LINE AND TRUNK MATRIX-130

March 2, 1965 W. F. BARTLETT ETAL 3,171,896

TIME DIVISION MULTIPLEX COMMUNICATION SYSTEM CONFERENCE CIRCUIT

Filed July 26, 1960 23 Sheets-Sheet 10

TIME DIVISION MULTIPLEX COMMUNICATION SYSTEM CONFERENCE CIRCUIT

Filed July 26, 1960 23 Sheets-Sheet 13

TIME DIVISION MULTIPLEX COMMUNICATION SYSTEM CONFERENCE CIRCUIT

March 2, 1965 W. F. BARTLETT ETAL 3,171,896

TIME DIVISION MULTIPLEX COMMUNICATION SYSTEM CONFERENCE CIRCUIT

Filed July 26, 1960 23 Sheets-Sheet 16

March 2, 1965 W. F. BARTLETT ETAL 3,171,896

TIME DIVISION MULTIPLEX COMMUNICATION SYSTEM CONFERENCE CIRCUIT

Filed July 26, 1960 23 Sheets-Sheet 17

March 2, 1965 W. F. BARTLETT ETAL 3,171,896

TIME DIVISION MULTIPLEX COMMUNICATION SYSTEM CONFERENCE CIRCUIT

Filed July 26, 1960 23 Sheets-Sheet 18

ATTENDANT'S POSITION-132

TIME DIVISION MULTIPLEX COMMUNICATION SYSTEM CONFERENCE CIRCUIT

Filed July 26, 1960 23 Sheets-Sheet 23

"AND" GATE

"OR" GATE

PULSE INVERTER

PULSE INVERTER

FLIP-FLOP

DELAY LINE

HALF-ADDER

MONOSTABLE MULTIVIBRATOR

United States Patent Office 3,171,896
Patented Mar. 2, 1965

3,171,896
TIME DIVISION MULTIPLEX COMMUNICATION SYSTEM CONFERENCE CIRCUIT

William F. Bartlett, Rochester, and Barrie Brightman, Webster, N.Y., assignors to General Dynamics Corporation, Rochester, N.Y., a corporation of Delaware Filed July 26, 1960, Ser. No. 45,341
23 Claims. (Cl. 179—18)

This invention relates to an automatic communication system and, more particularly, to an automatic communication system including new and improved means for establishing a conference circuit.

Electronic switching systems, such as those employing crosspoint or time division multiplex techniques, provide means for quickly establishing communication paths of even great length and complexity without requiring the use of large amounts of bulky control and switching equipment. In order to integrate these electronic switching means with existing communication networks, it is desirable for the electronic switching means to provide all of the services and functions of the electromechanical switching means that are to be replaced. As an example, it is desirable that an electronic private branch exchange provide all of the services that are normally performed by the electromechanical P.B.X for which the electronic unit is to be substituted. These services frequently include such features as automatic toll accounting facilities, conference circuit facilities, and operator or attendant positions.

Accordingly, one object of the present invention is to provide a new and improved automatic communication system.

Another object is to provide an automatic communication system including new and improved conference facilities.

Another object is to provide a communication system including means controlled from a calling circuit for transferring control over a conference circuit between an operator position and the calling circuit.

A further object is to provide a conference circuit in which calling and called circuits are placed in common communication over different time positions.

Another object is to provide a conference circuit requiring a plurality of different time positions which includes means for determining the availability of the necessary number of idle time positions.

Another object is to provide an automatic communication system in which a plurality of communication circuits are connected for common communication by a signal transfer circuit that is connected to the communication circuits in different time positions.

A further object is to provide a conference circuit in which the extension of the conference circuit and the performance of the primary control and supervisory functions related thereto are controlled from the calling circuit.

Many other objects and advantages of the present invention will become apparent from the following detailed description when considered in conjunction with the drawings in which.

Figures 1, 31:
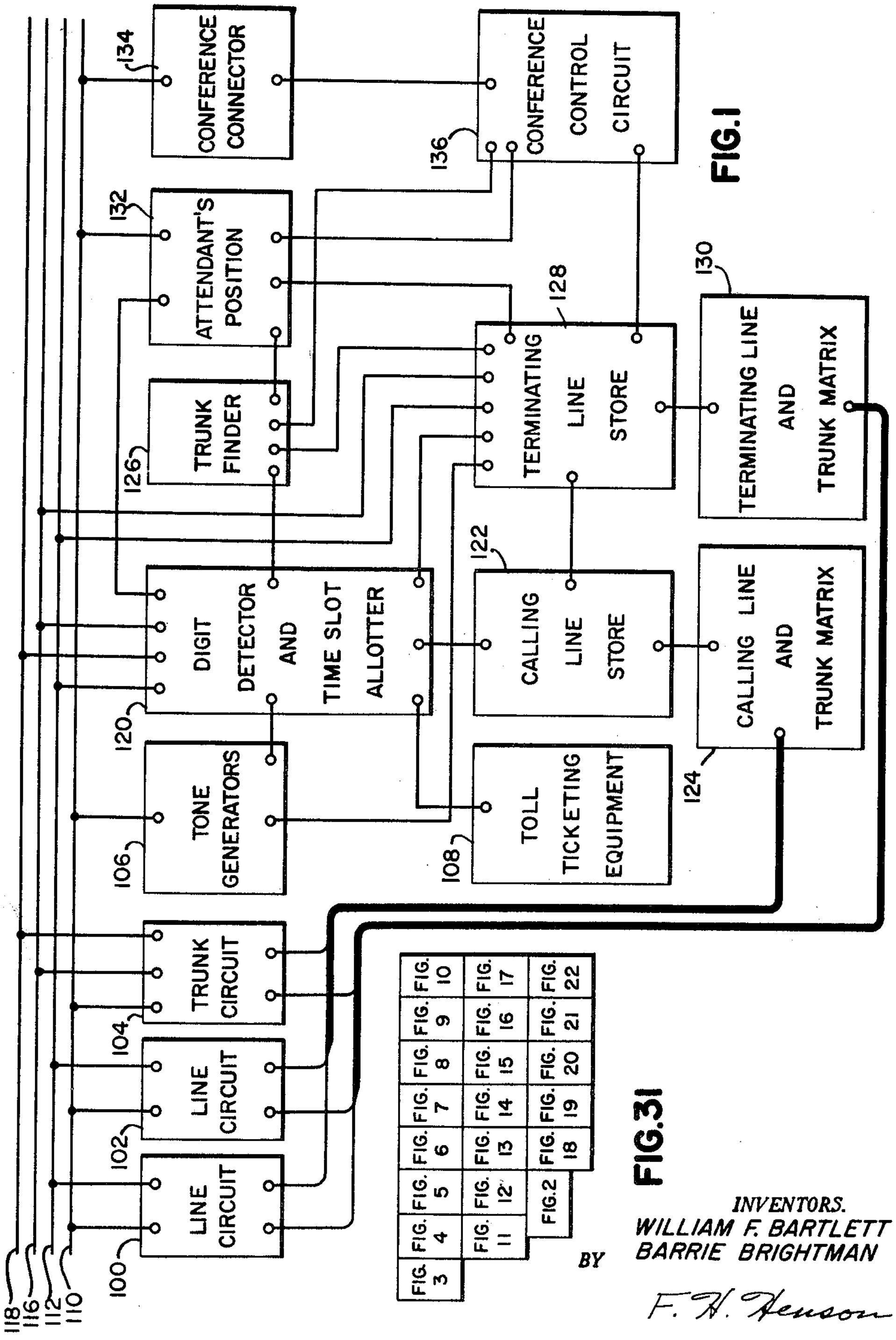
FIG. 1 is a block diagram of an automatic communication system embodying the present invention.
Figure 3:
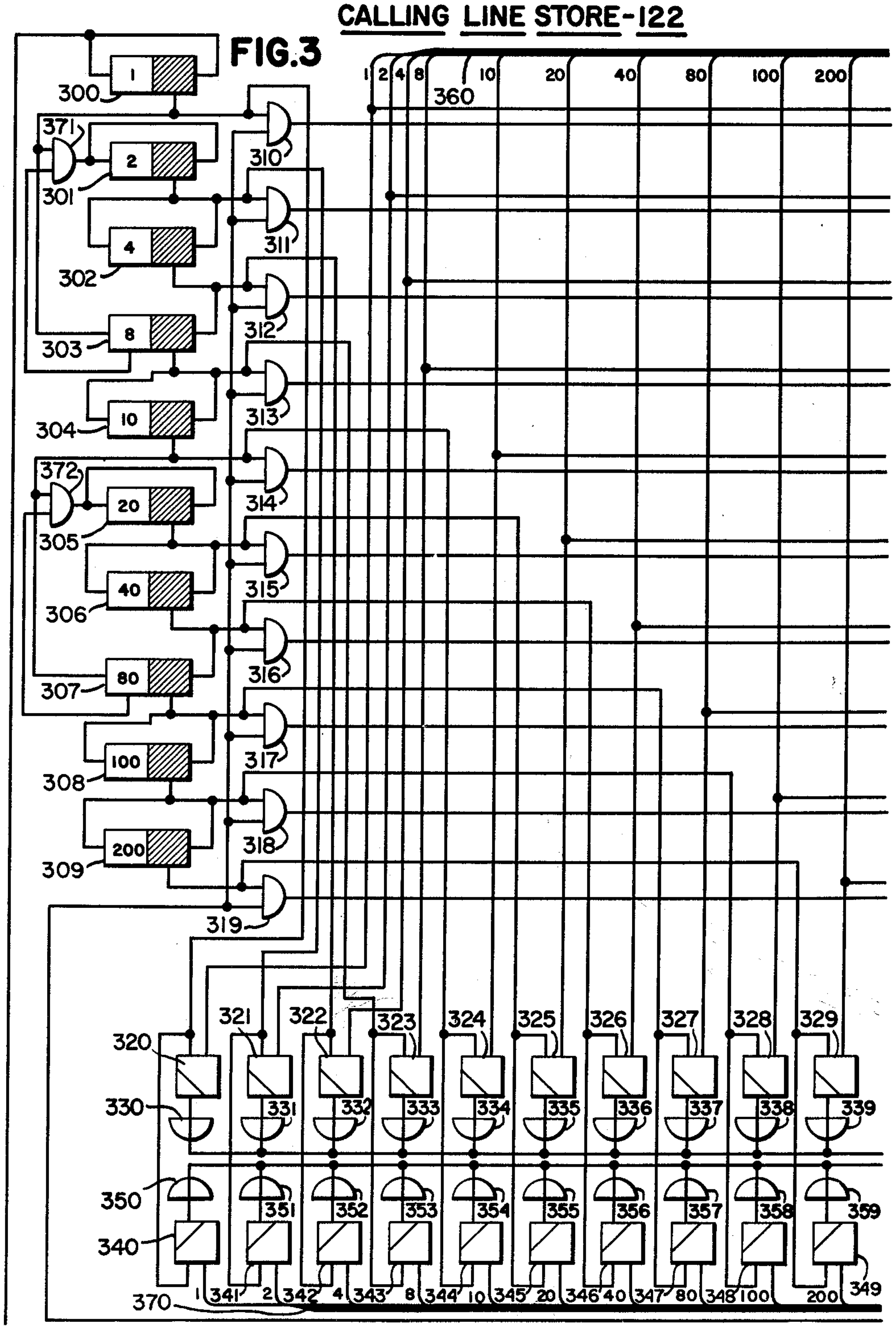
Figure 4:
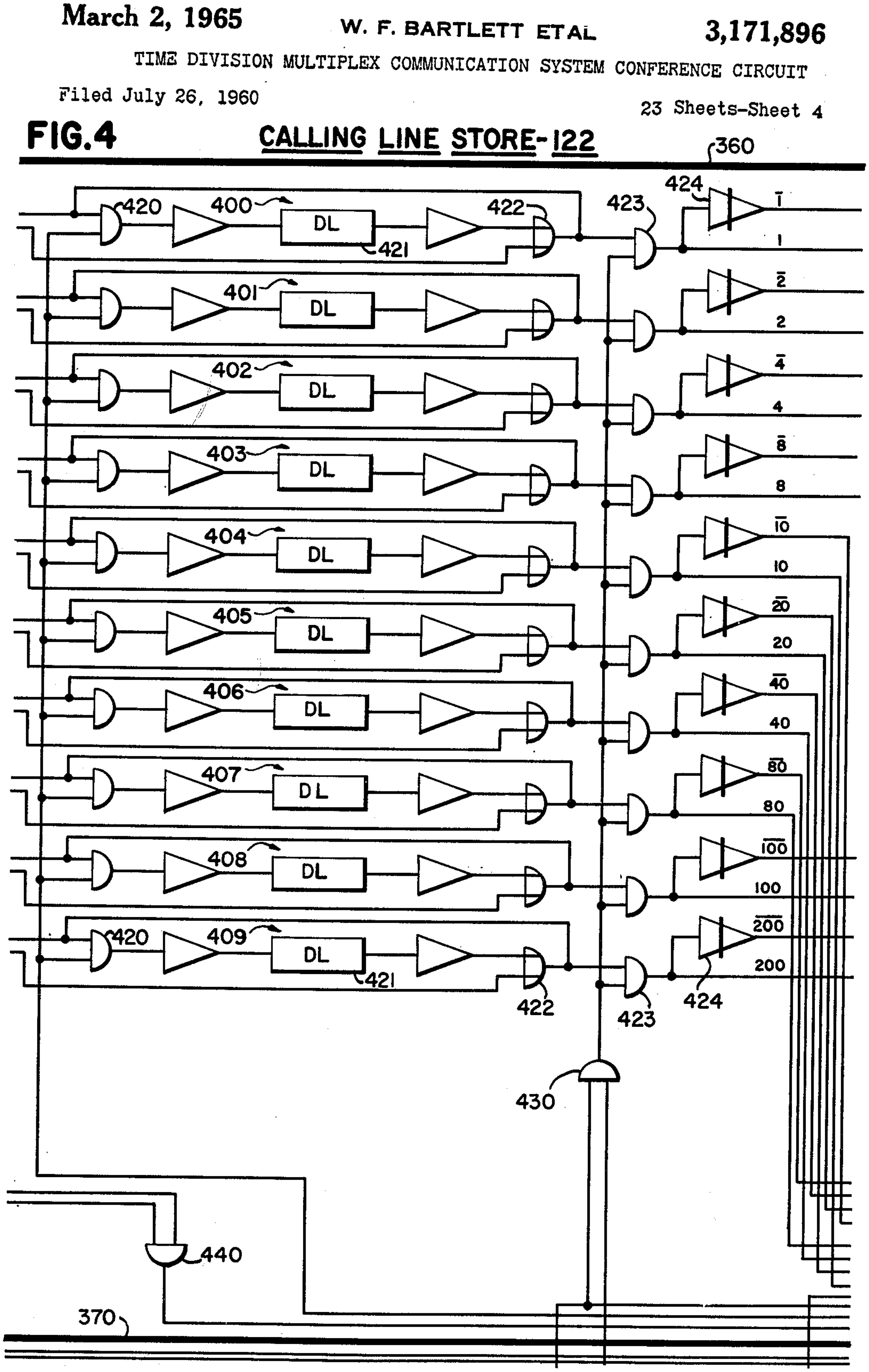
Figure 5:
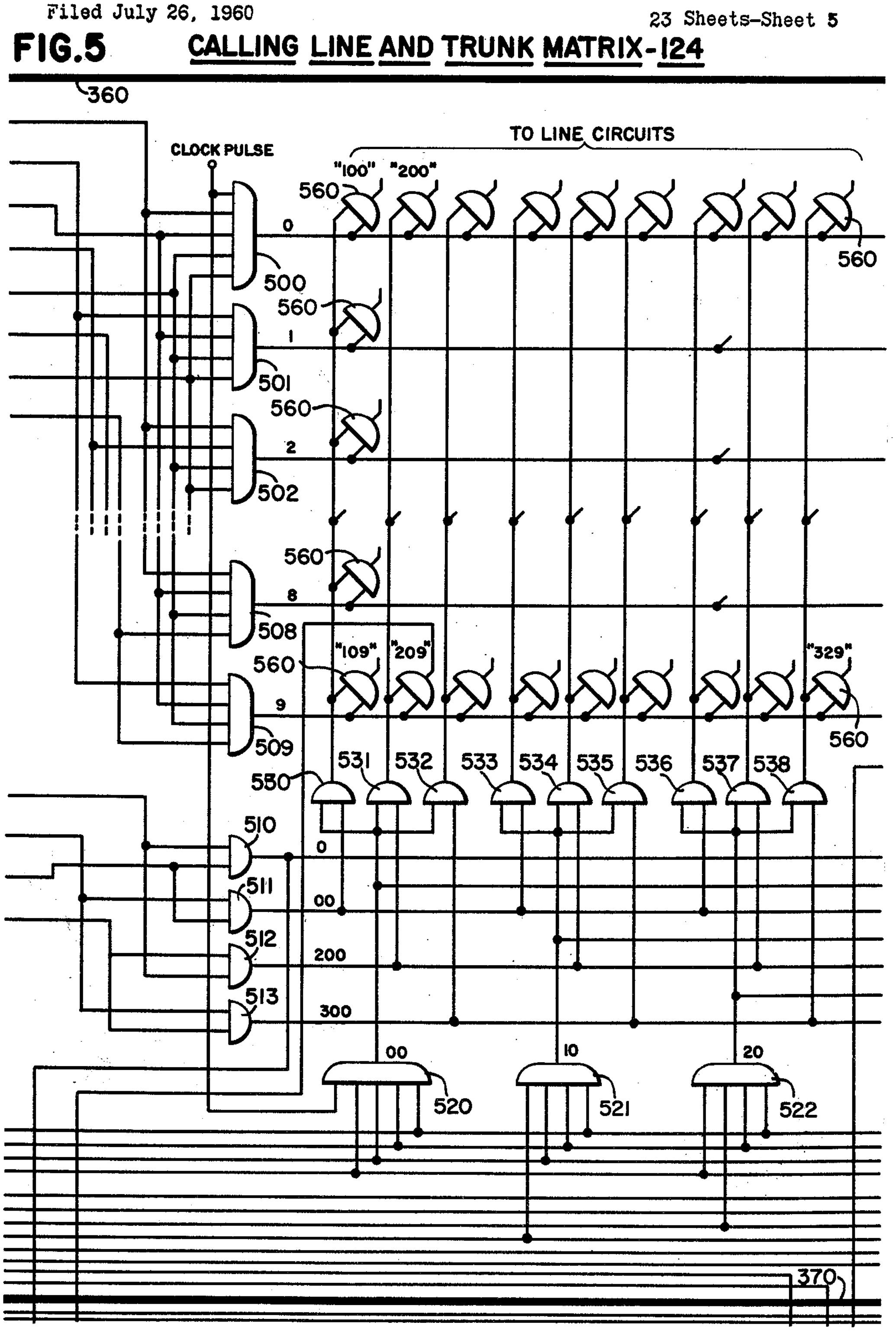
Figure 6:
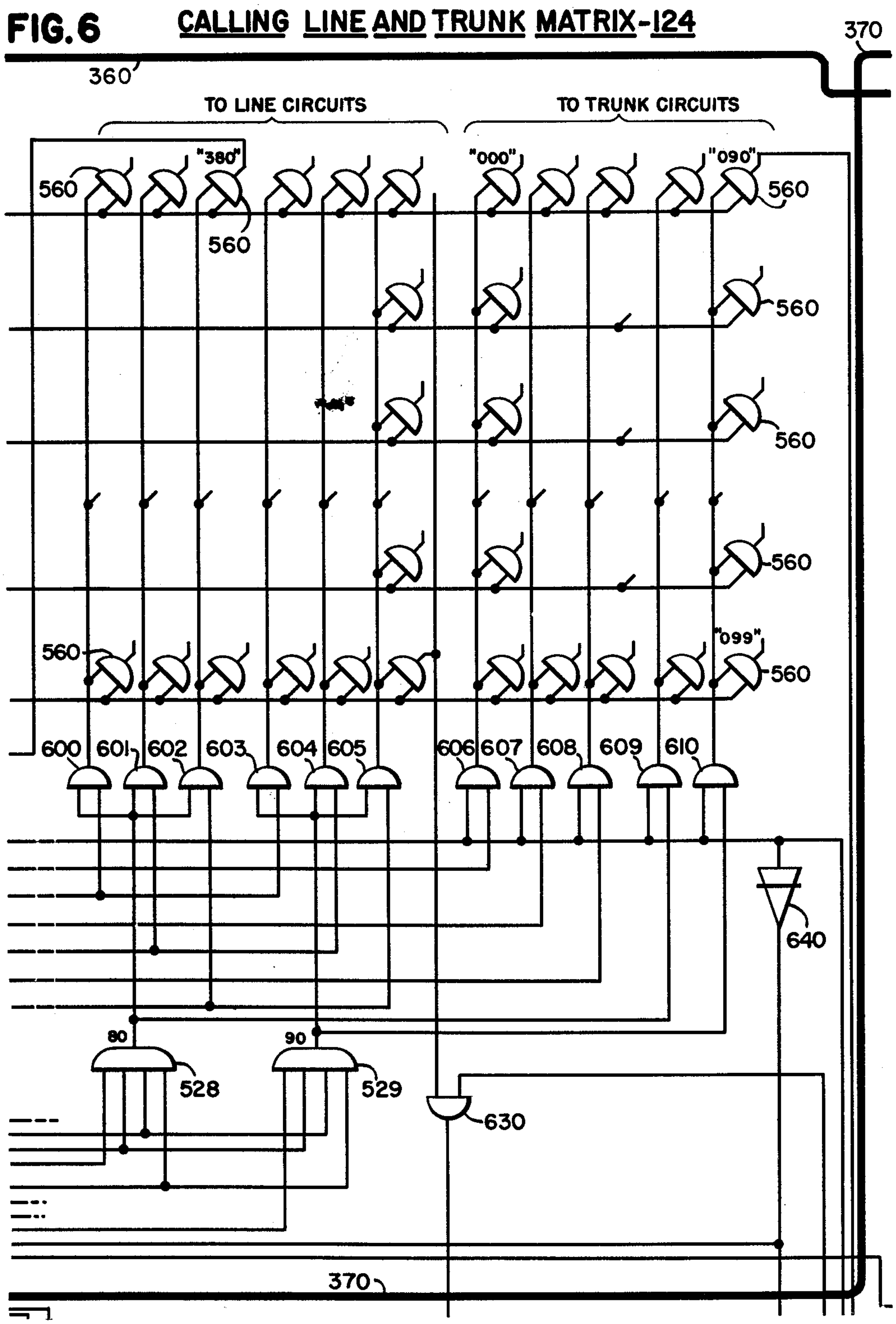
Figure 7:
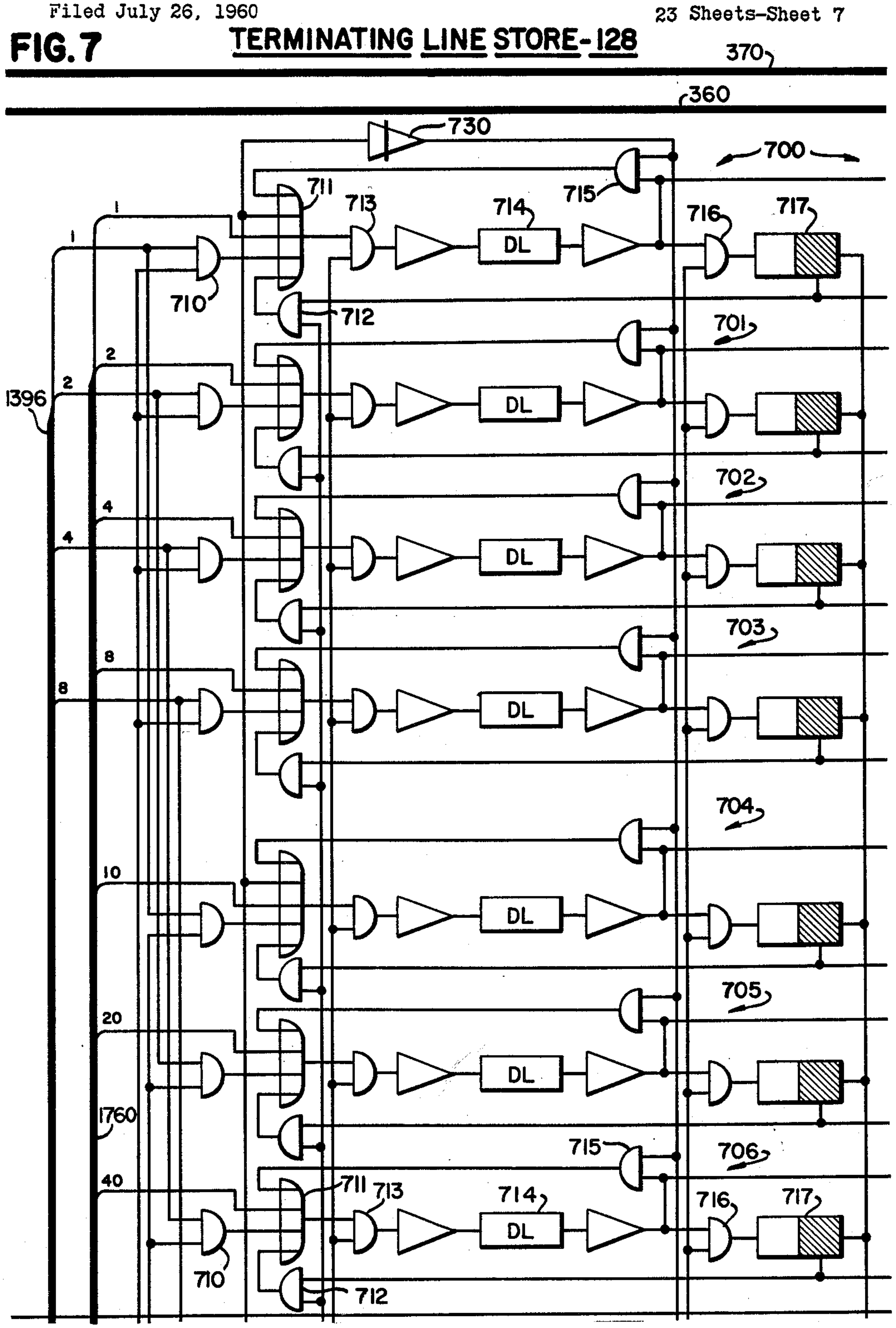
Figure 8:
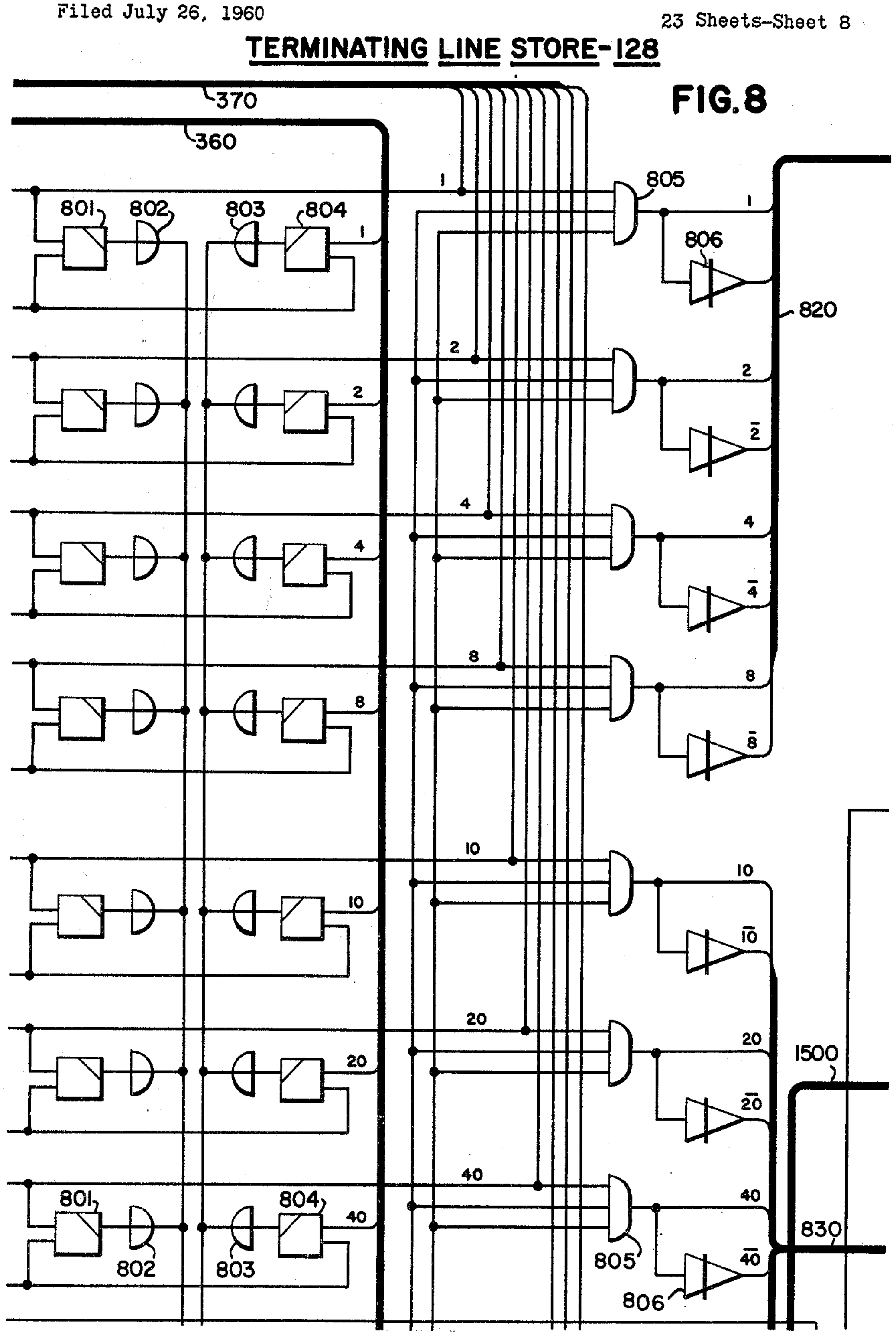
Figure 9:
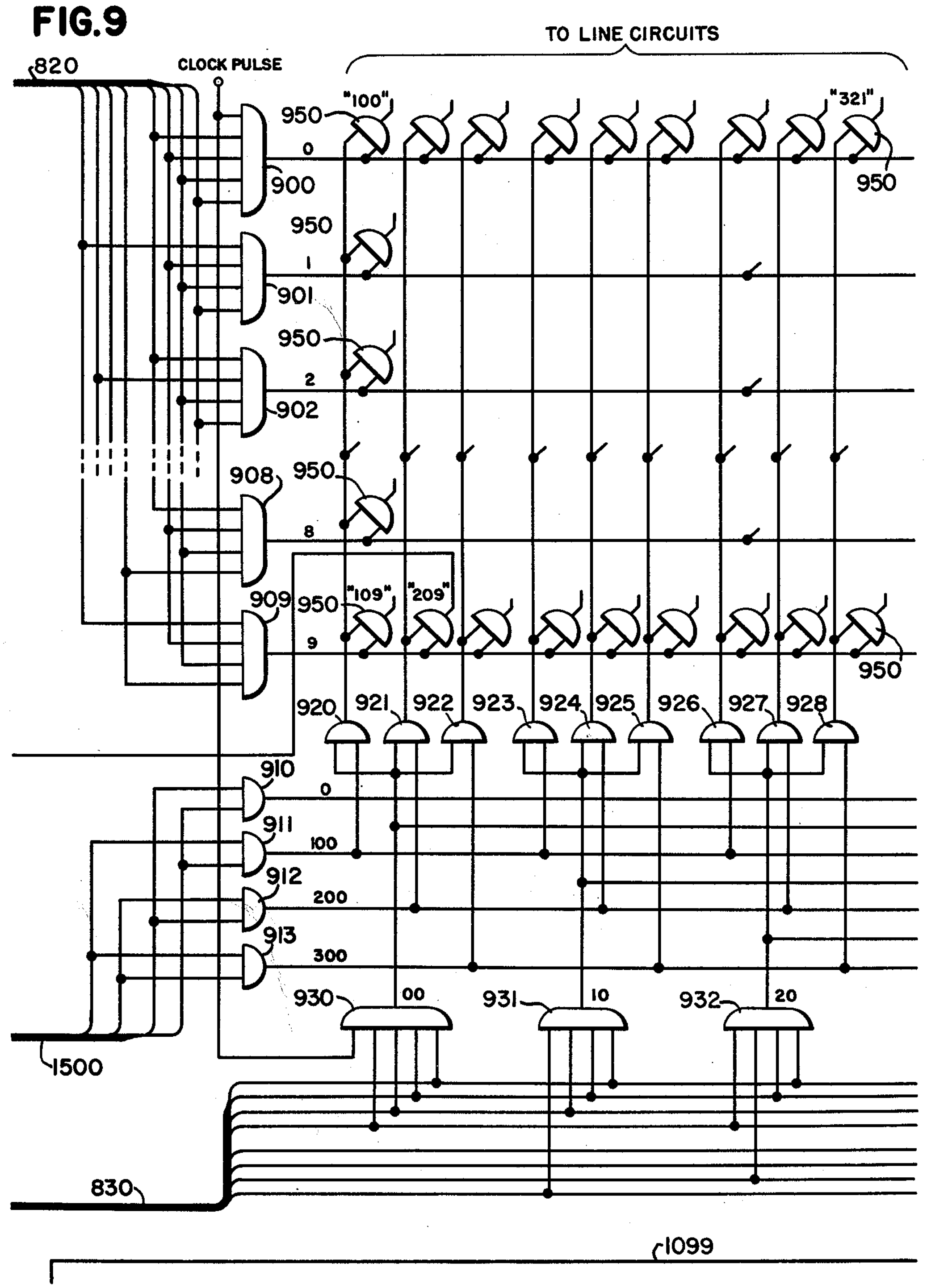
Figure 10:
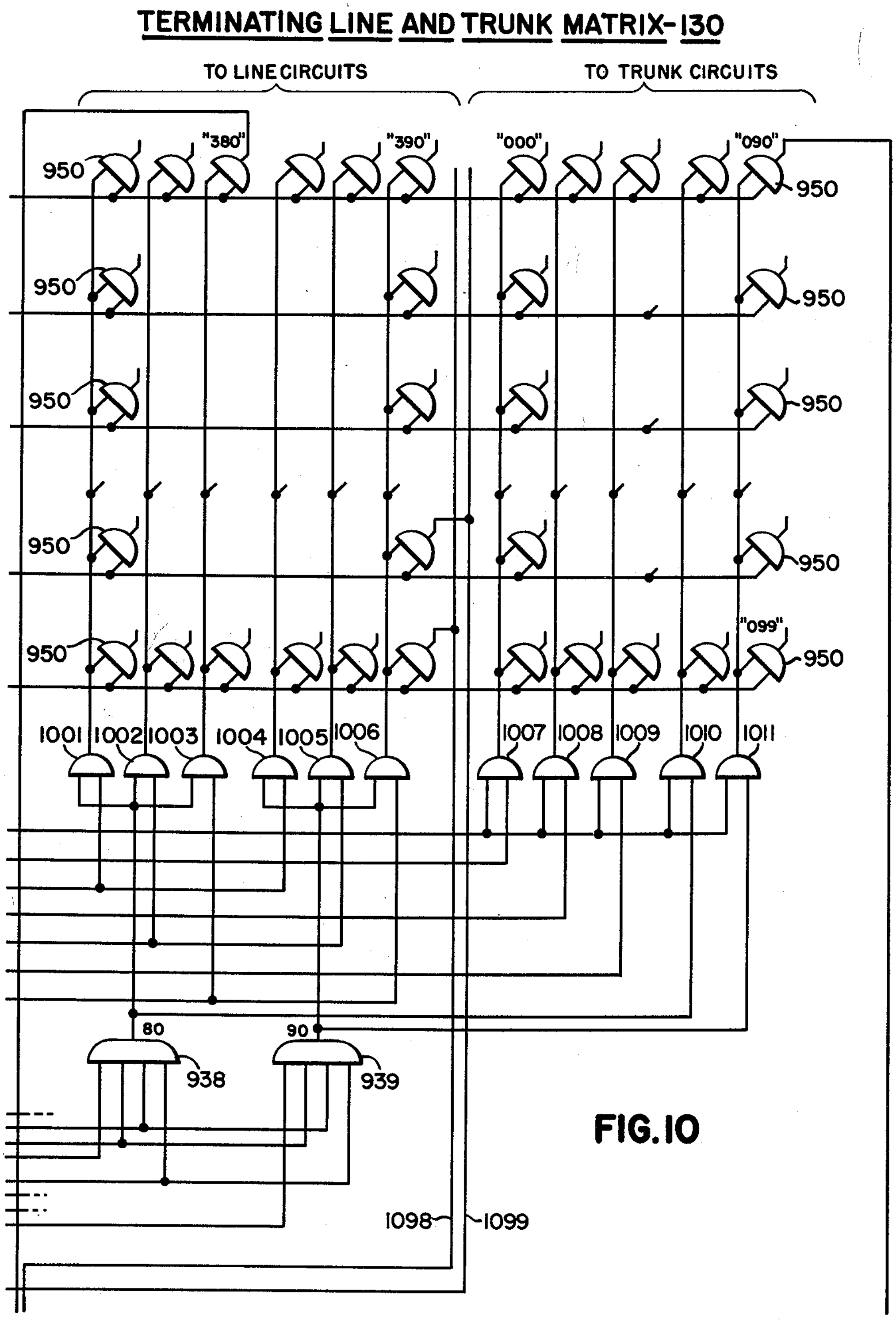
Figure 11:
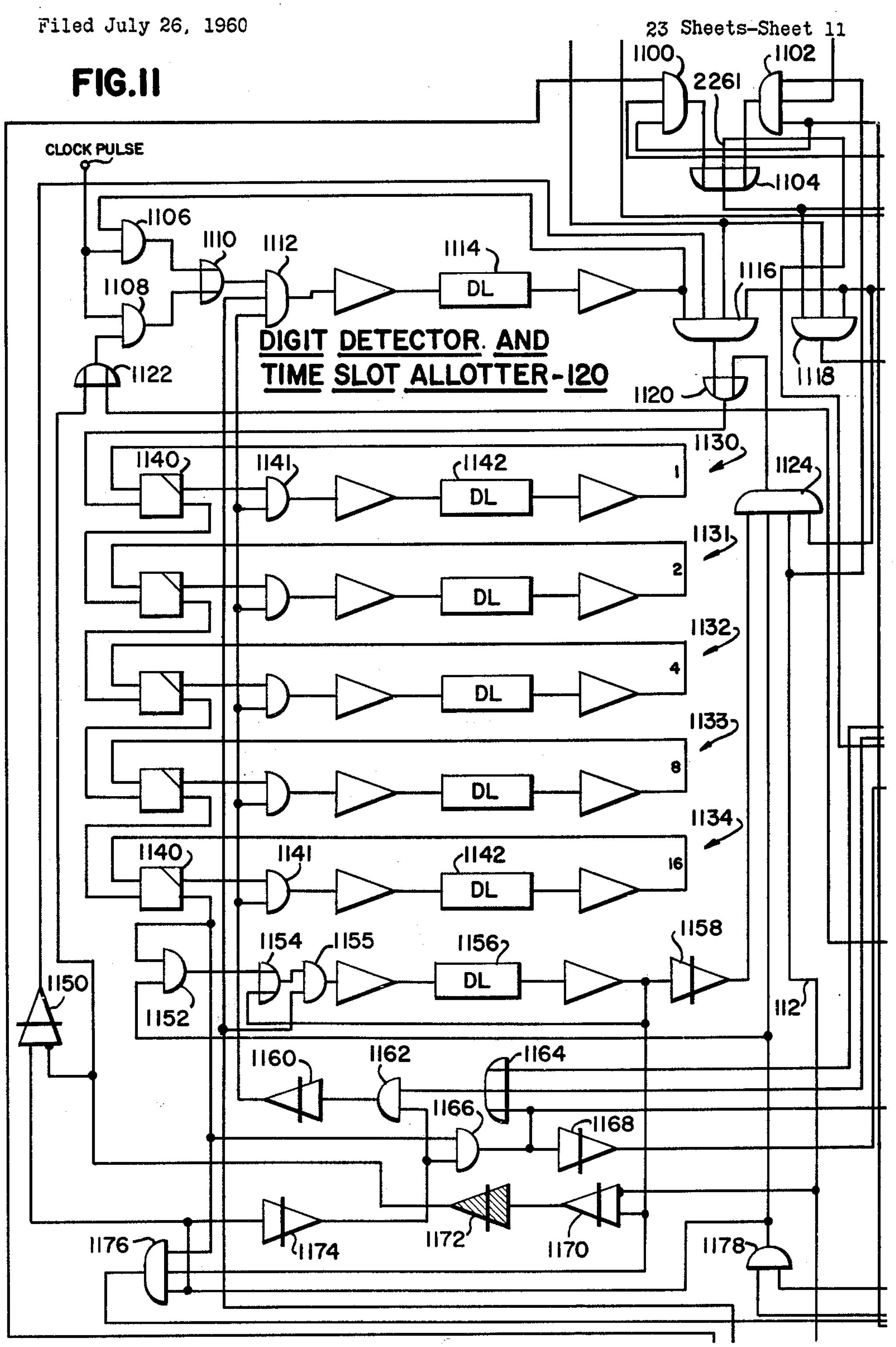
Figure 12:
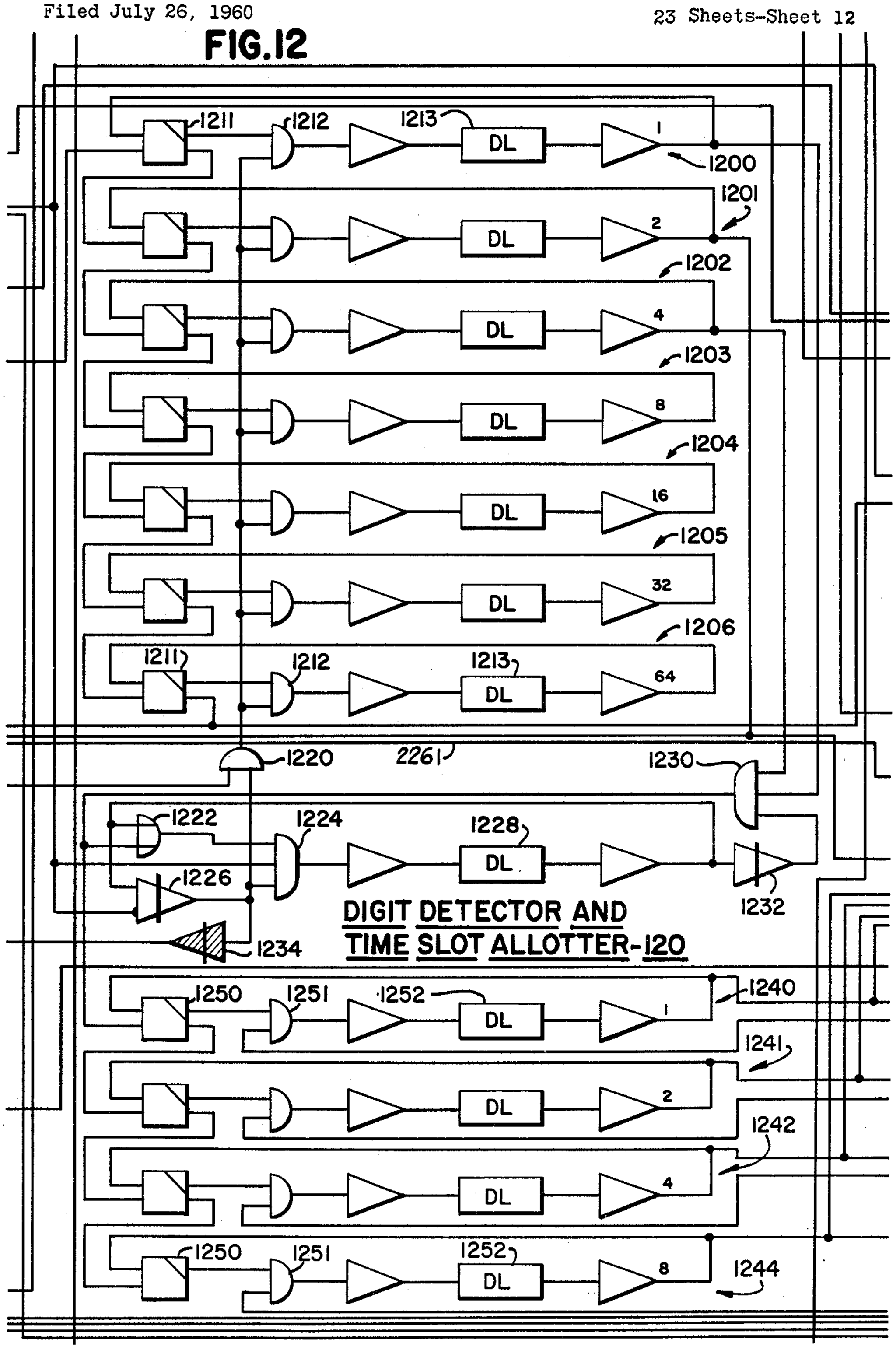
Figure 13:
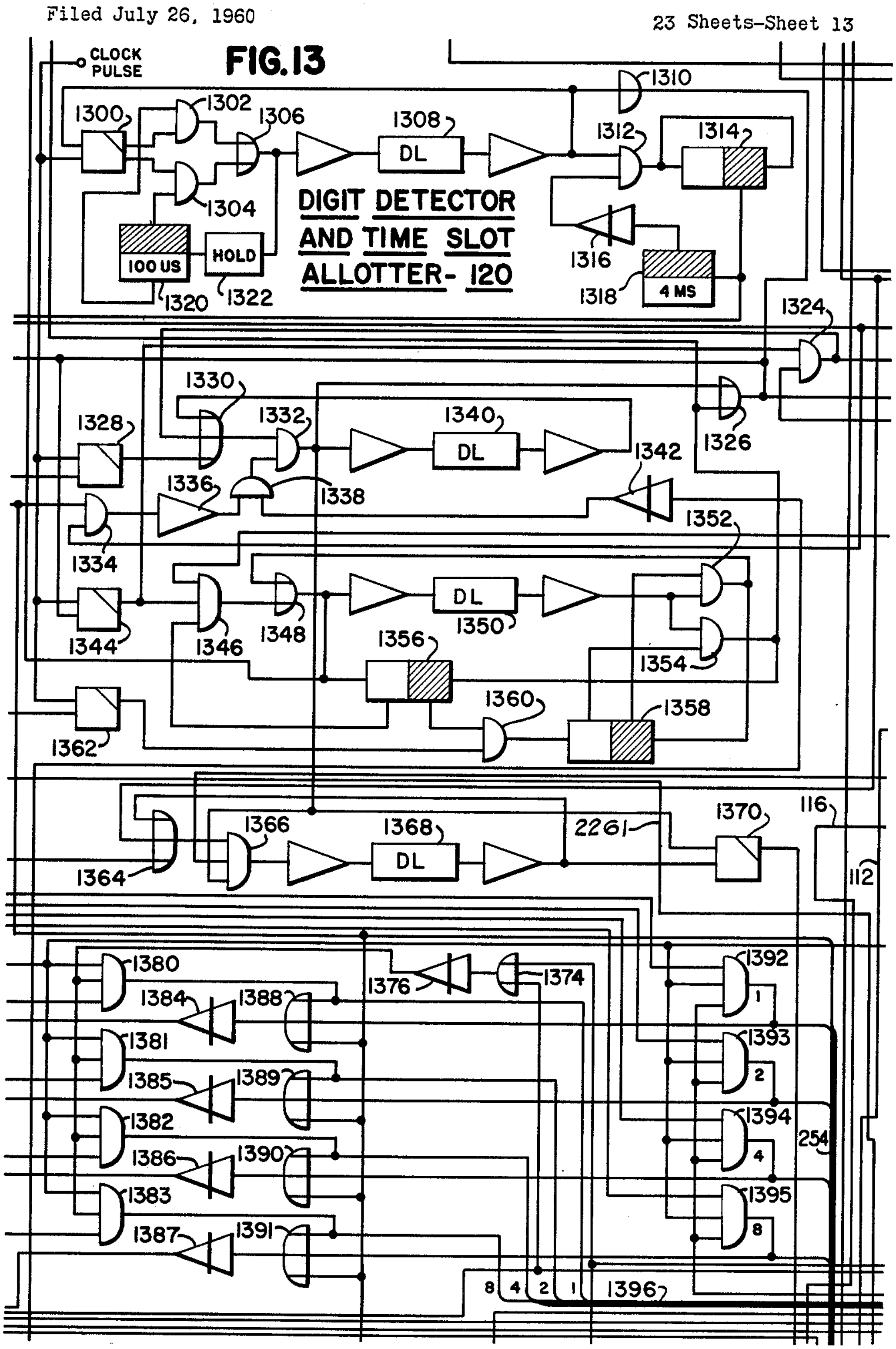
Figure 14:
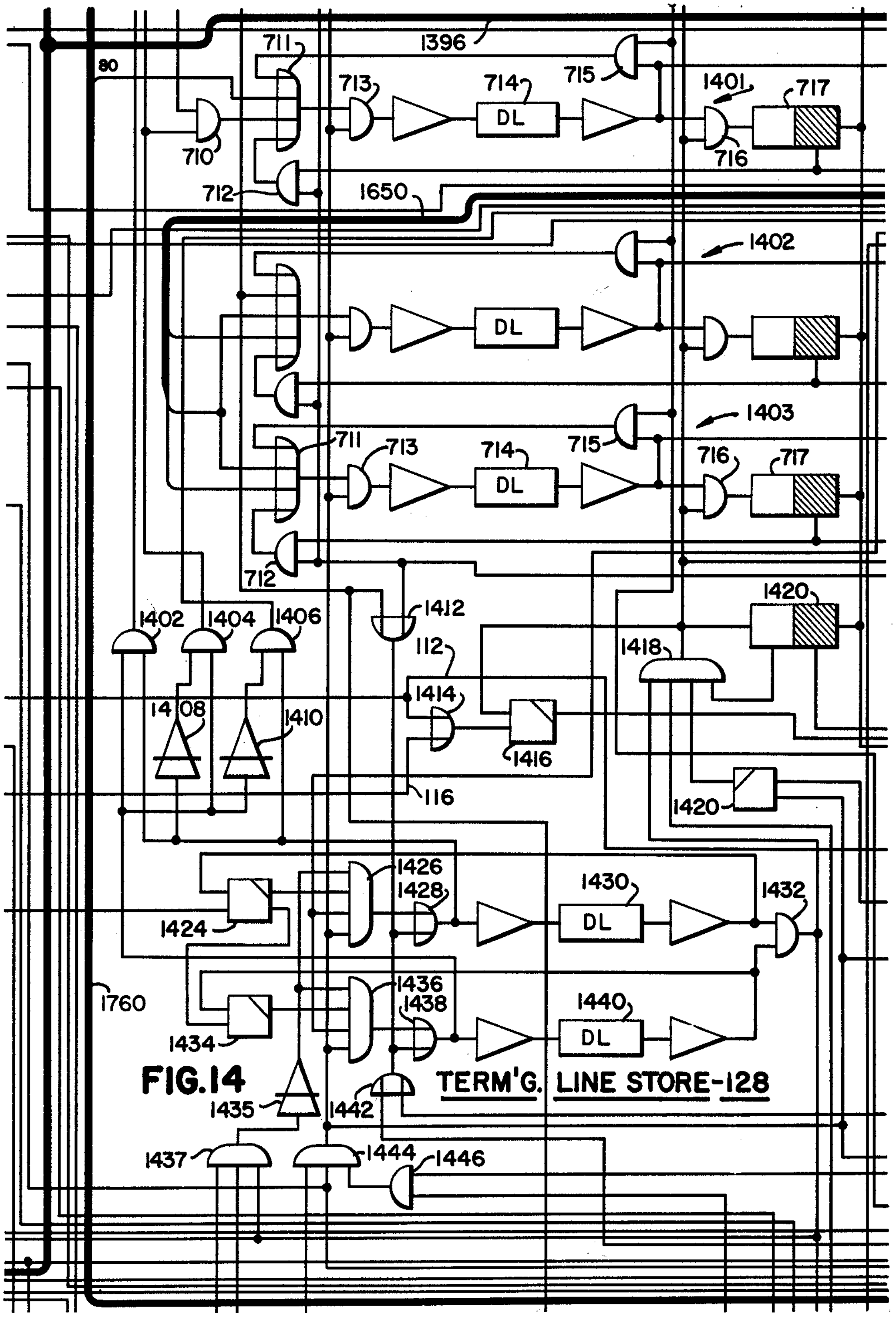
Figure 15:
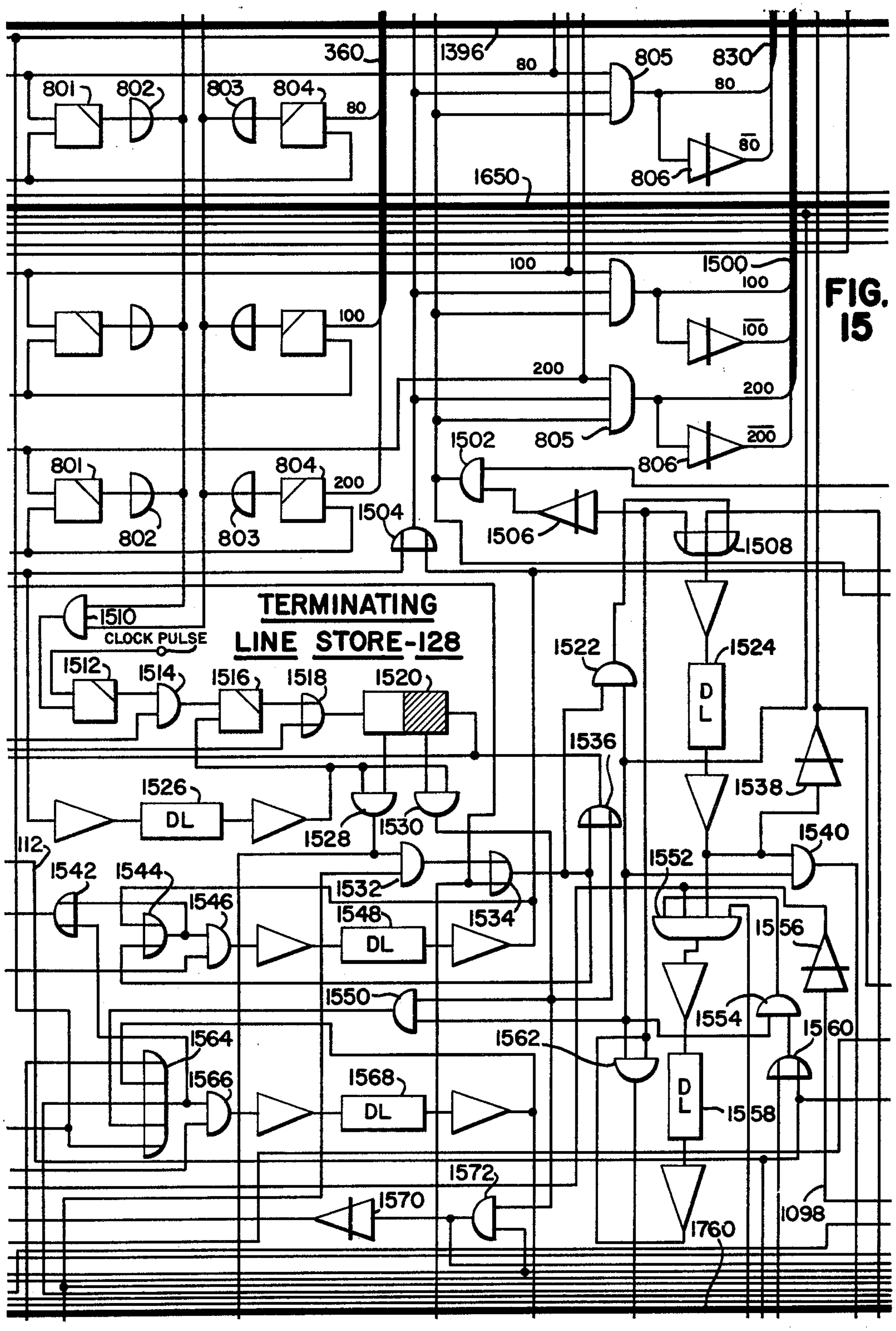
Figure 16:
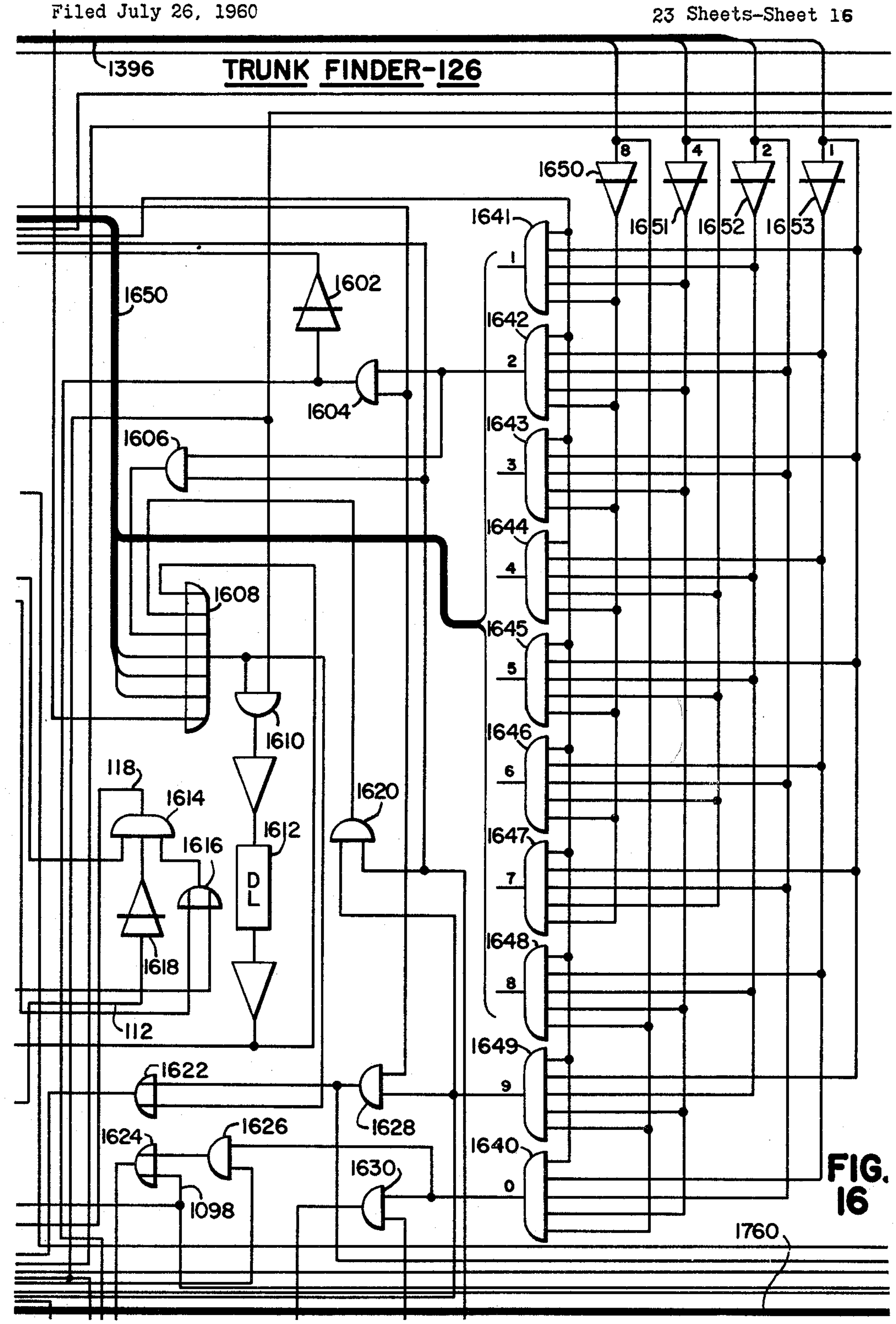
Figure 17:
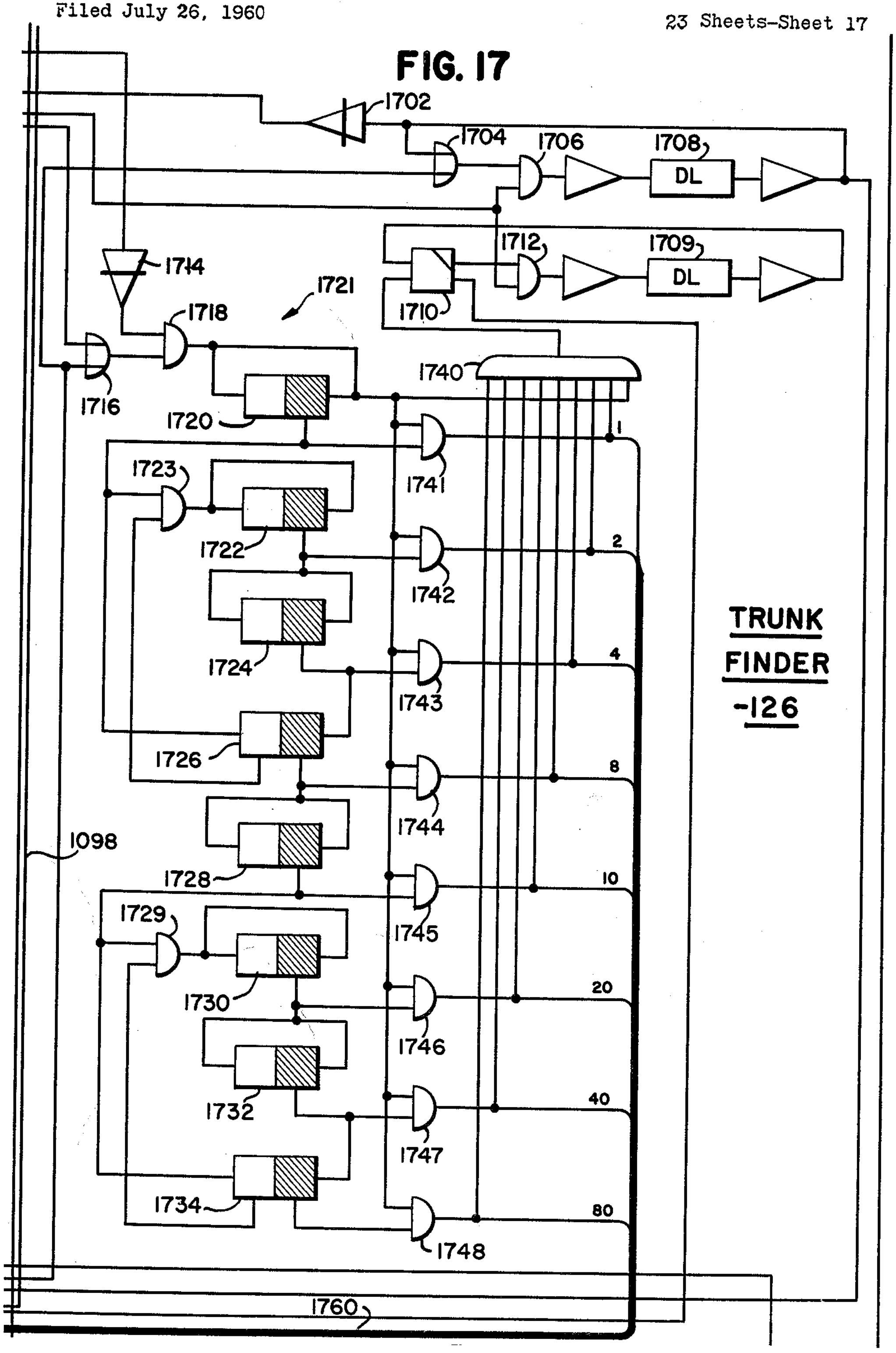
Figure 18:
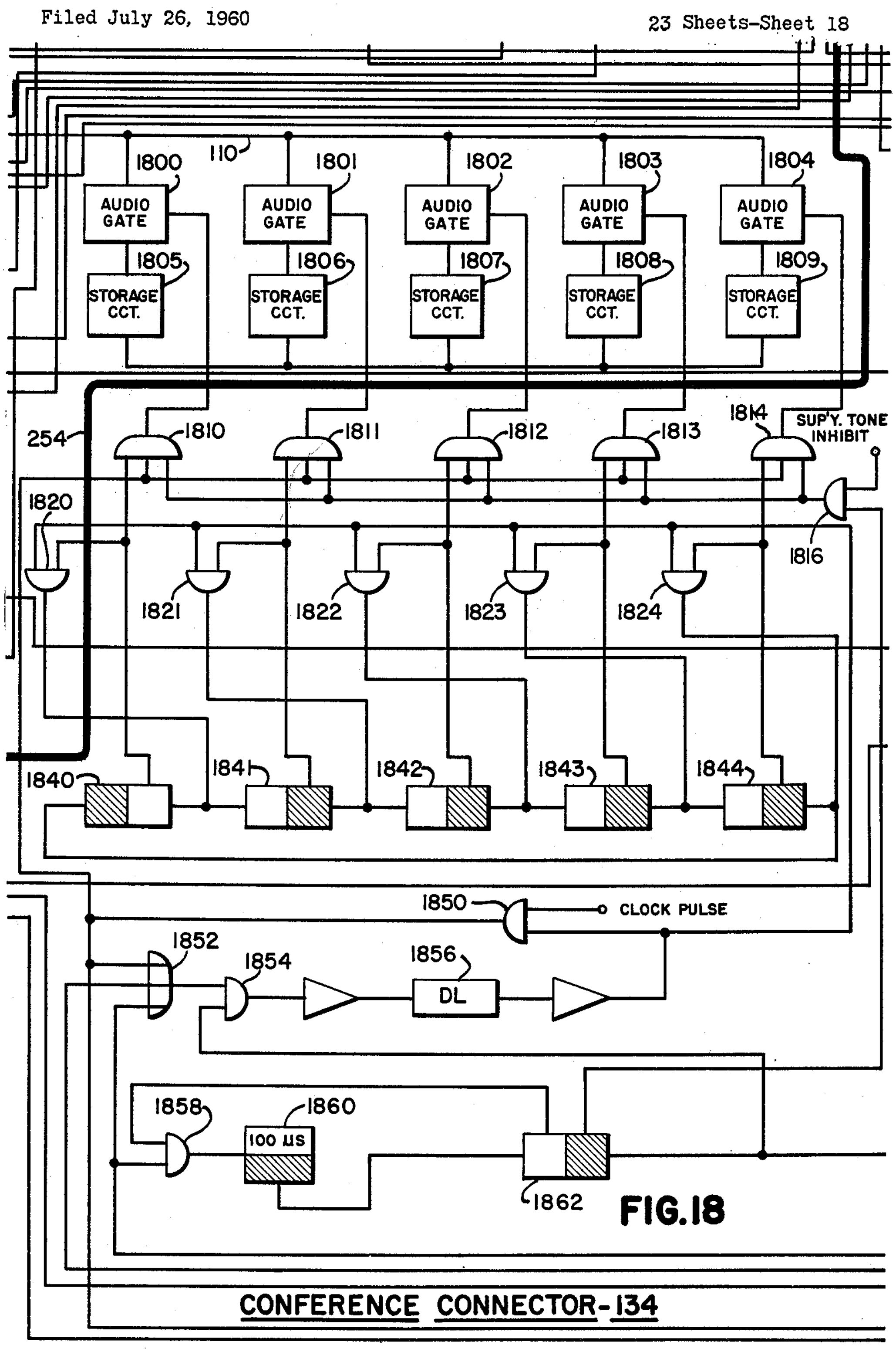
Figure 19:
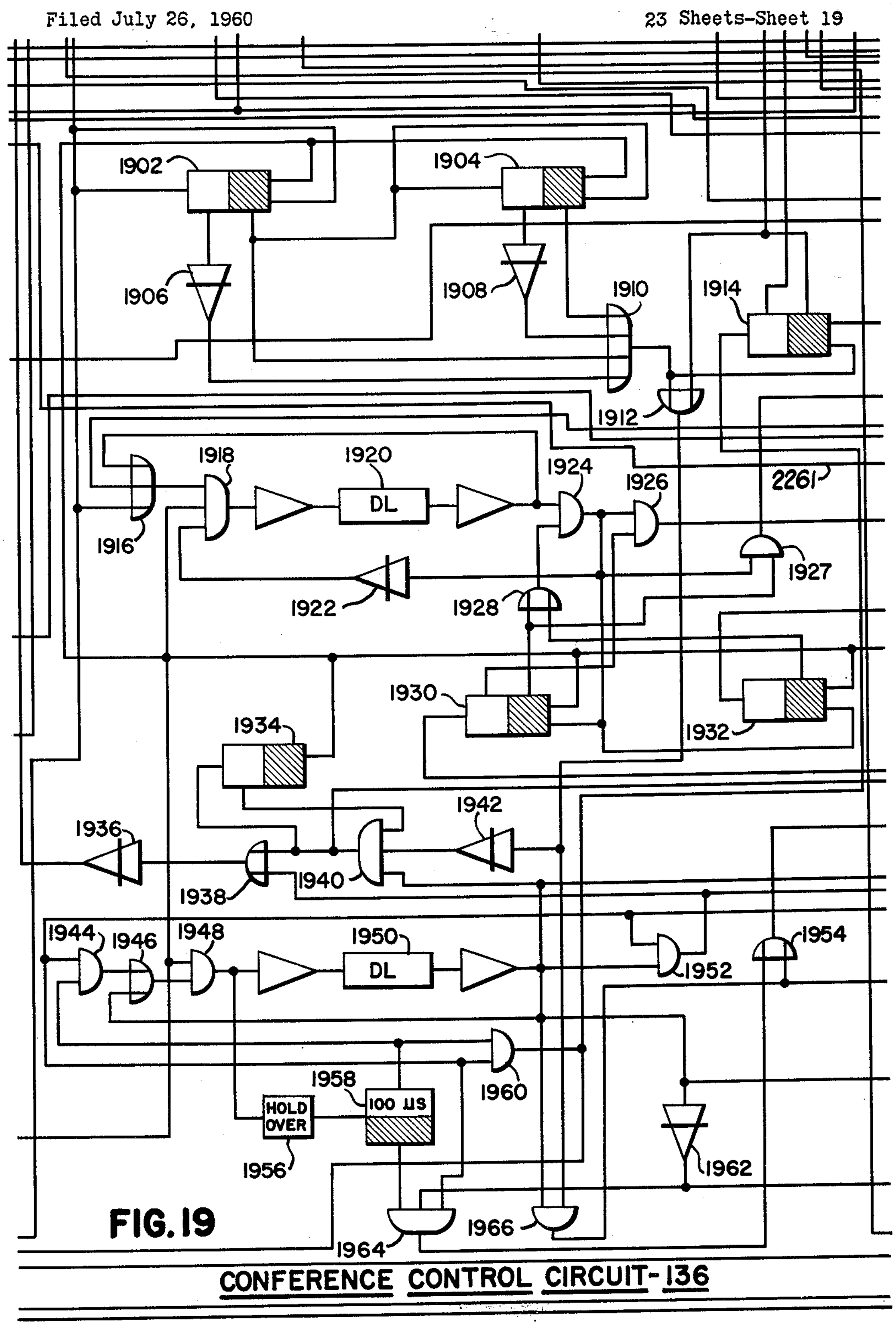
Figure 20:
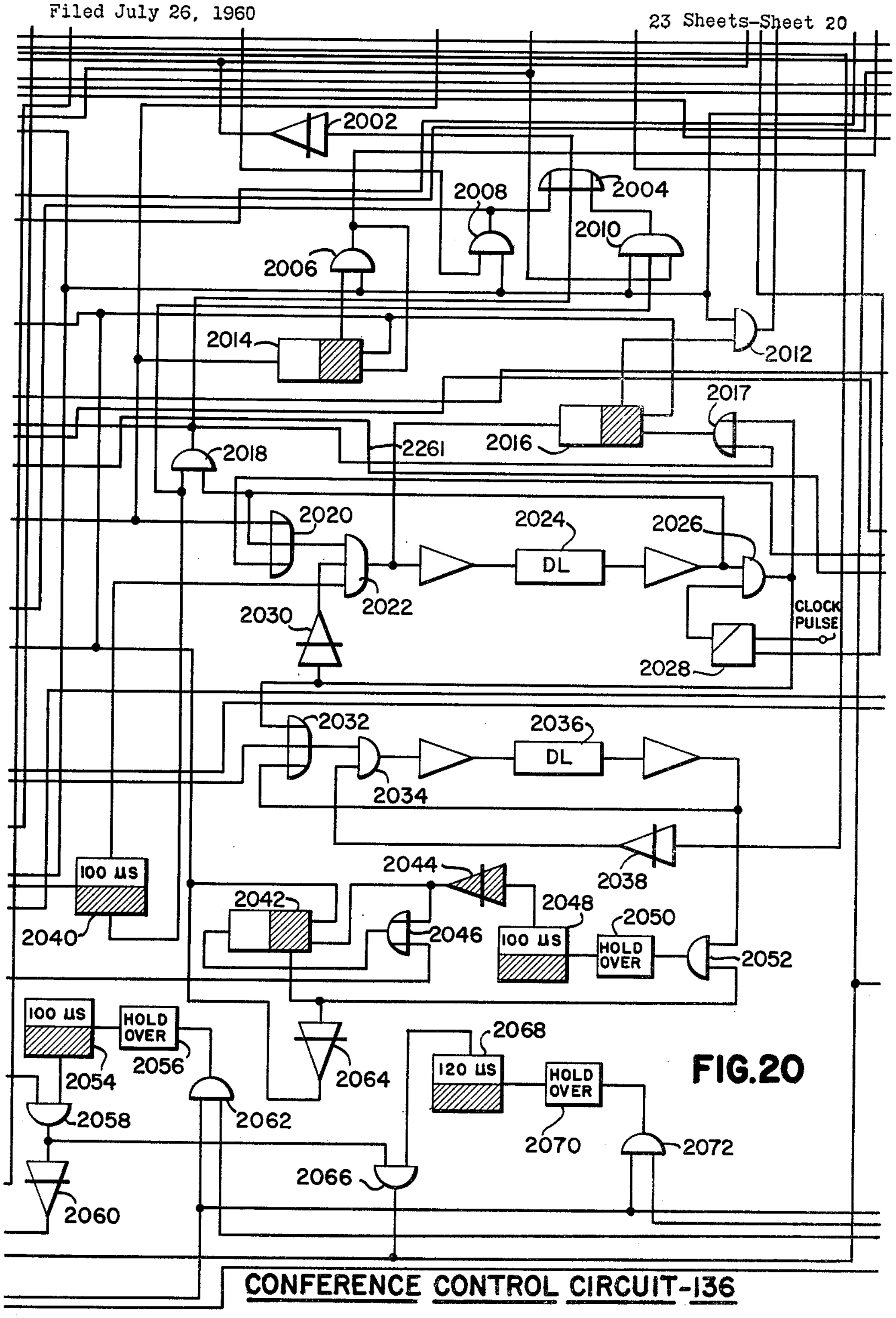
Figure 21:
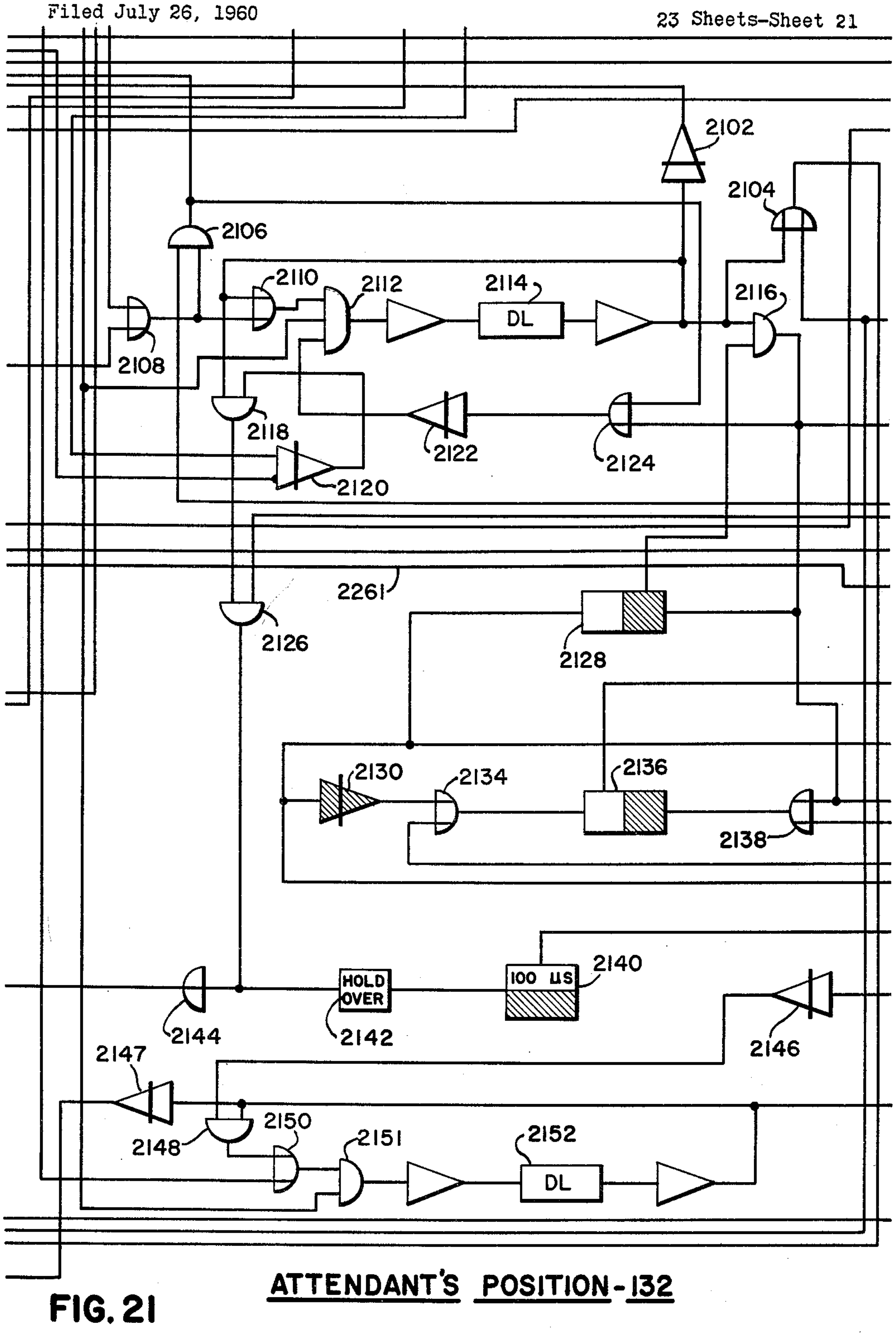
Figure 22:
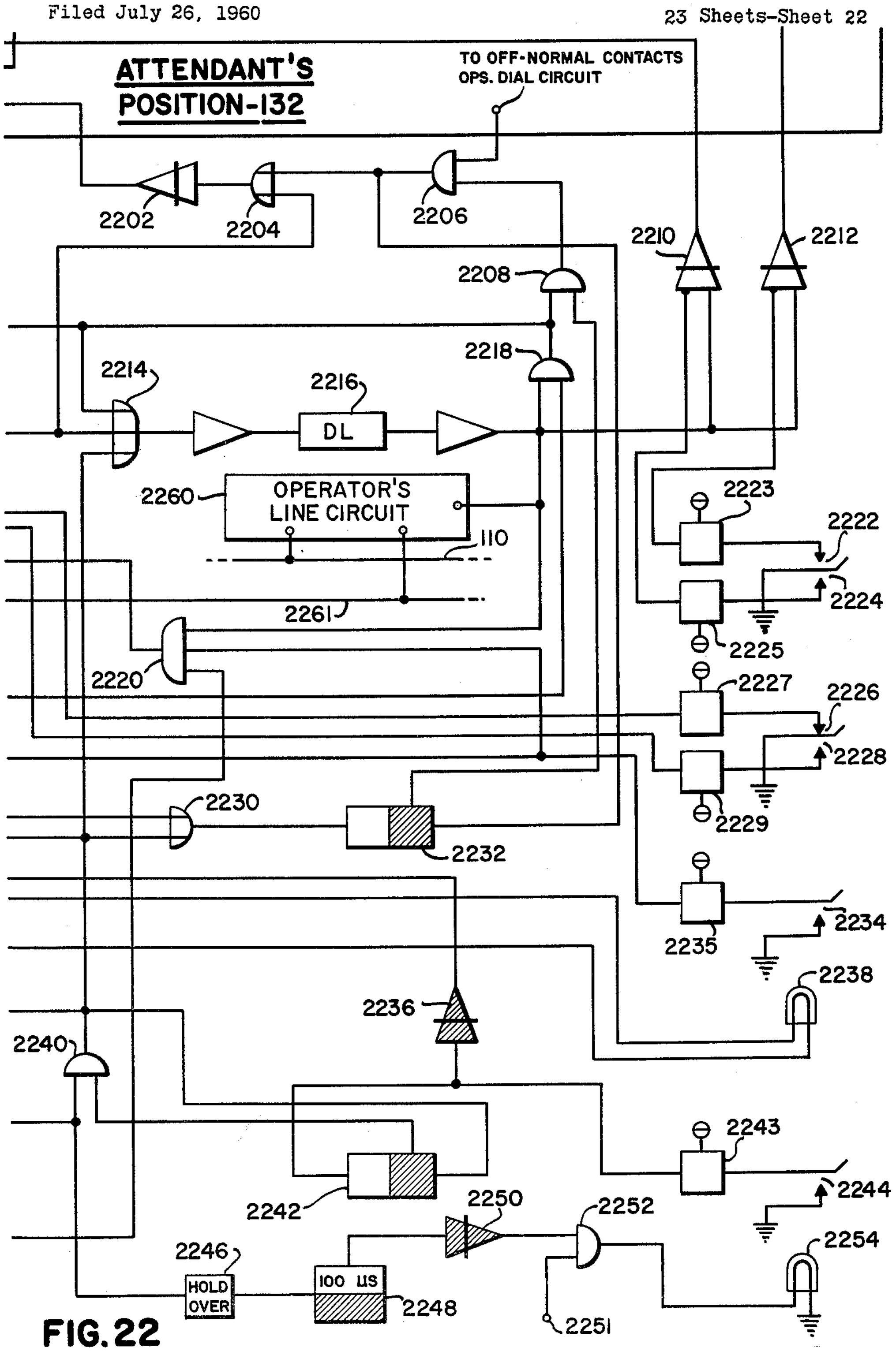

FIGS. 3 and 4 form a logic diagram of a calling line store included in the system;

FIGS. 5 and6 form a logic diagram of a calling line and trunk matrix;

FIGS. 7, 8, 14 and 15 form a logic diagram of a terminating line store included in the system;

FIGS. 9 and 10 form a logic diagram of a terminating line and trunk matrix;

FIGS. 11–13 form a logic diagram of a digit detector and time slot allotter forming a part of the system shown in FIG. 1;

FIGS. 16 and 17 form a logic diagram of a trunk finder;

FIG. 18 is a logic diagram of a conference connector;

FIGS. 19 and 20 form a logic diagram of a conference control circuit;

FIGS. 21 and 22 form a logic diagram of an attendant or operator position included in the system;

FIGS. 23–30 are logic symbols and typical circuits of different circuit components used in the logic diagrams illustrating the invention; and FIG. 31 is a block diagram illustrating the manner in which FIGS. 2–22 of the drawings are positioned adjacent each other to form a complete logic diagram of the system.

GENERAL DESCRIPTION

The automatic communication system shown in block form in FIG. 1 of the drawings comprises a private branch electronic exchange including 300 line circuits and 100 trunk circuits. The private branch electronic exchange utilizes a time division multiplex technique for establishing coexisting communication paths on a single channel, but the exchange is capable of operating with and being connected to conventional electromechanical switching systems and of being controlled by signals produced by conventional dialing devices. Thus, the private branch exchange is capable of being placed in use with existing telephone facilities.

In general, all of the switching operations of the system are synchronized by a central pulse generator or clock pulse source that provides clock pulse signals at a 400 kc. rate. In order to provide thirty-two separate time positions or slots on a common channel over which the 300 line circuits and up to 100 trunks can be interconnected, a frame rate of 12.5 kc. having a duration of 80 microseconds is selected. Thus, each of the thirty-two time slots has a duration of 2.5 microseconds that can be equally divided between a guard interval and a differentially positioned, slot representing pulse. However, it is obvious that other operating frequencies can be used so that a greater or lesser number of time slots is provided in accordance with the amount of traffic and the response of the various components of the system.

The system shown in FIG. 1 includes a plurality of line circuits 100 and 102 and a plurality of trunk circuits 104 that can be connected for communication over a common speech highway 110 in any assigned one of the thirty-two time slots. In addition, the line circuits 100 and 102 are connected together and to common equipment in the system over a line data highway 112. The trunk circuits 104 are connected to the common control equipment in the system over a common trunk receive highway 116 and a common trunk send highway 118. Each of the line circuits 100 and 102 and each of the trunk circuits 104 is provided with an individual designation. The highways 110, 112, 116 and 118 are divided into the thirty-two separate time division channels or slots so that thirty-two coexisting communication paths can be established over these highways at any given time, and any one of the thirty-two channels can be assigned to any combination of line and trunk circuits.

In order to determine whether one of the line or trunk circuits 100, 102 and 104 is in a calling condition and requires the assignment of a time slot, the system includes a calling line store 122 having a ring counter continuously operable to successive settings each representing one of the line or trunk circuits. A digit detector and time slot allotter circuit 120 continuously searches for and assigns idle time slots to the calling line store 122. When an idle time slot is received by the circuit 122, the counter is advanced, and the idle or busy condition of the line or trunk represented by the setting of the counter is determined. If the line or trunk circuit is busy, the counter is advanced one step to its next setting and the idle time slot is retained for subsequent use. If the line or trunk represented by the counter setting is idle, the counter setting is stored in a plurality of delay lines in the calling line store 122 that have a delay equal to one time frame. The counter setting is also applied to a calling line and trunk matrix 124. During the following time frame, the "on-hook" or "off-hook" condition of the line or trunk circuit whose designation is stored in the delay lines is determined.

The calling line and trunk matrix 124 translates the counter setting or circuit designation into the application of a signal in the assigned time slot to a matrix gate individual to the selected line or trunk. The time slot pulse from the matrix gate is supplied to the related line or trunk circuit and connects this line or trunk circuit to the highways in the allotted time position. If the circuit is in an "on-hook" condition and thus does not present a calling condition, the assigned time slot is released for other use, the stored designation is cleared from the delay lines, and the selected circuit is disconnected from the highways. Alternatively, if an "off-hook" condition is presented, the time slot allotted to the calling circuit is stored in a busy time slot store to mark this slot as unavailable for use by other calling circuits, the stored designation is circulated in the delay lines in the assigned time position to continuously connect the selected circuit to the highways, and dial tone is forwarded over the highway 110 in the assigned time slot from a tone generator 106 to the calling circuit.

If the call is to be extended between a pair of line circuits served by the private branch exchange, the subscriber at the calling line circuit dials the digits necessary to extend the connection. The line circuits 100 and 102 are operated by a dialed digit to supply a number of bursts of time slot pulses from the matrix 124 to the line data highway 112 in the time position assigned to the calling line circuit, which number corresponds to the number of dial impulses in the dialed digit. The values of the dialed digits are detected by counting circuits in the digit detector and time slot allotter 120 which are effective in the time position assigned to the calling line circuit and which count both the number of time slot pulses in the bursts and the number of clock pulses in the intervals between the bursts. This provides positively controlled means for separating dial impulses from spurious signals.

The value of the first dialed digit is transferred to a trunk finder 126 and the value of this digit is examined. If its value corresponds to one assigned as the first or hundreds digits of the designation of calling lines in the private branch exchange, the first dialed digit and the following two tens and units digits of the called circuit designation are transferred to and stored in delay line registers in a terminating line store 128 in the time position assigned to the calling line circuit. When the dialed designation has been stored in the terminating line store 128, this circuit determines whether the circuit represented by the dialed number is in an idle or busy condition. In addition, the delay line registers in the terminating line store 128 control translating circuits in a terminating line and trunk matrix 130 so that the called line circuit is connected to the highways 110 and 112 in the time position allotted to the calling line circuit.

This permits the terminating line store 128 to determine the "on-hook" or "off-hook" condition of the called line circuit. If the called line is either busy or in an "off-hook" condition, the terminating line store 128 controls the tone generators 106 to return busy tone over the speech highway 110 to the calling line circuit in the time slot allotted thereto. Alternatively, if the called line circuit is both "on-hook" and idle, the terminating line store 128 includes means for controlling the tone generators 106 to apply ring tone to the called line circuit and ring-back tone to the calling line circuit during alternative time frames.

This ringing continues until such time as the called circuit answers. At this time, the transmission of ring tone and ring-back tone is terminated, and the calling and called line circuits are connected over the speech highway 110 in the time position originally assigned to the calling line circuit. When either or both of the calling and called circuits returns to an "on-hook" condition at the conclusion of the call, the digit connector and time slot allotter 120 counts the number of signals in the assigned time position appearing on the line data highway 112. After a predetermined number of signals have been counted, thus indicating that a valid end-of-call condition exists, the digit detector and time slot allotter 120 erases the designations stored in the allotted time slot in the delay line registers in the calling line store 122 and the terminating line store 128. This completes the release of the connection.

If the call is to be extended from a calling trunk circuit to one of the line circuits served by the private branch exchange, the digit detector and time slot allotter 120, the calling line store 122 and the calling line and trunk matrix 124 operate in the manner described above to connect the calling trunk circuit, such as the circuit 104, to the highways 110, 116 and 118 in an idle time slot. After performing a busy-idle test on this trunk circuit, the digit detector and time slot allotter 120 checks the "on-hook" or "off-hook" condition of the trunk circuit and returns a supervisory signal over the trunk circuit to the remote exchange to indicate that the call can proceed.

The calling subscriber at the remote exchange then dials the three digit designation of the called line circuit in the private branch exchange, and these dialed digits are converted into spaced bursts of pulses in the time slot allotted to the trunk circuit 104 which are transferred over the trunk receive highway 116 to the digit detector and time slot allotter 120. These dialed digits are detected by the counting circuits in the manner described above, and the first digit is again transferred to the trunk finder 126 to determine whether the first digit designates one of the line circuits served by the private branch exchange. If so, the three dialed digits are transfered to and stored in the delay line registers in the terminating line store 128 in the time slot allotted to the calling trunk circuit 104.

An idle-busy test is now performed on the called line circuit by the terminating line store 128, and this store pulses the terminating line and trunk matrix 130 so that the called line circuit is connected to the highways 110 and 112 in the time position allotted to the calling trunk circuit 104. This permits the "on-hook" or "off-hook" condition of the called line to be checked so that ring tone is applied to the called line circuit if the called line circuit is both "on-hook" and idle. The terminating line store 128 also returns a signal over the calling trunk circuit 104 to the remote calling exchange to advise the calling station that the called line circuit is being rung. When the called line circuit answers, the ring tone is removed and communicaiton between the calling trunk circuit 104 and the called one of the line circuits 100 and 102 takes place over the speech highway 110 in the time slot originally allotted to the trunk circuit 104. The private branch exchange is restored to its normal condition when the trunk circuit 104 returns to an "on-hook" condition so that pulses in the allotted time slot are applied to the digit detector and time slot allotter 120.

When a call is to be extended from one of the line circuits 100 or 102 to a trunk circuit, such as the trunk circuit 104, extending to a remote exchange, the digit detector and time slot allotter 120 assigns an idle time slot to the calling line store 122, calling line store 122 performs an idle-busy test on the calling line circuit when this circuit is reached in the normal scanning progression of the counter in the store 122. The calling line and trunk matrix 124 connects the calling line circuit to the highways 110 and 112 in the allotted time position, and the digit detector and time slot allotter 120 performs a test to determine an "on-hook" or "off-hook" condition of the line circuit. As the calling line is found to be "off-hook," dial tone is returned by the tone generator 106 to the calling circuit to advise the subscriber that the access digit for reaching outgoing trunks can be dialed.

The subscriber at the calling line circuit then dials the access digit which is detected by the digit detector and time slot allotter 120 in the manner described above and subsequently transferred to the trunk finder 126. Upon receiving a digit having a value that indicates that the connection is to be extended to an outgoing trunk, the setting of a counter in the trunk finder 126 representing the designation of one of the trunk circuits is forwarded to the terminating line store 128. The idle or busy condition of this trunk is determined, and the terminating line and trunk matrix 130 connects the selected trunk circuit 104 to the highways 110, 116 and 118 to permit the performance of the "on-hook" and "off-hook" tests. In the event that the first trunk circuit whose designation is marked by the setting of the counter in the trunk finder 126 is busy, busy tone is not returned to the calling line circuit in the time slot allotted thereto, but the counter is advanced a step to the next setting representing the next trunk circuit. The idle or busy condition of this trunk is determined, and the trunk circuit is connected to the highways 110, 116 and 118 in the time slot assigned to the calling line circuit to permit the performance of the "on-hook" and the "off-hook" tests.

If these tests are satisfactorily completed, the designation of the trunk circuit is circulated in the terminating line store 128, and the terminating line and trunk matrix 130 connects the outgoing trunk circuit 104 to the calling line circuit in the time slot originally assigned to the line circuit. At this time, the terminating line store 128 operates the tone generators 106 to return dial tone to the calling line circuit in the time slot assigned thereto. The subscriber then dials the digits identifying the desired called station in the remote exchange, and the connection is established at the remote exchange. When the connection is released by the calling line circuit, the private branch exchange is cleared by erasing the calling line and outgoing trunk designations from the stores 122 and 128 and by releasing the time slot for use in extending other connections.

On calls extended from line circuits in the private branch exchange over outgoing trunk circuits, it is desirable to provide a record of certain items of information pertaining to the calls to facilitate the establishment of toll charges. Accordingly, the system includes toll ticketing equipment 108 that is provided with the digits identifying the called station under the control of the digit detector and time slot allotter 120 following the seizure of an available trunk. In addition, when answering supervisory signals are received from the remote exchange, the toll ticketing equipment 108 is placed in operation to produce a record of the duration of the call. When the calling circuit in the private branch exchange goes "on-hook" to terminate the connection, the toll ticketing equipment 108 is operated to transfer the stored called subscriber designation and duration information to a recorder. When this information has been recorded, the toll ticketing equipment 108 returns a reset signal to the digit detector and time slot allotter 120 which resets the private branch exchange to its normal condition by erasing the designations stored in the calling line store 122 and the terminating line store 128 and by freeing the time for use in extending other connections.

The private branch exchange also includes an attendant's position 132 that can be placed in communication with the communication circuits to provide operator assistance in extending certain calls. When a calling circuit is seized in the manner described above, an operator access digit "0" can be dialed into the digit detector and time slot allotter 120 which is forwarded to the value detecting or translating means in the trunk finder 126. In response to the receipt of a first digit "0," the time slot of the calling circuit is transferred to a queue store delay line in the attendant's position 132 to provide an indication that the operator's services are required. Various types of communication channels can be established from the attendant's position 132 as a result of verbal instructions conveyed from the calling circuit. When the desired communication circuit has been established, the attendant's position 132 is dropped out of the connection and the use of the time slot previously allotted to the calling circuit is returned from the position 132 to the calling circuit.

The attendant's position 132 also includes means by which this circuit is placed in connections presenting a recall condition. More specifically, if a line circuit served by the private branch exchange is "flashed" to indicate a recall condition, the time slot allotted to this line circuit is transferred to a recall storage delay line in the attendant's position 132. When this call is answered by the operator and the new called party has been determined, the recalling party is released and the new called party is connected to the incoming trunk in the same time slot in which the recall signaling was received.

The private electronic branch exchange also includes means for establishing a common conference connection between a calling line circuit and as many as four other line circuits in the exchange. Thus, the calling party may extend a call to four called parties, all five of whom may converse with each other. These calls are established serially by the calling party. More particularly, when a conference connection is to be established, a calling one of the line circuits is connected to the highways 110 and 112 in an idle time slot previously selected by the digit detector and time slot allotter 120 in the manner described above. The calling subscriber, upon receiving dial tone, dials an access digit "2" that is received by the digit detector and time slot allotter 120 and transferred to the trunk finder 126. The translating means in the trunk finder 126 marks the call as one requiring a conference circuit and transfers the time slot assigned to the calling circuit to storage means in a conference control circuit 136. In response to the receipt of this signal, the conference control circuit 136 and a connected conference connector 134 are either seized for use by the calling line circuit or a busy signal is returned to the calling line circuit if the conference facilities are in use at this time.

In the event that the conference facilities are idle, the conference control circuit 136 controls the digit detector and time slot allotter 120 to supply four additional idle time slots for storage in the circuit 136 for use by the called circuits. When all of these time slots have been stored in the circuit 136, dial tone is returned to the calling line circuit to advise the subscriber that the designation of the first line circuit in the private branch exchange that is to be connected to the conference circuit can be dialed. The dialed designation is received by the digit detector and time slot allotter 120 and transferred to the terminating line stored 128 in the time slot assigned to the calling line circuit. After the performance of the idle-busy and "on-hook," "off-hook" tests, the called line circuit is rung, and the receipt of answer signals from the called circuit causes the designation of the first called party to be transferred in the terminating line store 128 from the time position of the calling circuit to one of the idle time slots stored in the conference control circuit 136. When the first called circuit designation has been stored in the terminating line store 128 in the first called time slot, dial tone is again returned to the calling line circuit to indicate that the designation of the second called circuit can be dialed.

In this manner, the subscriber at the calling line circuit dials the designations of the other called circuits that are to be connected to the conference connection, and each of these designations is stored in the terminating line store 128 in a different one of the idle time slots previously assigned to and stored in the conference circuit 136. If busy tone is returned or the called circuit does not answer during the attempted connection of any called line circuit, the calling subscriber can dial the conference circuit access digit "2" to clear the private branch exchange of all of the information stored in the time slot allotted to the station that is busy or does not answer. This returns this time slot to storage in the conference control circuit 136 to permit its use in connecting another line circuit to the conference connection. The conference connector 134 includes a delay line for circulating the time slot assigned to the calling line circuit and the four time slots assigned to the called line circuits. These circulating time slots continuously operate a five stage counter so that five audio gates in the connector 134 are sequentially connected to the speech highway 110 in the five time slots stored in the conference connector 134. One terminal of each of the audio gates is connected to an audio signal storing means, and these storing means are all connected in common. Thus, the speech information received from the highway 110 through the gates in any one of the five time slots is distributed to the storage means associated with the remaining time slots, and the audio signals stored during a time frame are transferred back to the speech highway 110 in all of the other time slots in the frame. This permits all five parties to communicate over the channel 110 even though the five calling and called circuits are each assigned a different time position.

If the conference connection is to be established by the attendant's position 132 either prior to the establishment of the conference circuit or at any time during the connection of a party to the conference circuit, the digit "0" can be dialed from the calling line circuit. This places the attendant's position 132 in the circuit in one of the time slots assigned to the called station and permits the operator to establish the connection to the desired called station. After the connection has been established, the operator can retire from the connection, and the designation of the line circuit called by the operator is stored in the terminating line store 128 in one of the time slots previously assigned for use by the called line circuits in the conference connection. The conference circuit is released in the manner described above as each of the calling and called parties goes "on-hook." When the last of the called or calling parties is released, the conference control circuit 136 and the conference connector 134 are restored to a normal condition.

LOGIC SYMBOLS AND TYPICAL CIRCUITS

The details of the communication system that is shown in block form in FIG. 1 are illustrated in FIGS. 2–22 of the drawings by the use of a logic diagram in which various circuit components are shown in logic schematic form. In the logic diagram, each circuit component, such as an inverter or gate, is represented by a particular logic symbol. The logic symbols together with typical circuit arrangements represented by the symbols are illustrated in FIGS. 23–30 of the drawings. These figures usually include both an illustration of the logic symbol and a circuit diagram of a typical circuit represented by the symbol. Although the illustrated representative circuits are conventional in design and well known in the art, a brief description of each of these circuits is set forth below.

*"AND" gate*

Figure 23A:
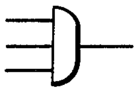
Figure 23B:
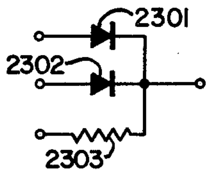

The logic symbol for the "AND" gate is illustrated in FIG. 23A, and a typical circuit represented by this symbol is shown in FIG. 23B. As illustrated, the "AND" gate includes a plurality of diodes 2301 and 2302, the cathodes of which are connected together and to a common output terminal. The anodes of the diodes 2301 and 2302 provide individual diode inputs to the gate circuit. A resistor 2303 connected to the output terminal provides a resistive input for the gate circuit. The "AND" gate shown in FIG. 23B provides an "AND" function for negative signals. That is, with the resistor 2303 connected to a negative potential, the output of the gate will drop to a negative potential only when all of the input terminals are also returned to a negative potential. The output terminal will rise to a more positive or ground potential when any one or more of the input terminals is returned to the more positive or ground potential.

*"OR" gate*

Figure 24A:
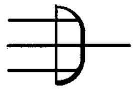
Figure 24B:
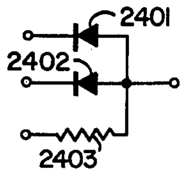

The logic symbol fo an "OR" gate is shown in FIG. 24A, and a typical circuit represented by this symbol is illustrated in FIG. 24B. The "OR" gate includes a plurality of diodes, such as a pair of diodes 2401 and 2402, whose anodes are connected together to provide an output terminal. The cathodes of the diodes 2401 and 2402 provide individual inputs to the gate. A resistor 2403 connected to the common output terminal provides a resistance input for the gate. The "OR" gate shown in FIG. 24B provides an "OR" function for negative potentials. When the resistor 2403 is connected to ground or a relatively positive potential, the output of the gate will drop to a negative potential when the anode of one of the diodes 2401 or 2402 is returned to a more negative potential.

*Pulse inverter*

Figure 25A:
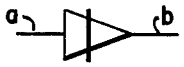
Figure 25B:
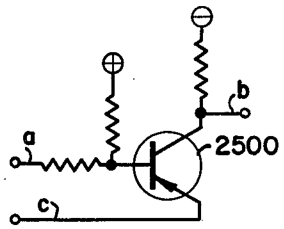

The logic symbol for one pulse inverter is shown in FIG. 25A of the drawings, and a typical circuit represented by this logic symbol is shown in FIG. 25B. The inverter comprises a transistor 2500 having its base electrode connected to an input terminal *a* and its collector electrode connected to an output terminal *b*. The emitter electrode of the transistor 2500 is normally connected directly to ground at a terminal *c* which is not shown in the logic symbol illustrated in FIG. 25A. However, in certain of the circuits shown in detail in FIGS. 2–22, a switched ground is applied to the emitter electrode of the transistor 2500, as in an inverter 2900 in FIG. 29, to provide a gated inverter. In these instances, the logic symbol is modified to show the connection to the terminal *c* by a line terminating in a dot adjacent the base of the triangular outline used as a logic symbol for the pulse inverter. The output of the transistor 2500 normally supplies a negative potential. However, when the base electrode is driven sufficiently negative, the transistor 2500 conducts to elevate the potential at the output terminal *b* toward ground.

*Pulse inverter*

Figure 26A:
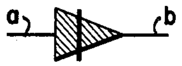
Figure 26B:
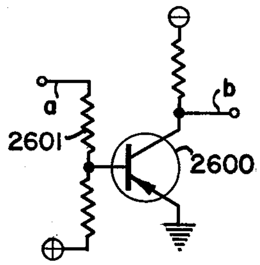

The logic symbol for a normally conductive pulse inverter is illustrated in FIG. 26A, and a typical circuit represented by this symbol is shown in FIG. 26B. The pulse inverter includes a transistor 2600 that is connected in the same general manner as the transistor 2500, with the exception that the emitter electrode is always returned to ground potential and the base electrode of the transistor 2600 is normally connected to a negative potential by a resistance element 2601 and an input terminal *a*. Thus, an output terminal *b* of the inverter shown in FIG. 26 is normally near ground potential and drops to a more negative potential when a more positive potential is applied to the base electrode of the transistor 2600.

*Flip-flop*

Figure 27A:
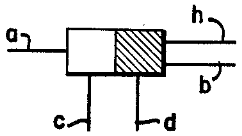
Figure 27B:
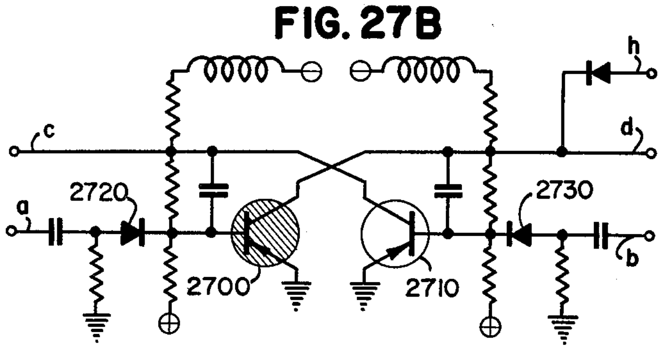

The logic symbol for a flip-flop is shown in FIG. 27A, and a typical circuit represented by this symbol is illustrated in FIG. 27B. This flip-flop, which includes a pair of transistors 2700 and 2710, is used to provide steady state marking potentials in the control circuits and, by strapping a pair of inputs terminals *a* and *b* together, can be used as a binary counting stage responsive to positive-going pulses. Assuming that the transistor 2700 is in a conductive condition and that the transistor 2710 is nonconductive, the cathode terminal of an input diode 2730 is biased positively with respect to its anode, while the cathode terminal of an input diode 2720 is biased negatively with respect to its anode. Thus, when a positive-going pulse is applied to the input terminals *a* and *b*, this pulse is coupled through the diode 2720 to render the transistor 2700 nonconductive and to render the transistor 2710 conductive. When the next positive-going pulse is applied to the input terminals *a* and *b*, this pulse is forwarded through the diode 2730 to render the transistor 2710 nonconductive and to render the transistor 2700 conductive. As the transistors 2700 and 2710 are shifted between alternate conductive and nonconductive conditions, a pair of output termials *c* and *d* are shifted between ground and negative potential.

The flip-flop is operated to a normal or reset condition by the application of a positive-going or ground signal to a terminal *h* which renders the transistor 2710 nonconductive and thus renders the transistor 2700 conductive. This normal or reset condition of the flip-flop is illustrated in the logic diagram by the shading in the portion of the logic symbol to which the terminal *d* is connected to indicate the normal application of ground to the terminal *d* by the conductive transistor 2700. The application of a negative potential to the output terminal *c* in the normal or reset condition of the flip-flop is represented by the unshaded portion of the symbol to which this terminal *c* is connected.

*Delay line*

Figure 28:
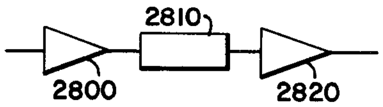

FIG. 28 of the drawings illustrates the logic symbol for a delay line which comprises a mass of magnetostrictive material 2810 disposed between an input amplifier 2800 and an output amplifier 2820. The input amplifier 2800 responds to negative-going signals applied to its input to apply an input signal to the magnetostrictive material 2810. At the end of a fixed time interval, an output signal from the magnetostrictive material 2810 is applied to the output amplifier 2820. The output of this amplifier is normally maintained at a more positive or ground potential and drops to a more negative potential in response to the application of a signal to the input of the amplifier 2820 from the magnetostrictive material 2810. In the circuit illustrated in FIGS. 2–22 of the drawings, all of the delay lines provide a delay of 80 microseconds which corresponds to the length or duration of the time reference frame.

*Half-adder*

Figure 29A:
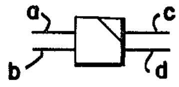
Figure 29B:
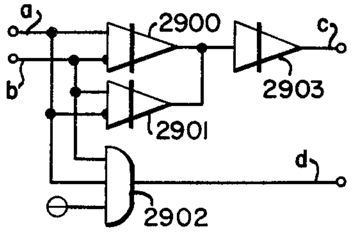

The logic symbol for a half-adder or an exclusive "OR" gate is shown in FIG. 29A, and a typical circuit which illustrates the half-adder by the use of logic symbols is shown in FIG. 29B. When either one of a pair of input terminals *a* and *b* is at a negative potential and the other of these inputs is at ground potential, an "AND" gate 2902 is inhibited so that an output terminal *d* remains at a more positive or ground potential. With this potential condition applied to the terminals *a* and *b*, one of a pair of inverters 2900 and 2901 is rendered conductive so that the input of a third inverter 2903 is held at a more positive potential. This maintains the output of the inverter 2903, which is connected to an output terminal *c*, at a more negative potential. Thus, whenever one of the inputs *a* and *b* is at ground potential and the other input is at a negative potential, the output *c* remains at a negative potential and the output *d* rises to ground potential.

If both of the inputs *a* and *b* are placed at a negative potential, the "AND" gate 2902 is enabled so that the output *d* drops to a negative potential. Further, both, of the inverters 2900 and 2901 are now rendered conductive so that the input to the inverter 2903 remains at a more positive potential. This maintains the inverter 2903 in a nonconductive condition so that its output terminal remains at a negative potential.

If both of the input terminals *a* and *b* are held at ground potential, both of the inverters 2900 and 2901 are rendered nonconductive, and the inverter 2903 is rendered conductive so that the output terminal *c* rises to ground potential. Further, the application of ground to both of the input terminals *a* and *b* inhibits the gate 2902 so that the output terminal *c* is held at ground potential.

*Monostable multivibrator*

Figure 30A:
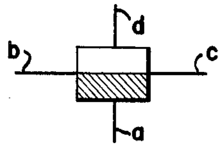
Figure 30B:
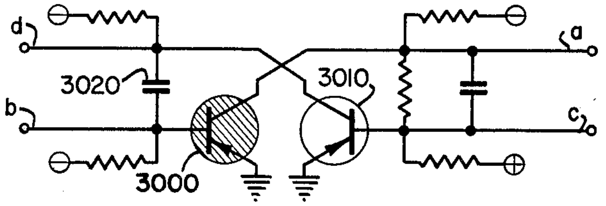

A logic symbol for a monostable multivibrator is shown in FIG. 30A of the drawings, and a typical circuit represented by this logic symbol is illustrated in FIG. 30B. In the normal condition of the multivibrator, a transistor 3010 is in a nonconductive conduction, and a transistor 3000, is in a conductive condition so that ground potential is applied to an output terminal *a* and a negative potential is applied to an output terminal *d*. When a positive-going pulse is applied to either of a pair of terminals *b* or *d* or a negative-goinv pulse is applied to either of a pair of terminals *c* or *a*, the monostable multivibrator is triggered into its unstable condition in which the transistor 3000 is not in conduction and the transistor 3010 is in a conductive condition. When the positive potential across a coupling condenser 3020 dissipates to the point at which the base electrode of the transistor 3000 again becomes negative with respect to its grounded emitter, the multivibrator returns to its normal or stable condition. Thus, the output terminal *a* is provided with a negative-going pulse of a variable duration dependent on the time constants of the components used in the circuit. The output terminal *d* is provided with a positive-going pulse of the same controllable duration. The upper portion of the block forming the logic diagram is marked with a legend indicating the duration of the pulse that is applied to the output terminals *a* and *d*.

DETAILED DESCRIPTION OF THE OPERATION OF THE SYSTEM

In the embodiment of the invention illustrated in detail in FIGS. 2–22 of the drawings, the private electronic branch exchange includes three hundred lines and up to one hundred trunks. Each of the line circuits, such as the line circuits 100 and 102 shown in FIG. 2, includes a bilateral voice gate 204 or 212 for establishing a controlled connection between a station 202 or 210 and the speech highway 110. The voice gates 204 and 212 can comprise a blocking oscillator gate of the type described in detail in the copending application of James G. Pearce and Barry Brightman, Serial No. 814,922, filed May 21, 1959, now Patent No. 3,087,022, which is assigned to the same assignee as the present application, when a connection is established between a pair of lines or a line and a trunk, the voice gates in the line and trunk circuits are effective to connect components in these circuits so that bilateral speech transmission takes place by the use of the resonant energy transfer technique described in detail in Conference Paper No. 59–210 by J. C. Perkins, Jr., which was published by the American Institute of Electrical Engineers and which is entitled "Transmission Aspects of an Electronic Switchboard Employing Time Division Multiplexing."

Each of the line circuits, such as the line circuits 100 and 102, also includes a data gate 208 or 216 connected between the stations 202 and 210 and the line data highway 112. The gates 208 and 216 are effective to supply time slot pulses to the line data highway 112 under the control of dial impulses from conventional dialing devices and to control the selective application of time slot pulses to the highway 112 in accordance with the "on-hook" or "off-hook" condition of the line. Although many suitable gate circuits for performing these operations are known in the art, the gate circuits 208 and 216 preferably comprise a saturable magnetic gate of the type disclosed in the copending application of George E. Beine, Serial No. 323, filed January 4, 1960, which copending application is assigned to the same assignee as the present application. The gate circuits 208 and 216 are so arranged that an "on-hook" condition in the related station or line circuit permits the transmission of time slot pulses to the line data highway, while on "off-hook" condition supresses the transmission of these pulses. Thus, the interruptions in the continuity of the line circuit due to dialing cause the transmission of bursts of time slot signals to the highway 112 in accordance with the dialed information.

Figure 2:
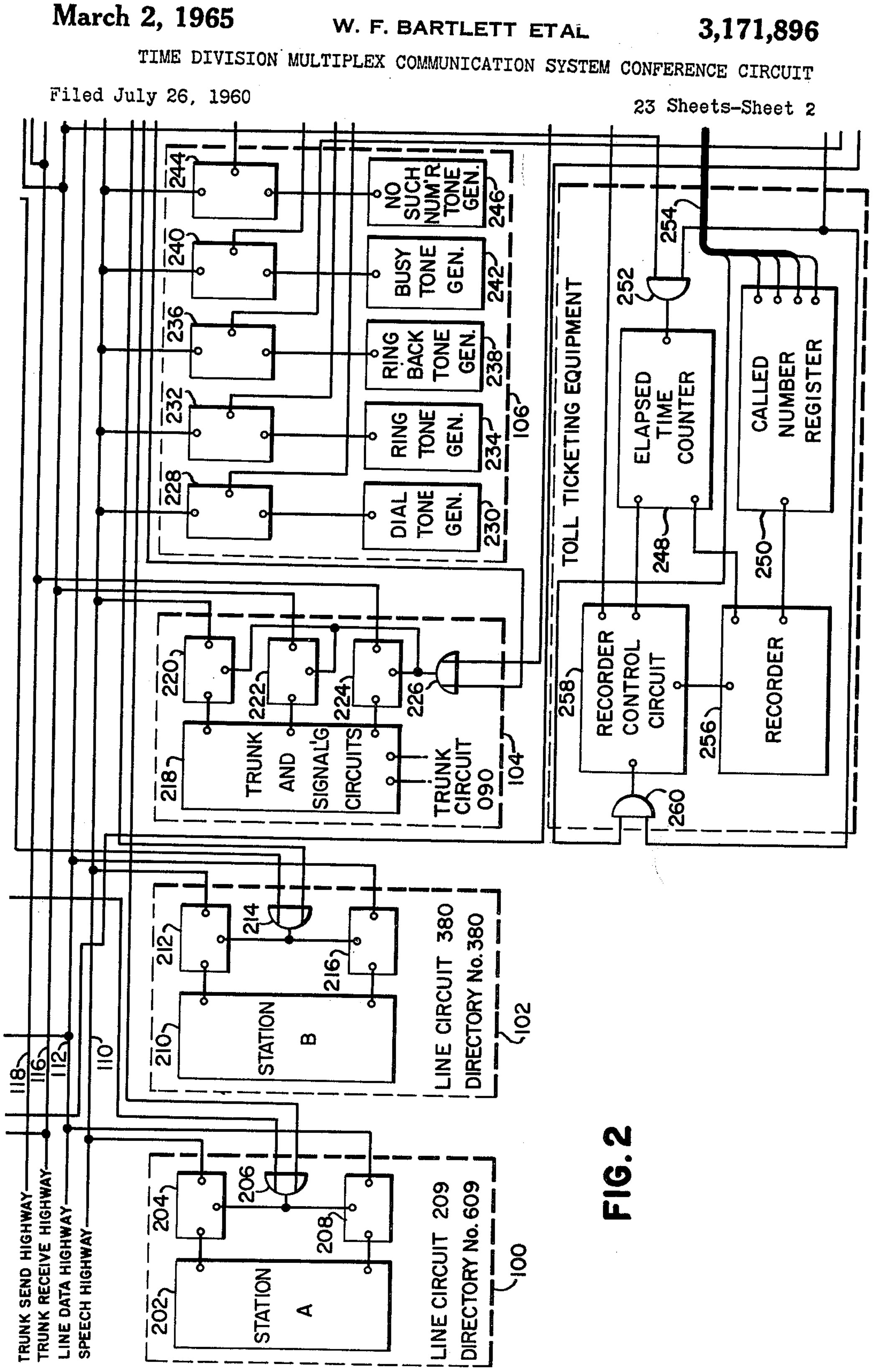
FIG. 2 is a logic diagram showing certain components of the system, such as a group of line and trunk circuits.

Each of the trunk circuits, such as the trunk circuit 104 shown in FIG. 2, includes a voice gate 220 connected between the speech highway 110 and a trunk and signaling circuit 218 forming a part of the trunk circuit 104. The voice gate 220 can comprise a bilateral blocking oscillator gate of the type described in the above identified Pearce et al. application and performs the same functions as the voice gates 204 and 212 in the line circuits 100 and 102. The trunk circuit 104 also includes a pair of data gates 222 and 224 that connect the trunk and signaling circuit 218 with the trunk receive highway 116 and the trunk send highway 118. The data gates 222 and 224 preferably are of the type described in detail in the above identified copending Beine application.

The gate 222 is controlled by a potential supplied by the trunk and signaling circuit 218 to transmit time slot signals to the receive highway 116, while the data gate 224 is controlled by a potential received from the trunk send highway 118 to apply time slot signals to the trunk and signaling circuit 218.

Since the private branch electronic exchange is designed for use with existing telephone facilites, the trunk and signaling circuit 218 can comprise means for performing conventional "E & M," "CX," "D" or "SX" signaling, loop signaling, or alternating current signaling in the various ways well known in the art. Since this signaling requires the controlled operation of existing electromechanical switching components that have a relatively long response time, it may be necessary to insert a monostable multivibrator and an accompanying hold-over circuit between the data gate 224 and the electromechanical switching components provided in the circuit 218.

In order to insure the accurate operation of the private branch exchange, the operation of all of the components is synchronized by the use of clock pulses derived from a controlled frequency source. Although any suitable frequency can be selected, the system shown in FIGS. 2–22 of the drawings utilizes a clock source having a frequency of 400 kilocycles which provides recurring pulses at 2.5 microsecond intervals. In the present system, each pulse interval of 2.5 microseconds is divided into a pulse having an "on" time or pulse width of 1.25 microseconds and a guard or pulse "off" time of 1.25 microseconds. The stream of pulses provided by the signaling source is divided into recurring cycles or time reference frame having a recurrence or repetition frequency of 12.5 kilocycles. Thus, each time frame has a duration of 80 microseconds. Since the width of each time slot is 2.5 microseconds, the selected 80 microsecond time frame effectively provides thirty-two separate time division communication paths over which speech signals and data signals can be transmitted.

As indicated above, a communication path is provided between calling and called circuits by assigning the same time slot to the calling and called circuits. To accomplish this, each of the line circuits 100 and 102 includes an "OR" gate 206 or 214 provided with a pair of enabling inputs. One input of each of the gates 206 and 214 is connected to the calling line and trunk matrix 124 and is provided with time slot pulses when the related line circuit is the calling circuit. The other input to each of the gates 206 and 214 is connected to the terminating line and trunk maxtrix 130 and is provided with time slot pulses when the line circuits 100 and 102 are the called circuits in a communication path. The output of the gates 206 and 214 is connected to the gates 204, 208, 212 and 216. The time slot pulses applied to the gates 204 and 212 enable these gates so that communication between the station 202 or 210 and the speech highway 110 is enabled. The time slot pulses applied from the output of the gates 206 and 214 to the data gates 208 and 216 are selectively transmitted to the line data highway 112 under the control of an enabling potential applied to these gates from the stations 202 and 210.

Each of the trunk circuits, such as the trunk circuit 104, includes an "OR" gate 226 having one enabling input connected to the calling line and trunk matrix 124 and the other enabling input connected to the terminating line and trunk matrix 130. Whenever the trunk circuit 104 forms the calling or called circuit in a connection, one of the inputs to the gate 2326 is provided with time slot pulses which are forwarded to the voice gate 220 and the data gates 222 and 224. The pulses applied to the gate 220 enable this gate so that speech signals are transmitted between the speech highway 110 and the trunk and signaling circuit 218. The time slot pulses applied to the gate 222 are selectively applied to the trunk receive highway under the control of an enabling potential applied to the gate 222 from the circuit 2318. The time slot pulses applied by the gate 226 to the data gate 224 are applied to the circuit 218 in accordance with control potentials derived from the trunk send highway 118.

In the normal condition of the system, one or more communication paths are in existence at any given time so that the binary designations of one or more calling lines or trunks and one or more called or terminating lines or trunks are being continuously circulated in assigned time slots in the calling line store 122 and the terminating line store 128. Since the illustrated system includes three hundred lines and up to one hundred trunks and since the system includes a repetitive time frame embracing thirty-two separate time division channels, each of the stores 122 and 128 must be capable of storing four hundred different binary coded line and trunk designations in any one of thirty-two separate time positions or slots.

To provide this, the calling line store 122 (FIGS. 3 and 4) includes ten identical delay line storage units or registers 400–409 each comprising an input gate 420, a delay line 421, and an output gate 422. The channels 400, 401, 402 and 403 represent the binary digits "1," "2," "4" and "8," respectively, in the units order so that a pattern of signals circulating in the storage units 400–403 in the same time slot provides a binary coded representation of the units digit of the calling line designation. Similarly, the register units 404, 405, 406 and 407 represent the binary digits "1," "2," "4" and "8," respectively, in the tens order. The patterns of circulating pulses in identical time positions in the storage units 404–407 provide binary coded representations of the values of the tens digits of the calling line or trunk designations. In a similar manner, the delay storage units 408 and 409 represent the binary digits "1" and "2" in the hundreds order and provide a binary coded representation of the hundred digits of the designations of the calling lines and trunks.

To store a calling line or trunk number in the storage units 400–409, a negative enabling potential is applied to the uppermost of the input leads to the gates 420 in accordance with the binary digits forming the decimal line or trunk designation, and a negative pulse is applied to the lowermost enabling lead of all of these gates in the time position or slot in which the calling line or trunk number is to be stored. In those of the gates 420 in which both of the input leads are at a negative potential, a negative-going pulse is applied to the input inverter of the related delay line 421 so that a pattern of pulses pass through these delay lines in identical time positions. The delay of each of the delay lines 421 is set at the 80 microseconds duration of a single time reference frame. Thus, at the end of an 80 microsecond delay, the output inverters of the delay lines 421 apply a pattern of negative-going pulses to the output gates 422 corresponding to the binary coded representation of the decimal designation of the calling line or trunk. This pattern of negative-going pulses is used in other portions of the system as an identification of the calling line stored in this particular time slot.

In order to circulate this pattern of pulses in the calling line store 122, the outputs of the gates 422 are returned to the upper enabling inputs of the input gates 420. Thus, these gates are again partially enabled so that the completion of their enabling by the proper time slot pulse causes the stored calling line or trunk number to be circulated through the delay line storage units 400–409. This operation continues until such time as the negative-going time slot pulse is removed from the lowermost ones of the enabling leads for the gates 420. If these leads are held at ground potential, the circulation of the stored binary pattern is interrupted, and the stored calling line or trunk number is effectively erased from the storage units 400–409.

The terminating line store 128 (FIGS. 7, 8, 14 and 15) also includes ten delay line storage or register units 700–706 and 1401–1403 which continuously circulate binary coded signals representing the decimal designations of the called lines. The units 700–703 store the units digits of the terminating line designation in binary form and represent the binary digits "1," "2," "4" and "8," respectively. The storage units 704–706 and 1401 store the decimal tens digit of the terminating line designation in binary form and represent the binary digits "1," "2," "4" and "8," respectively. The remaining two channels 1402 and 1403, which represent the binary digits "1" and "2," receive the decimal hundreds digit of the terminating line designation.

Each of the storage units 700–706 and 1401–1403 includes a plurality of input gates 711, 712 and 713, a delay line 714 having an 80 microsecond or one frame time delay, a plurality of output gates 715 and 716 and an output flip-flop 717. The registers 700–706 and 1401 also include an additional input gate 710. When a terminating line designation is to be stored in the terminating line store 128, one of the inputs to the gates 711 in a proper combination of the units 700–706 and 1401–1403 is provided with a negative potential which is forwarded to the upper input of the gate 713. The other input of all of the gates 713 is supplied with a negative-going pulse in the time position in which the designation is to be stored. This causes the outputs of the conditioned ones of the gates 713 to drop to a negative potential so that the input inverters of the delay lines 714 store a pattern of pulses representing the binary coded designation of the terminating line. At the end of one time frame, the output inverters in the triggered delay lines are simultaneously operated to supply a pattern of negative-going pulses to the lowermost inputs of some of the gates 715 representing the binary coded designation of the called line. If the stored designation is to be circulated in the storage units 700–706 and 1401–1403, the upper inputs of all of the gates 715 are enabled so that a pattern of negative pulses is returned to the uppermost inputs of the gates 711. This permits the stored designation to be continuously circulated through the delay lines 714 in selected time slots. Obviously, the stored designation can be erased by disabling either one of the gates 713 or 715 in the time slot in which the called line designation is to be erased.

During normal operation of the private branch exchange, each of the idle lines and trunks is examined in sequence during any available idle time slot to check for the presence of a calling condition. The digit detector and time slot allotter 120 (FIGS. 11–13) includes means for finding and seizing an idle time slot that can be used for determining the presence of a calling condition on any line or trunk and means for then signaling the calling line store 122 to connect an idle line or trunk to the line data highway 112 to permit the digit detector and time slot allotter 120 to make a check for "on-hook" and "off-hook" conditions on the connected line. To accomplish this, the digit detector and time slot allotter 120 includes a busy time slot store comprising a delay line 1340 having a one frame time delay. The busy time slot store includes, among other components, a pair of input gates 1330 and 1332, the delay line 1340, and an output gate 1326. All of the time slots that are being used in extending communication paths are stored in the delay line 1340 and are continuously recirculated through the gates 1330 and 1332 which connect the output of the delay line 1340 with its input. The output of the gate 1332, in addition to triggering the input inverter of the delay line 1340, also forwards a negative pulse through the gate 1326 to one input of a half-adder 1344. Thus, this input of the half-adder is provided with a negative pulse in each of the time slots that is in use.

The other input to the half-adder 1344 is supplied with clock pulses from the generator. Whenever a negative-going clock pulse appears in a time slot that is idle, as indicated by the absence of a negative pulse from the delay line 1340 on the other input lead to the half-adder 1344, a negative-going pulse appears at the output of this component which is forwarded through a pair of gates 1346 and 1348 to the input of a delay line 1350 providing a time slot allotting store. The delay line 1350 has a one frame delay period so that the idle time slot will appear at the output inverter of the delay line 1350 after a one time frame delay. The trailing edge of the negative pulse provided at the output of the gate 1348 operates a flip-flop 1356 to its set condition so that a ground potential is applied to the lowermost input of the gate 1346 to prevent the circulation of any other time slots in the delay line 1350. The setting of the flip-flop 1356 also partially enables a gate 1360.

The trailing edge of the pulse provided at the output of the gate 1348 is also forwarded to the calling line store 122 to cause this circuit to determine the idle or busy condition of the next line or trunk to be scanned. More specifically, the calling line store 122 (FIGS. 3 and 4) includes a counter that is operated step-by-step under the control of pulses from the gate 1348 to successive settings representing the designations of all of the lines and trunks in the private branch exchange. The output of this counter is used to control the performance of the idle-busy test on a selected line or trunk, to provide signals to the storage units 400–409, and to control the calling line and trunk matrix 124 so that the selected line or trunk is momentarily connected to the speech and data highways. The counter comprises ten flip-flops 300–309 that are interconnected to be operated step-by-step under the control of the trailing edges of the pulses supplied at the output of the gate 1348. The flip-flops 300–303 represent the binary digits "1," "2," "4," and "8," respectively, and are operable to settings representing the value of the decimal units digit of the calling line or trunk designation. The flip-flops 300–303 are connected for counting operation in a normal binary progression except that a gate 371 is provided for resetting the flip-flops 300–303 to a normal condition at the end of a count of ten. The flip-flop 303 provides an operating signal to the flip-flop 304 after ten input signals have been counted by the flip-flops 300–303.

The flip-flops 304–307 represent the binary digits "1," "2," "4" and "8" and are operable to settings representing the value of the tens digit of the decimal designation of a calling line or trunk. The flip-flops 304, 305, 306 and 307 are connected for counting operation in a normal binary progression except that a gate 372 is provided for resetting the flip-flops 304–307 to a normal condition following the counting of ten input signals. At this time, the flip-flop 307 provides an operating signal to the flip-flop 308. The flip-flops 308 and 309 represent the binary digits "1" and "2" and count in normal binary progression to a setting representing the value of the hundreds digit of the decimal designation of the calling line or trunk.

Therefore, the setting of the counter including the flip-flops 300–309 at any given instant provides a binary coded representation of the decimal designation of a calling line or trunk. In the private branch exchange illustrated in the drawings, three hundred lines and up to one hundred trunks are provided. In assigning decimal designations to these lines and trunks, the settings of the counter representing "0"–"99" are assigned to the trunks and the designations "100"–"399" are assigned to the lines. It should be noted that the decimal designations assigned to the lines and trunks by the settings of the counter including the flip-flops 300–309 need not and, in the illustrated system, do not correspond to the directory numbers that are dialed to extend connections to these lines or trunks.

When the trailing edge of the negative-going pulse at the output of the gate 1348 is applied to the two inputs to the flip-flop 300, the flip-flops 300–309 are operated to a pattern of alternate conductive conditions forming a binary representation of the decimal designation of a given one of the lines or trunks. In the ones of the flip-flops 300–309 that are operated to a set condition, a negative enabling potential is applied to the uppermost input of a corresponding one of ten gates 310–319. The outputs of these gates are used to store a calling line or trunk designation in the delay storage units 400–409. The pattern of negative potentials provided at the output of the flip-flops 300–309 is also supplied to one group of the inputs of each of two groups of half-adders 320–329 and 340–349. The half-adders 320–329 perform an idle-busy test to determine whether the line or trunk represented by the setting of the counter is engaged as a calling line in a communication path, and the half-adders 340–349 perform the same test to determine whether the line or trunk represented by the settings of the flip-flops 300–309 is the called circuit in an established communication path.

More specifically, the second group of inputs to the half-adders 320–329 is connected to the output gates 422 in the storage units 400–409, and the second group of inputs to the half-adders 340–349 is connected over a cable 370 to the outputs of the delay lines 714 in the storage units 700–706 and 1401–1403 in the terminating line store 128. Thus, the half-adders 320–329 compare the calling line or trunk number represented by the settings of the flip-flops 300–309 against all of the line and trunk designations stored in the calling line store 122, while the half-adders 340–349 compare the settings of the flip-flops 300–309 against all of the line and trunk designations stored in the terminating line store 128. Since the pattern of potentials provided at the outputs of the flip-flops 300–309 persists for an entire frame, the half-adders 320–329 and 340–349 successively compare the setting of the counter against all of the designations stored in all of the time slots in both the calling time store 122 and the terminating line store 128.

So long as the inputs to the exclusive "OR" gates 320–329 and 340–349 are opposite, the outputs of these gates continuously apply a negative potential to individually connected ones of a plurality of gates 330–339 and 350–359. If, during any time slot within the frame, the line or trunk designation represented by the setting of the counter corresponds exactly with one of the line or trunk designations circulating in the calling line store 122 or the terminating line store 128, the output of one of the half-adders 320–329 and 340–349 becomes more positive and causes the output of an "AND" gate 440 to become more positive. The output of this gate is applied to the lower input of a half-adder 1362, the other input of which is supplied with clock pulses. So long as the designation stored in the flip-flops 300–309 does not correspond with the designation of a line or trunk that is in use, both of the inputs of the half-adder 1362 remain at a negative potential, and the output of this component remains at ground potential. However, when a coincidence between the setting of the counter and a stored designation occurs, the positive output of the gate 440 causes the output of the half-adder 1362 to drop to a negative potential during the time slot in which the busy condition is detected. Since the gate 1360 has been partially enabled by the setting of the flip-flop 1356, the negative pulse at the output of the half-adder 1362 is supplied through the gate 1360, and the positive-going trailing edge of this pulse sets a flip-flop 1358.

The setting of the flip-flop 1358 disables a gate 1354 connected to the output of the delay line 1350 and partially enables a gate 1352 that is also connected to the output of the delay line 1350. Accordingly, when the idle time slot stored in the delay line 1350 reaches the output inverter, the negative-going pulse is forwarded through only the gate 1352 to the input of the gate 1348. This provides a negative-going pulse in the idle time slot for triggering the input inverter to the delay line 1350 so that this idle time slot again passes through the delay line. In addition, the trailing edge of the negative-going pulse at the output of the gate 1348 advances the counter provided by the flip-flops 300–309 a single step so that the line or trunk previously determined to be in a busy condition is not re-examined, and the calling line store 122 is conditioned to check the idle or busy condition of the line or trunk identified by the next designation. The trailing edge of the negative-going pulse at the output of the gate 1352 resets the flip-flop 1358 to its normal condition in which the gate 1354 is partially enabled and the gate 1352 is disabled.

Assuming that the line or trunk circuit represented by the next setting of the counter including the flip-flops 300–309 is in an idle condition so that the half-adder 1362 does not set the flip-flop 1358 during the interval in which the free time slot is passing through the delay line 1350, the negative-going pulse provided at the output inverter of the delay line 1350 provides a negative-going pulse at the output of the gate 1354. The trailing edge of this pulse resets the time slot check flip-flop 1356 so that the gate 1346 is enabled to permit the next idle time slot to be circulated in the delay line 1350. The negative-going pulse at the output of the gate 1354 is also forwarded through the gate 1326 to a time slot busy conductor or bus to provide a temporary indication of the busy condition of the seized time slot. The pulse from the gate 1354 is also forwarded to the lower enabling input of all of the gates 310–319 so that the setting of the counter including the flip-flops 300–309 is transferred to and stored in the storage units 400–409.

More specifically, when the negative-going pulse in the seized time slot is applied to the gates 310–319, those of the gates that are connected to set flip-flops in the group 300–309 are fully enabled so that negative-going pulses are applied to the corresponding ones of the inputs of the ten gates 422. This provides a pattern of negative-going pulses that is returned to the inputs of the ten gates 420. The other inputs to these ten gates are connected to the output of the gate 1326. Thus, those of the gates 420 that represent the binary coded decimal designation of the seized line or trunk are fully enabled to provide negative-going pulses which are applied to the input inverters of the proper combination of the delay lines 421. This stores the designation of the selected idle line or trunk in the storage units 400–409 of the calling line store 122. Accordingly, the digit detector and time slot allotter 120 has determined the idle or busy condition of a line or trunk in the fixed scanning sequence of the counter including the flip-flops 300–309, and the decimal designation of this line or trunk has been stored in binary form in the storage units 400–409 in the seized time slot which is now marked as busy.

OPERATION OF THE SYSTEM TO ESTABLISH A COMMUNICATION PATH BETWEEN TWO LINE CIRCUITS

In the typical circuit operation set forth below, it is assumed that a call is to be extended from the line circuit 102 to the line circuit 100. The line circuit 102 is arbitrarily designated as line circuit number "380," which represents the position of this line circuit in the scanning cycle of the counter including the flip-flops 300–309, and is assigned a directory number "380." The line circuit number "380" indicates that the line circuit 102 is connected to the speech highway 110 and the line data highway 112 in the three hundred and eighty stepping position of the counter including the flip-flops 300–309. The directory number assigned to the line circuit 102 is arbitrarily chosen to correspond to the position of this line circuit in the scanning cycle of the counter. The line circuit 100 is assumed to be identified by a line circuit number "209" and a directory number "609." The line circuit number indicates that the line circuit 100 is connected to the speech highway 110 and the line data highway 112 in the two hundred and ninth position in the scanning cycle of the counter. The directory number "609" indicates that the line circuit 100 is reached by dialing this particular designation.

Since the call is to be extended from the line circuit 102, it is assumed that the circuit 120 seizes an idle time slot in the manner described above and advances the counter in the circuit 122 to a setting in which the flip-flops 307–309 are set to represent "380" in binary form. If the line 102 tests idle, the gates 310–319 are enabled in the seized time slot, and the gates 317–319 supply negative-going pulses through the gates 422 to the input gates 420 of the storage units 407–409. This stores the calling line number in the store 122. The negative-going pulses from the gates 317–319 are also applied to the lowermost three of ten gates 423 shown in FIG. 4. The other inputs to these gates are normally enabled from the output of a gate 430 so that the lowermost three of ten inverters 424 are momentarily rendered conductive in the time slot assigned to the line circuit 102 to provide positive-going pulses at their output. The outputs of the ten gates 423 and the ten inverters 424 are connected to the calling line and trunk matrix 124 (FIGS. 5 and 6). The signals provided by the gates 423 and the inverters 424 control the matrix 124 to connect the line circuit represented by the designation stored in the calling line store 122 to the speech highway 110 and the line data highway 112 to permit the "on-hook" or "off-hook" condition of this line to be examined by the circuit 120.

More specifically, the calling line and trunk matrix 124 includes ten "AND" gates 500–509 representing the decimal unit digits "0" and "1"–"9," respectively, ten "AND" gates 520–529 representing the decimal tens digits "0" and "1"–"9," respectively, and four "AND" gates 510–513 representing the decimal hundreds digits "0" and "1"–"3," respectively. Only a single gate in each of the groups of gates 500–509, 510–513 and 520–529 is enabled in any given time slot under the control of the designation stored in the calling line store 122.

Since the value of the tens digit of the line to be scanned is "8," the negative outputs of the three inverters representing the tens digit "1," "2" and "4" enables three of the inputs of the gate 528 and the fourth input of this gate is enabled by the negative pulse appearing at the output of the gate 423 in the storage unit 407. Thus, a negative-going pulse appears at the output of the gate 528 which is applied to three gates 600, 601 and 602 representing the tens digit "8." The matrix 124 also includes nine other groups of three gates, such as four groups 530–532, 533–535, 536–538 and 603–605, representing the tens digits "0," "1"–"7" and "9," respectively. These other groups of gates are each enabled under the control of one of the gates 520–527 and 529. Thus, only the group of three gates 600–602 representing the tens digit "8" is enabled by the gate 528 at this time.

The binary coded value of the hundreds digit is applied to the gates 510–513 under the control of the lowermost two gates 423 and the lowermost two inverters 424 shown in FIG. 4 which provide an output from the storage units 408 and 409. Since the value of the hundreds digit is "3," both oft he inverters 424 provide positive-going pulses and the outputs of the gates 423 provide negative-going pulses. The positive-going pulses from the outputs of the inverters 424 disable the gates 510–512, while the negative-going pulses appearing at the outputs of the gates 423 enable only the gate 513 representing the hundreds digit "3." The outputs of the gates 510–513 are connected to the gates 530–538 and 600–605 so that only one of each of the groups of three tens digit gates is enabled in accordance with the value of the hundreds digit. Since the gates 601–602 are enabled by the tens digit "8," the negative-going pulse provided at the output of the gate 513 completes the enabling of only the gate 602 representing the combined hundreds and tens digits "38." The output of the gate 602 drops to a negative potential and partially enables ten gates 560 representing the line circuits having this combination of hundreds and tens digits.

The matrix 124 includes three hundred gates 560, each individual to one of the line circuits, and one hundred gates 560, each individual to one of the trunk circuits. Each of the gates 560 is arbitrarily identified by a three digit designation corresponding to the scanning position of the line or trunk circuit in the cycle of operation of the counter including the flip-flops 300–309. In FIGS. 5 and 6, the designations of certain of the gates 560 are shown enclosed in quotation marks adjacent the related gates. The gate 560 representing the calling line circuit 102 includes an output connected to one of the inputs to the "OR" gate 214 in the line circuit 102. Thus, this gate is partially enabled by the translation of the hundreds and tens digits of the designation.

To complete the enabling of a single calling circuit by the matrix 124, the value of the stored units digit is used. As set forth above, the value of the units digit is "0." Thus, the four gates 423 connected to the outputs of the units 400–403 remain at a more positive potential, and the outputs of the four related inverters 424 remain at a negative potential. The outputs of the gates 423 and the inverters 424 are applied to the ten units digit gates 500–509. Since the four inverters 424 are in a nonconductive state, four of the inputs to the "0" representing gate 500 are enabled, and all of the remaining gates 501–509 are inhibited because at least one input thereto is connected to ground by one of the gates 423. Because the value of the units digit is "0," no negative-going pulses appear at the outputs of any of the gates 423, and the delay lines cannot be used to provide a negative-going pulse representing this units digit. Accordingly, the fifth input to the gate 500 is connected to the source of clock pulses. When the clock pulse in the time position in which the scanned line designation is stored appears, the output of the gate 500 provides a negative-going pulse that is coupled to the forty gates 560 in the matrix having a units digit "0." Since the gate 560 representing the line "380" is partially enabled, the negative-going pulse at the output of the gate 500 completes the enabling of only this particular gate 560 so that a negative pulse is forwarded through the gate 214 to the blocking oscillator gate 212 and the data gate 216 in the line circuit 102. Thus, when the designation of the line to be scanned is first applied to the storage units 400–409 in the calling line store 122, the selected line circuit, such as the circuit 102, is connected to the line data highway 112 and the speech highway 110 in the allotted time position to make the first check for the presence of an "on-hook" or "off-hook" condition.

The presence of an "on-hook" or "off-hook" condition is detected by a seize detector gate comprising a half-adder 1328 in the digit detector and time slot allotter 120. One input of the half-adder 1328 is connected to the source of clock pulses, and the other input to the gate 1328 is connected to the output of an "OR" gate 1104, one input of which is connected to the output of an "AND" gate 1102. Two of the inputs to the gate 1102 are normally provided with a negative enabling potential, and the third input to the gate 1102 is connected to the line data highway 112. If the line circuit 102 is "on-hook" to indicate that it is not calling, the data gate 216 is enabled, and a negative-going time slot pulse is coupled from the gate 560 through the gates 214 and 216 to the highway 112 in the allotted time position to complete the enabling of the gate 1102. The negative-going pulse produced at the output of the gate 1102 is forwarded through the gate 1104 to the half-adder 1328. Since the clock pulse source provides a negative-going pulse at the other input of this half-adder, its output remains at a more positive potential and nothing further occurs.

At the end of a one time frame delay period, the designation inserted into the calling line store 122 is again applied to the matrix 124 so that a second time slot pulse is forwarded through the gate 214 to the data gate 216. If the selected line to be scanned remains in an "on-hook" condition, the negative pulse is again forwarded through the gates 1102 and 1104 to the input of the half-adder 1328 so that its output remains at the more positive potential. This output of the half-adder 1328 produces no useful result. However, the enabling of the input gates 420 in the storage units 400–409 is dependent on the provision of a negative-going pulse in the time slot in which the line or trunk circuit designation is stored. Since the seized time slot pulse for enabling these gates was supplied by the gate 1354 only at the initial readout from the flip-flops 300–309, the gates 420 are now inhibited, and the stored designation is erased from the calling time store 122 because an "off-hook" condition has not been detected on the calling line 102. Thus, the stored designation "380" in the assigned time slot is erased, and the seized time slot is released. The calling line store 122 now operates to store the next succeeding idle line or trunk designation as soon as the digit detector and time slot allotter 120 selects the next idle time slot.

Assuming however, that the extension of the call from the line circuit 102 to the line circuit 100 has been initiated by placing the line circuit 102 in an "off-hook" condition, the first negative-going time slot pulse forwarded from the gate 560 to the gates 214 and 216 is not applied to the data highway 112 because the gate 216 is inhibited by the station 210 in its "off-hook" condition. Thus, the gates 1102 and 1104 apply a more positive potential to the connected input of the half-adder 1328, and the negative-going pulse supplied by the clock pulse source in the position of the seized time slot causes the half-adder 1328 to generate a negative-going output pulse that is coupled through the gate 1330 to the gate 1332. The output of the gate 1332 supplies a negative-going pulse in the seized time slot to the input inverter of the busy time slot store delay line 1340. Thus, the seized time slot in which an "off-hook" condition on the line circuit 102 has been detected is now continuously circulated in the delay line 1340 in the manner described above. The circulation of a signal in the delay line 1340 in the time slot assigned to the line circuit 102 operates the calling line store 102 to continuously circulate the designation of this line in the assigned slot. This, in turn, controls the matrix 124 to continuously connect the line circuit 102 to the highways 110 and 112 in the assigned time slot. Each time that the delay line 1340 supplies a negative-going pulse at the output of the gate 1332 in the time slot allotted to the line circuit 102, this pulse is forwarded through the gate 1326 to the time slot busy conductor. This conductor is connected to all of the gates 420 and enables these gates to permit the circulation of the designation "380" in the storage units 400–409. The units 400–409 continuously pulse the calling line and trunk matrix 124 in the seized time slot to connect the line circuit 102 to the line data highway 112 and the speech highway 110 through the gates 216 and 212, respectively. Thus, the detection of an "off-hook" condition on the line selected by the counter in the circuit 122 causes the connection of the selected line circuit 102 to the highways 110 and 112. The negative-going pulse on the time slot busy conductor in the position assigned to the circuit 102 is also applied to one of the inputs to the half-adder 1344 so that this time slot cannot be seized for use in extending additional connections.

The digit detector and time slot allotter 120 includes means for now supplying dial tone to the calling line circuit 102 to indicate that the dialing operation can be initiated. More specifically, each one of the time slots signals stored in the busy time slot delay line 1340 is applied to one input of a half-adder 1370. The other input of this half-adder is connected to the output inverter of a delay line 1368 in which are continuously circulated pulses in all of the busy time slots from which at least one dial impulse has been received. Thus, as soon as the time slot assigned to the line 102 is stored in the delay line 1340, indicating that this line is "off-hook," the upper input to the half-adder 1370 is provided with a negative-going pulse in this slot. Since at least one dial impulse has not been received from the line 102, the lower input to the half-adder 1370 remains at ground potential in the time slot assigned to this line. This combination of input potentials to the half-adder 1370 produces a negative-going output pulse in the time slot assigned to the line circuit 102 which is forwarded to a blocking oscillator or audio gate 228 in the tone generators 106. It should be noted that if a time slot is not busy, i.e., is not stored in the delay line 1340, and is not stored in the delay line 1368, both of the inputs to the half-adder 1370 remain at a more positive potential during the time slot. This results in a more positive or ground output from the half-adder 1370 that is not effective to open the gate 228.

The gate 228 is connected between the speech highway 110 and a dial tone generator 230. When a negative pulse in the time slot assigned to the line circuit 102 is applied to the gate 228, the dial tone generator 230 is connected to the speech highway 110. Since the voice gate 212 is also opened in this time slot by the pulse provided by the calling line and trunk matrix 124, the station 210 and the dial tone generator 230 are placed in communication so that dial tone is returned to the station 210 to advise the subscriber that the dialing operation can be initiated. The application of dial tone to the calling line circuit 102 continues until such time as a pulse is stored in the delay line 1368 in the time slot assigned to the line 102.

As described above, the data gate 216 is arranged so that the time slot signals supplied through the gate 214 are applied to the line data highway 112 when the corresponding station is in an "on-hook" condition. This "on-hook" condition is also provided by the interruptions in the line loop produced by dialing. Accordingly, a dialed digit appears on the line data highway 112 as a number of groups of negative-going time slot pulses equal to the value of the dialed digit. The digit detector and time slot allotter 120 includes counting means controlled by the bursts of time slot pulses applied to the line data highway 112 for determining the values of the dialed digits and for differentiating between successive dialed digits. However, since a dial impulse has a length in the order of tens of milliseconds and since the time slot pulses appear once during each 80 microsecond time frame, the capacity of the counting equipment provided in the digit detector and time slot allotter 120 would be excessively large if each time slot pulse is counted. Accordingly, the circuit 120 includes means by which only each fiftieth time slot pulse appearing on the line data highway 112 is effective to advance the digit detecting counter.

To accomplish this, the circuit 120 includes a delay line 1308 having a delay interval equal to one time frame. A half-adder 1300 is supplied with a negative-going pulse from the clock pulse source in any given time position when the private branch exchange is first placed in operation. The application of this negative-going pulse controls the half-adder 1300 to provide a negative-going pulse at its output that is coupled through a pair of gates 1302 and 1306 to the input inverter or amplifier of the delay line 1308. Thus, this negative pulse starts its passage through the delay line 1308. The negative-going pulse at the output of the gate 1306 is also forwarded through a hold circuit 1322, which can comprise an integrating circuit, to the input of a monostable flip-flop 1320 that has a delay interval of around 100 microseconds. The hold circuit 1322 sets the monostable multivibrator 1320 so that the enabling potential for the gate 1302 is removed and a gate 1304 is partially enabled. When the negative pulse traversing the delay line 1308 is applied to its output inverter, a negative-going pulse is returned to one of the inputs of the half-adder 1300. The other input it held at a negative potential by the clock pulse source, and the lower output of the gate 1300 supplies a negative-going pulse through the gates 1304 and 1306 to maintain the circulation of the selected time slot pulse in the delay line 1308. Since the delay interval of the monostable multivibrator 1320 is greater than the 80 microsecond frame interval, the multivibrator 1320 is held in a set condition in which the gate 1302 is blocked and the gate 1304 is opened by the output pulses from the gate 1306.

The negative-going pulse provided at the output inverter of the delay line 1308 is forwarded through a gate 1312, and the trailing edge of this negative-going pulse sets a flip-flop 1314 so that a negative enabling potential is forwarded to three "AND" gates 1116, 1118 and 1124. When the next negative-going pulse is provided at the output of the delay line 1308 after a one frame time delay, the trailing edge of the negative-going pulse provided at the output of the gate 1312 resets the flip-flop 1314 to remove the enabling potential applied to the gates 1116, 1118 and 1124. The trailing edge of this pulse also sets a monostable multi-vibrator 1318 so that an inverter 1316 is rendered conductive to apply ground potential to one input of the gate 1312. The monostable multivibrator 1318 has a delay interval of 4 milliseconds. Thus, the gate 1312 remains disabled for a period of time equal to fifty frame periods. When the multivibrator 1318 restores to render the inverter 1316 non-conductive, the gate 1312 is again enabled so that the flip-flop 1314 is actuated to its set condition for one frame. Thus, the gates 1116, 1118 and 1124 are provided with a negative enabling potential once during each fifty frames. Accordingly, only one out of every fifty time slot pulses applied to these gates can be effective to control these gates.

In the event that the time slot stored in the delay line 1308 is to be made busy so as to prevent its use in extending connections, a gate 1310 can be connected between the time slot busy pulse conductor and the output inverter of the delay line 1308. This marks the time slot circulating in the delay line 1308 as busy to the remainder of the system and prevents its use in extending communication paths.

The impulse counter that is advanced a single step for each fifty time slot pulses received from the line data highway 112 comprises seven identical delay line storage or counter units 1200–1206 representing the binary digits "1", "2", "4", "8", "16", "32" and "64". Each of the storage units 1200–1206 includes a half-adder 1211 having one output connected through an "AND" gate 1212 to the input inverter of a delay line 1213 that has a delay interval equal to the length of the frame. The output inverter of each delay line 1213 is connected to one of the inputs of its input half-adder 1211. The other input to the gate 1211 in the counter unit 1200 is connected to the output of the gate 1118, and the output of the first half-adder 1211 is connected to the lower input of the next succeeding exclusive "OR" gate 1211. In a like manner, the lower output of each of the half-adders 1211 is connected to the lower input of the next succeeding half-adder 1211.

When the subscriber at the calling line circuit 102 dials the first or hundreds digit "6" of the directory number of the called line circuit 100, the interruption in the line circuit enables the gate 216 so that the time slot pulses provided by the gate 214 are applied to the line data highway 112. These negative pulses are forwarded through the gates 1102 and 1104 to one of the inputs of the gate 1118. Another input of the gate 1118 is enabled by the negative-going pulses on the busy time slot conductor in the time slot seized by the line circuit 102. The remaining input to the gate 1118 is connected to the output of the flip-flop 1314. Thus, the gate 1118 is enabled once for each fifty time slot pulses applied thereto. When the gate 1118 is fully enabled, a negative-going pulse is applied to the lower input of the half-adder 1211 in the unit 1200. Since the upper input to this half-adder is at ground potential, the upper output of the half-adder 1211 provides a negative-going pulse that is coupled through the gate 1212 to be applied to the input inverter of the delay line 1213. Thus, a pulse is stored in the delay line 1213 of the storage or counter unit 1200 in the time slot assigned to the calling line circuit 102. This pulse circulates through the line 1213 for the remainder of the fifty time frames through the gates 1211 and 1212 because the lower input of the half-adder 1211 is held at ground potential.

When the second negative-going pulse is applied to the lower input of the half-adder 1211 in the counter unit 1200 by the gate 1118, the signal circulating in the delay line 1213 is applied as a negative pulse to the upper input of this half-adder. Thus, the upper output of this unit remains at ground potential so that a signal no longer circulates in the counter unit 1200. However, the application of negative signals to both of the inputs to the half-adder 1211 is this counter unit provides a negative pulse on its lower output that is forwarded to the lower input of the half-adder 1211 in the second counter unit 1201. Since the upper input of this half-adder is at ground potential, the upper output of the half-adder 1211 in the counter unit 1201 provides a negative-going pulse that is coupled through the gate 1213 to store a signal in the delay line 1213 in the second unit 1201 in the time slot assigned to the calling line circuit 102. When this pulse reaches the output inverter of the delay line 1213, it is recirculated through the line 1213 and a negative-going pulse is supplied to one input of an "OR" gate 1164.

The negative-going pulse at the output of the gate 1164 is forwarded through a gate 1162 to render an inverter 1160 momentarily conductive. The output of the inverter 1160 is connected to a plurality of gates 1141 in another delay line counter, and this positive-going pulse serves to erase any signals circulating in this storage or counter unit in the time slot assigned to the calling line 102.

The negative-going pulse at the output of the delay line 1213 in the storage unit 1201 is also forwarded through a gate 1364 to provide a negative-going pulse at one input of the gate 1366. Another input of this gate is connected to a fixed negative potential, and the third input of this gate is supplied with a negative-going pulse from the busy line storage delay line 1340 in the time position of the calling line circuit 102. Thus, the gate 1366 is fully enabled so that a negative-going pulse is applied to the input inverter of the delay line 1368. When this pulse reaches the output inverter of the delay line 1368, this inverter applies a negative-going pulse to the lower input of the half-adder 1370. The upper input of this half-adder is provided with a negative-going pulse in the time slot assigned to the calling line circuit 102 by the busy time slot storage delay line 1340. Thus, the half-adder 1370 applies ground potential to its output to render the gate 228 effective so that dial tone is no longer supplied from the generator 230 to the voice gate 212 in the calling line circuit 102. The time slot stored in the delay line 1368 in the time position assigned to the calling line 102 is continuously circulated in the line 1368 through the gates 1364 and 1366. Thus, the half-adder 1370 is provided with two negative inputs during each occurrence of the time slot assigned to the line 102, and the gate 228 remains ineffective to connect the dial tone generator 230 to the line circuit 102. Although the circuit is shown as storing the seized time slot in the delay line 1368 following the receipt of two operating signals from the gate 1118, it is obvious that the time slot pulse for terminating the application of dial tone to the calling circuit can be stored in the line 1368 at any other time within the operating range of the counter including the units 1200–1206.

This counter continues to operate in a normal binary counting progression in the manner described above for as long as the "on-hook" condition caused by the first dial impulse persists in the line circuit 102. After five operating signals have been received by the impulse counter representing an elapsed time of 20 milliseconds, the negative-going pulse provided at the outputs of the delay lines 1213 in the units 1200 and 1202 completes the enabling of a gate 1230 so that a negative-going pulse is forwarded to one input of an "OR" gate 1222 and the lower input of a half-adder 1250. The half-adder 1250 forms a part of one of four identical delay line register units 1240–1244 representing the binary digits "1," "2," "4" and "8," respectively. The units 1240–1244, which store the value of a dialed digit, each include the half-adder 1250, an input gate 1251, and a delay line 1252 having a delay interval equal to the length of the frame period. Since the upper input of the half-adder 1250 in the unit 1240 is at ground potential, the negative pulse applied to the lower input of this unit provides a negative-going pulse at its upper output that is forwarded through the normally enabled gate 1251 to store a pulse in the time slot of the calling line 102 in the delay line 1252 of the unit 1240 representing a binary digit "1." Thus, the first dial impulse in the first dialed or hundreds digit is now stored in the counter units 1240–1244 in the time position assigned to the calling line 102. Since this pulse is not stored until the "on-hook" condition due to the first dial impulse has persisted for 20 milliseconds, the improper operation of the counter units 1240–1244 due to spurious signals is prevented.

The negative-going pulse applied to the gate 1222 is forwarded through this gate to one input of a gate 1224. The other inputs to this gate are enabled so that a negative-going pulse is applied to the input inverter of a delay line 1228 having a delay interval equal to the length of one time frame. The negative-going pulses provided at the output of the delay line 1228 are returned to the input thereof through the gates 1222 and 1224 to maintain a pulse continuously circulating in the delay line 1228 in the time position assigned to the calling line 102. The output of the line 1228 is also applied to the input of an inverter 1232 so that this inverter is momentarily rendered conductive in the time position assigned to the calling line. When the inverter 1232 is rendered conductive, one of the inputs to the gate 1230 is elevated to ground potential so that this gate is inhibited. Thus, the storage units 1240–1244 cannot be further operated by the calling line 102 as long as a pulse remains circulating in the delay line 1228 in the time position assigned to this calling line. Since the stages 1200–1206 have a counting capacity of around 500 milliseconds, the time slot pulses provided during a single line break will not exceed the counting capacity of the counter.

At the end of the first dial impulse in the first dialed digit, the counter units 2100–1206 and the delay line 1228 are cleared to permit the impulse counter to be used in detecting the next dial impulse. More specifically, the negative-going pulses provided at the output inverter for the delay line 1228 are applied to one input of an inverter 1226. However, the other or emitter input to this inverter is concurrently supplied with a negative-going signal from the output of the gate 1104 so long as time slot pulses are applied to the line data highway 112 during the line break due to the first impulse of the dialed digit. When the line circuit 102 returns to an "off-hook" condition at the end of the first dial impulse, the negative-going signals are no longer applied to the lower input of the inverter 1226, and this inverter is rendered conductive by the next negative-going pulse produced at the output of the delay line 1228 in the time position assigned to the calling line circuit 102. When the inverter 1226 is rendered conductive, the gate 1224 is disabled to prevent the circulation of a pulse in the time slot assigned to the line circuit 102, and a gate 1220 is inhibited to remove the enabling potential for the plurality of gates 1212 in the counter units 1201–1206. This erases or clears these counter units in only the time slot assigned to the calling line 102.

The momentary conduction of the inverter 1126 in the time slot assigned to the calling line circuit 102 also renders an inverter 1234 momentarily nonconductive so that a negative-going pulse is forwarded through a gate 1122 to one input of a gate 1108. The other input of the gate 1108 is connected to the clock pulse source so that when a negative-going pulse in the same time position as that assigned to the line circuit 102 is applied to the gate 1108, a negative-going pulse is forwarded through a pair of gates 1110 and 1112 to the input inverter of a delay line 1114. The delay line 1114 has a delay interval equal to one time frame, and the pulses stored in this delay line are used to enable the counting of clock pulses to determine whether the interval following the first dial impulse is an interdigit interval or an interval separating two successive dial impulses. The negative-going pulse provided at the output inverter for the delay line 1114 is returned to the input of this delay line through a gate 1106, which is also driven by the clock pulse source, and the gates 1110 and 1112. Thus, the delay line 1114 continuously circulates a signal in the time position assigned to the calling line circuit 102 as soon as the first impulse of a dialed digit has been received by the digit detector and time slot allotter 120.

To differentiate between the absence of time slot pulses from the calling line circuit 102 due to the interval between successive dial impulses and the interval between successively dialed digits, the digit detector and time slot allotter 120 includes a five stage binary counter comprising five identical delay line counting units 1130–1134 for storing the binary digits "1," "2," "4," "8" and "16," respectively. Each of the units 1130–1134 includes an input half-adder 1140, an input gate 1141, and a delay line 1142 having a delay interval equal to one time frame. The half-adders 1140 in the counter units 1130–1134 are interconnected in the same manner as the half-adders 1211 in the counter units 1200–1206. The lower input to the half-adder 1140 in the first delay line storage unit 1130 is connected to the output of an "OR" gate 1120, one input of which is connected to the gate 1116. Another input to the gate 1116 is enabled by the flip-flop 1314 so that this gate provides an output signal only at the end of each fifty time frames. Another input of the gate 1116 is connected to the time slot busy pulse so that only signals appearing in a seized time slot can control the gate 1116. A third input to the gate 1116 is provided with a fixed negative enabling potential from the output of an inverter 1150, and the fourth input to the gate 1116 is connected to the output inverter of the delay line 1114.

At the end of each fifty frames, the negative-going pulse from the output of the delay line 1114 in the time position assigned to the calling line circuit 102 is forwarded through the gates 1116 and 1120 to operate the counter including the counting units 1130–1134 in a normal binary counting progression. This counter distinguishes between the interval between successive dial impulses and the interval between successive dialed digits by distinguishing between those delays that are greater than or less than 128 milliseconds. If the delay between the time slot pulses received from the line data highway 112 in the position assigned to the calling line circuit 102 is less than 128 milliseconds, the delay is assumed to be due to the time interval separating successive dial impulses. If this delay exceeds 128 milliseconds, it is assumed that the delay comprises an interdigit delay. This time delay of 128 milliseconds is provided by counting thirty-two input signals from the gate 1116.

In the illustrative example set forth above, the first dialed or hundreds digit of the directory number of the called line circuit 100 is "6." Thus, the delay following the first dial impulse is less than 128 milliseconds. Accordingly, when time slot pulses reappear at the input of the counter including the counter units 1200–1206, the storage of a signal in the storage unit 1201 in the time position assigned to the calling line 102 again causes the momentary conduction of the inverter 1160 in this time slot so that the storage units 1130–1134 are cleared and the enabling potential is removed from the gate 1112 in this time position. By inhibiting the gate 1112, the delay line 1114 is erased in the time position assigned to the calling line 102 and operating signals can no longer be applied through the gates 1116 and 1120 to the counter units 1130–1134. The digit detector and time slot allotter 120 is operated in the manner described above by the remaining five impulses of the first dialed digit so that the register comprising the register units 1240–1244 is operated to store a binary coded designation of the decimal hundreds digit "6." This digit is stored by circulating signals in the delay lines 1252 in the register units 1241 and 1242 in the time position assigned to the calling line circuit 102.

At the end of the dialing of the first or hundreds digit "6," the signal stored in the calling time slot in the delay line 1114 permits the counter including the counter units 1130–1134 to count to a setting representing the receipt of thirty-one successive operating signals. In this condition, a signal is stored in the delay line 1142 in all of the units 1130–1134. When the next or thirty-second pulse is received from the gates 1116 and 1120 indicating an elapsed time of 128 milliseconds, the lower output lead from the half-adder 1140 in the counter unit 1134 provides a negative-going pulse that is forwarded through a gate 1166 and the gates 1164 and 1162 to render the inverter 1160 conductive. This clears the counter stages 1130–1134 and the delay line 1114. The negative-going pulse at the output of the gate 1166 also renders the inverter 1168 momentarily conductive in the calling time slot so that the counter units 1200–1206 and the delay line 1228 are again cleared of information stored in the time slot assigned to the line circuit 102. The end-of-digit interval detected by the counter units 1130–1134 also causes the transfer of the dialed digit stored in the units 1240–1244 to the trunk finder 126.

More specifically, the negative-going pulse in the time slot assigned to the calling line circuit 102 provided at the output of the gate 1166 is forwarded to one input of a half-adder 1424 so that a negative-going pulse is applied to one input of an "AND" gate 1426. Two other inputs to the gate 1426 are held at a negative potential, and the fourth input is provided with a negative-going pulse from the busy time slot conductor in the time position assigned to the calling line circuit 102 through a gate 1444. Thus, a negative-going pulse is forwarded through an "OR" gate 1428 and applied to the input inverter of a delay line 1430. This pulse is stored in the delay line 1430 in the time position assigned to the calling line circuit 102 to indicate that the first dialed digit has been received from the calling line. The negative-going pulse provided at the output of the gate 1428 is applied to one input of a gate 1406, the other input of which is held at a negative potential by an inverter 1410. The gate 1406 provides a negative-going pulse in the time slot assigned to the calling line circuit 102 that is forwarded to one input of each of a plurality of "AND" gates 1640–1649 in the trunk finder 126 representing "0" and the digits "1"–"9." The remaining inputs of these gates are connected to the inputs and outputs of four inverters 1650–1653 representing the binary digits "8," "4," "2" and "1" in such a manner that binary coded signals applied to the inverters 1650–1653 are translated to energize a single one only of the decimal digit representing gates 1640–1649.

As described above, the value of the first dialed digit "6" is stored in the digit register comprising the unts 1240–1244 by circulating pulses in the time slot assigned to the calling line circuit 102 in only the units 1241 and 1242 representing the binary digits "2" and "4," respectively. When the negative-going pulse is developed at the output of the gate 1166, this pulse is also applied to one input of each of a plurality of output gates 1380–1383. One other input to each of these gates is connected to the output of one of the delay lines 1252, and the third inputs to these gates are connected to a negative potential. Thus, the gates 1381 and 1382 are fully enabled in the time slot assigned to the calling line circuit 102 so that negative-going pulses are supplied at the outputs of these two gates. The outputs of the gates 1380–1383 are connected over a cable 1396 to the inputs of the inverters 1650–1653 in the trunk finder 126. The outputs of the gates 1380–1383 are also connected through four "OR" gates 1388–1391 to the inputs of four inverters 1384–1387. The inverters 1385 and 1386 are energized by the signals supplied at the outputs of the gates 1381 and 1382 to apply a ground pulse in the time slot assigned to the calling line circuit 102 to the inputs of the gate 1251 in the storage units 1241 and 1242. This erases the first dialed digit "6" from the dialed digit register provided by the storage units 1240–1244.

The negative-going signals provided by the gates 1381 and 1382 render the inverters 1651 and 1652 conductive so that the gates 1640–1645, 1648 and 1649 are inhibited. The negative-going pulses in the calling time slot supplied by the gates 1406, 1381 and 1382 and the steady negative potential supplied by the inverter 1650 fully enable the gate 1646 representing the decimal digit "6" to provide a negative-going pulse at the output of the gate 1646 representing the translation of the binary code representing the first dialed digit.

The outputs of the gates 1640–1649, which represent a translation of the first dialed digit, are used to condition the system for the desired mode of operation, such as extending a call to an operator, extending a call to an outgoing trunk, establishing a conference circuit, or extending a call to a calling line. In the illustrative example referred to above, the call is to be extended from the calling line circuit 102 to a called line circuit 100. The called line circuit 100 is represented by a line circuit number "209" which represents the position of the line circuit 100 in the terminating line and trunk matrix 130 and is identified by a directory number "609." Thus, the first dialed or hundreds digit "6" of the directory number of the calling line circuit 100 must be converted to and stored as the hundred digit "2" representing the position of the called line circuit 100 in the termination line and trunk matrix 130.

To accomplish this, the outputs of the gates representing hundreds digits assigned to line circuits are connected over a cable 1650 to the inputs of the "OR" gates 711 in the storage units 1402 and 1403 in which the value of the first dialed or hundreds digit is stored in binary form. Since the first dialed digit is "6" in the illustrative example and since this digit is to be converted to a hundreds line number digit "2," the output of the gate 1646 is connected over the cable 1650 to one of the inputs of the "OR" gate 711 in the storage unit 1403. The negative-going pulse from the gate 1646 is forwarded through the gate 711 to one input of the gate 713 in the storage unit 1403. The other input of this gate is provided with a negative-going pulse in the time slot assigned to the calling line circuit 102 by the gate 1444. Accordingly, the gate 713 in the storage unit 1403 stores a pulse in the delay line 714 in the storage unit 1403 in the calling time position, and this signal is continuously circulated in this delay line through the related gates 715 and 711. Accordingly, the value of the dialed hundreds digit "6" has been converted into the digit "2" by the trunk finder 126, and this digit has been stored in the time position of the calling line circuit 102 in the hundreds digit storage units 1402 and 1403 of the terminating line store 128.

The digit detector and time slot allotter 120 now operates in the manner described above under the control of the time slot pulses applied to the line data highway 112 by the gate 216 to store the value of the second dialed or tens digit of the directory number of the called line circuit 100 in the dialed digit register including the storage units 1440–1444. Since the value of this digit is "0," a signal is stored in the delay line 1252 in the units 1241 and 1244 in the time slot assigned to the calling line circuit 102. In the interdigit interval following the dialing of the second digit, the counting components in the digit detector and time slot allotter 120 are restored to their normal position, as described above, and a negative-going pulse is again provided at the output of the gate 1166 which is forwarded to the lower input of the half-adder 1424 in the terminating line store 128.

The delay line 1430 now stores a pulse in the time position of the calling line circuit 102 which is returned to the upper input of the half-adder 1424. When the lower input of the half-adder 1424 receives the negative-going pulse in the time slot of the calling line circuit 102 from the circuit 120, the upper output of the half-adder 1424 is placed at a more positive potential so that the pulse in the time slot of the calling line circuit 102 is erased from the delay line 1430. At this same time, the lower output of the half-adder 1424 drops to a negative potential so that the output of a half-adder 1434 provides a negative-going pulse which is forwarded through an "AND" gate 1436 and an "OR" gate 1438 in the time slot assigned to the calling line circuit 102. This negative-going signal is applied to the input inverter of a delay line 1440 so that this delay line now stores a pulse in the calling time slot. The negative-going pulse at the output of the gate 1438 is also forwarded to one input of an "AND" gate 1404 and the input of the inverter 1410. This renders the inverter 1410 conductive so that the gate 1406 is inhibited to disable the translating gates 1640–1649 in the trunk finder 126. Since the time slot has been erased from the delay line 1430, the gate 1402 is not enabled, and the negative pulse provided at the output of the gate 1438 completes the enabling of the gate 1404, the other input of which is connected to a nonconductive inverter 1408. The output of the gate 1404 is extended to one set of inputs to the gates 710 in the storage units 704–706 and 1401 in which is to be stored the tens digit of the calling line designation. The other inputs to the gates 710 are connected to the outputs of the gates 1380–1383 over the cable 1396.

When the negative-going pulse is provided at the output of the gate 1166 in the manner described above, the gates 1380–1383 are enabled so that the negative-going pulses representing "0" are provided at the outputs of the gates 1381 and 1383. These negative-going signals are forwarded over the cable 1396 to the inputs of the gates 710 in the storage units 705 and 1401. The negative-going signals are forwarded through the gates 711 and 713 so that the delay lines 714 in the units 705 and 1401 now circulate pulses in the time position assigned to the calling line. This completes the storage of the second dialed or tens digits of the directory number of the called line circuit 100 in the terminating line store 128.

The digit detector and time slot allotter 120 is now controlled by the time slot pulses appearing on the line data highway 112 to store the value of the third dialed or units digit "9" in the storage units 1240–1244. This digit is stored by circulating signals in the calling time slot in the delay lines 1252 of the units 1240 and 1244. During the interdigit interval following the dialing of the third digit, the counting means in the circuit 120 are cleared in the manner described above, and the negative-going pulse at the output of the gate 1166 is again applied to the lower input of the half-adder 1424 in the time slot assigned to the calling line circuit 102. This signal provides a negative-going pulse at the upper output of this half-adder that is forwarded through the gates 1426 and 1428 to be stored in the delay line 1430. Thus, both of the delay lines 1430 and 1440 now store a pulse in the slot assigned to the calling line.

The negative-going pulse provided at the output of the gate 1428 is also applied to one input of the gate 1402 and the input of the inverter 1408. This places the inverter 1408 in a conductive condition to inhibit the gate 1404. The pulse circulating in the line 1440 in the calling time slot is applied to the gate 1402 and the inverter 1410 by the gate 1438. This pulse places the inverter 1410 in a conductive condition to inhibit the gate 1406. However, the negative-going pulses provided at the outputs of the gates 1428 and 1438 complete the enabling of the gate 1402 so that one input to each of the gates 710 in the storage units 700–703 is enabled. The other inputs of these gates are connected to the outputs of the gates 1380–1383. Since the value of the third dialed digit is "9," the gates 1380 and 1383 provide negative-going signals which are forwarded through the corresponding gates 710, 711 and 713 to store a signal in the time slot assigned to the calling line circuit 102 in the delay lines 714 in the storage units 700 and 703. Thus, the terminating line store 128 now stores a binary coded line circuit designation "209" identifying the called line circuit 100 in the time position assigned to the calling line circuit 102.

As set forth above, both of the delay lines 1430 and 1440 now store a pulse in the time position assigned to the calling line circuit. At the end of the time frame in which the third dialed or units digit "9" is stored in the terminating line store 128, the negative-going signals provided at the outputs of the inverters in the delay lines 1430 and 1440 control the half-adders 1424 and 1434 so that these pulses are recirculated through the lines 1430 and 1440. The negative-going pulses at the outputs of the delay lines 1430 and 1440 enable an "AND" gate 1432 so that a negative-going pulse in the calling time slot is forwarded through an "OR" gate 1374 to an inverter 1376. This inverter is rendered conductive in the calling time slot to inhibit the gates 1380–1383. This prevents additional signal that might be inadvertently supplied by the calling line circuit 102 from affecting the digits stored in the terminating line store 128.

The negative-going pulse in the calling time position at the output of the gate 1432 is also applied to one input of an "AND" gate 1418, the other inputs of which are held at a negative potential. Thus, the gate 1418 applies a negative-going pulse to the plurality of gates 716 in the storage units 700–706 and 1401–1403. The other inputs of the gate 716 are connected to the output inverters of the delay lines 714 so that those of the plurality of flip-flops 717 that are connected to delay lines 714 storing a pulse in the calling time position are operated to their set condition. The pattern of set and rest conductive conditions provided by the flip-flops 717 persists for a complete time frame and provides a means for checking the designation of the called line circuit 100 against all of the other designations stored in the calling line store 122 and the terminating line store 128 to determine the idle or busy condition of this line.

More specifically, the output of the normally grounded half of each of the flip-flops 717 is connected to one input of a corresponding half-adder 801, the other input of which is connected to the output inverters in the delay lines 714. The output of each of the half-adders 801 is connected through an "OR" gate 802 to one input of an "AND" gate 1510. Thus, the half-adders 801 provide a means for determining a correspondence between the designation of the called line circuit 100 and all of the other called circuit designations stored in the delay lines 714 in all of the time slots.

The outputs of the flip-flops 717 are also connected to one input of a plurality of half-adders 804, the other inputs of which are connected to the outputs of the delay lines 421 in the calling time store 122 over a cable 360. The outputs of the half-adders 804 are connected to another input of the "AND" gate 1510 through a plurality of "OR" gates 803. The half-adders 804 provide a means for comparing the designation of the called line circuit 100 with the designations stored in the delay lines 421 in the calling time store 122 in all of the time slots. The busy test circuit provided by the half-adders 801 and 804 operates in the same manner as the busy test means included in the calling line store 122 which is described in detail above.

If the designation stored in the conductive pattern provided by the flip-flops 717 does not coincide with the designation stored in any time slot in the calling line store 122 or the terminating line store 128, the output of the "AND" gate 1510 remains at a negative potential which is applied to one input of a half-adder 1512. The other input to the half-adder 1512 is supplied with negative-going pulses from the clock pulse source. Thus, the output from the half-adder 1512 remains at ground potential through the entire time frame if a busy condition is not detected. However, if a coincidence occurs between the designation stored in the flip-flops 717 and a designation stored in either the calling line store 122 or the terminating line store 128, the output of the gate 1510 rises toward a more positive potential in the time slot in which the busy condition occurs so that the output of the half-adder 1512 provides a negative-going pulse in this same time slot.

Referring back to the negative-going pulse provided at the output of the gate 1418 in the time slot assigned to the calling line circuit 102, this negative-going pulse is also applied to the input inverter of a time slot check store delay line 1526 so that this time slot is circulated through the delay line 1526 to provide the one time frame interval during which the busy test is made. The trailing edge of the negative-going pulse provided at the output of the gate 1418 also actuates a flip-flop 1420 to its set condition. In this condition, one of the inputs of the gate 1418 is held at ground potential so that the gate 1418 is inhibited to prevent the transfer of other designations from the delay lines in the terminating line store 128 to the flip-flops 717. The operation of the flip-flop 1420 also supplies a negative enabling potential to an "AND" gate 1514, the other input of which is connected to the half-adder 1512. The provision of the enabling potential to the gate 1514 enables the busy check operation.

In the event that a busy condition is detected in the manner described above, a negative-going pulse is applied by the half-adder 1512 to the upper input of the gate 1514 in the time slot in which the busy condition is detected. Since this gate is enabled by the flip-flop 1420, a negative-going pulse is applied to the upper input of a half-adder 1516. The other input to this half-adder is maintained at ground potential at the output inverter of the delay line 1526 except in the time slot assigned to the calling line. The negative-going pulse provided by the delay line 1526 in the time slot assigned to the calling line circuit 102 prevents the generation of a busy signal in the time slot in which the connection is being established.

The half-adder 1516, upon the occurrence of a busy condition in any time slot other than the one assigned to the calling line circuit 102, forwards a negative-going pulse through an "OR" gate 1518 to a busy check flip-flop 1520. The trailing edge of this pulse sets the flip-flop so that an enabling potential is applied to a gate 1530 and is removed from an "AND" gate 1528. At the end of the time frame in which the busy check is made, the negative-going pulse provided at the output inverter of the delay line 1526 completes the enabling of the busy gate 1530 so that a negative-going pulse is fowarded through an "AND" gate 1550, an "OR" gate 1564, and an "AND" gate 1566 to be stored in a busy tone delay line 1568. The delay line 1568 circulates this pulse through the gates 1564 and 1566 so that the time slot assigned to the calling line circuit 102 is now continuously stored in the delay line 1568. The output inverter of the delay line 1568 is connected to a blocking oscillator or audio gate 240 that is connected between a busy tone generator 242 and the speech highway 110. The delay line 1568 opens the gate 240 in the time position assigned to the calling line circuit 102 so that the subscriber at the calling station 210 is provided with an audible indication that the called line is busy. The signal in the time slot assigned to the calling line circuit 102 remains stored in the busy slot delay line 1568 until such time as the station 210 returns to an "on-hook" condition.

The negative-going pulse provided at the output of the "OR" gate 1564 is also returned through an "OR" gate 1542 to one input of a half-adder 1422. Since the other input to the half-adder 1422 is provided with a negative-going pulse by the gate 1444 in the time slot assigned to the calling line 102, the output of the half-adder 1422 rises to a more positive potential and blocks the gate 1418 so that no further busy tests can be made in the time slot assigned to the calling line circuit 102 at this time. The trailing edge of the negative-going pulse provided at the output of the gate 1530 is also forwarded through an "OR" gate 1536 to reset the plurality of flip-flops 717 and the flip-flops 1420 and 1520. This conditions the terminating line store 128 to perform a subsequent busy check operation during the extension of a subsequent call.

In addition to checking the idle or busy condition of the called line circuit 100, the terminating line store 128 includes means for checking the "on-hook" or "off-hook" condition of this line. If the line is "off-hook," thus indicating that the line is in use even though its designation is not stored in the terminating line store 128, or the calling line store 122, the busy check flip-flop 1520 is operated to its set condition so that the gate 1530 is enabled to perform the operations described above. This operation of the terminating line store 128 is controlled by an "OR" gate 1414, one input of which is connected to the line data highway 112 and the other input of which is connected to the trunk receive highway 116. The gate 1414 is rendered effective to perform this function when the terminating line and trunk matrix 130 is supplied with the called circuit designations from the terminating line store 120 in the time slot assigned to the calling line circuit 102. This connects the called line circuit 100 to the gate 1414 over the line data highway 112.

The terminating line and trunk matrix 130 (FIGS. 9 and 10), which is virtually identical to the matrix 124, includes ten "AND" gates 900–909 representing "0" and the units digits "1"–"9," respectively. These gates translate the units digit of the called number from binary to decimal form and are connected over a cable 820 to the outputs of four inverters 806 and four "AND" gates 805. One of the inputs of each of the gates 805 is connected to the output of one of the delay line storage units 700–703 in which the binary coded designation of the units digit of the called line designation is stored. The other two inputs to the gates 805 are connected to the output of an "OR" gate 1504 and the output of an "AND" gate 1502, which latter gate normally provides a steady negative output.

The matrix 130 also includes ten "AND" gates 930–939 representing "0" and the digits "1"–"9" in the tens order which are connected over a cable 830 to the outputs of the delay line storage units 704–706 and 1401 in the terminating line store 128. These storage units store a binary code representing the value of the tens digit of the designation of the called line circuit, and the gates 930–939 translate this stored binary designation into a corresponding decimal marking condition. The inputs to the gates 930–939 are selectively energized by four "AND" gates 805 and four inverters 806 that are controlled by the outputs from the related delay lines 714 and the gates 1502 and 1504.

The matrix 130 further includes four gates 910–913 that are selectively energized over a cable 1500 under the control of the storage units 1402 and 1403 in which is stored the hundreds digit of the designation of the called line circuit. The gates 910–913 translate the binary coded representation of the hundreds digit stored in the delay lines 714 in the storage units 1402 and 1403 into a decimal marking condition. The energization of the gates 910–913 is controlled by a pair of inverters 806 and a pair of "AND" gates 805 that are selectively energized under the control of the related delay line 714 and the gates 1502 and 1504.

The outputs of the gates 910–913 and 930–939 are interconnected with a plurality and "AND" gates 920–928 and 1001–1011 in the same manner as in the calling line and trunk matrix 122 so that a single one of these gates is energized in accordance with the hundreds and tens digit of the called line or trunk designation. The outputs of the gates 920–928 and 1001–1011 are interconnected with one input of a plurality of "AND" gates 950, each of which is connected to one of the "OR" gates in the line and trunk circuits, such as the gates 206, 214 and 226. The other inputs to the gates 950 are connected to the outputs of the units gates 900–909. Thus, the terminating line and trunk matrix 130 provides a negative-going pulse at the output of only one of the gates 950 in accordance with the calling line or trunk designation stored in the terminating line store 128.

Referring back to the above described operation of the delay lines 1430 and 1440, the negative-going pulse at the output of the gate 1418 is also forwarded through the "OR" gate 1504 to the plurality of gates 805. Those of the gates 805 that are enabled by negative-going pulses from their related delay lines 714 representing the designation of the called line circuit 100 enable corresponding ones of the gates 900–909, 910–913 and 930–939 in the terminating line and trunk matrix 130. Since the dialed directory number of the calling line circuit 100 "609" has been translated to and stored in the terminating line store 128 as the designation "209" in the manner described above, the gates 912 and 930 are enabled to provide a negative-going pulse at the output of the gate 921 which enables one of the inputs to the gate 950 connected to the "OR" gate 206 in the called line circuit 100. The gate 909 is also enabled to apply a negative-going pulse to the other input of this gate 950 so that the output of this gate provides a negative-going pulse to the "OR" gate 206. This negative-going pulse is applied to the audio gate 204 and the data gate 208.

The pulse supplied to the audio gate 204 connects the station 202 to the speech highway 110, and the negative-going pulse applied to the data gate 208 is applied to the line data highway 112 in accordance with the "on-hook" or "off-hook" condition at the station 202. If the station 202 is in an "on-hook" condition, the negative-going pulse in the time slot assigned to the calling line circuit 102 is applied to the line data highway 112. Alternatively, if the line circuit 100 is in an "off-hook" condition, the negative-going pulse in the time slot assigned to the calling line circuit 102 is not applied to the line data highway 112.

To provide means for checking the "on-hook" or "off-hook" condition of the called line circuit 100 in conjunction with the previously described busy test, the terminating line store 128 includes the "OR" gate 1414. The output of the "OR" gate 1414 is connected to one input of a half-adder 1416, the other input of which is connected to the output of the "AND" gate 1418. When the above described negative-going pulse is first provided at the output of the gate 1418 at the start of the busy check and when the "OR" gate 206 in the called line circuit 100 is first pulsed by the matrix 130, the output of the gate 1416 drops to a negative potential only if the line circuit 100 is "off-hook" so that the lower input of the half-adder 1416 remains at a more positive potential. The negative-going pulse provided at the output of the half-adder 1416 is forwarded through the "OR" gate 1518 to set the busy flip-flop 1520.

The setting of the busy flip-flop 1520 enables the gate 1530 so that the pulse from the delay line 1526 performs the same operations described above in which busy tone is returned to the calling line circuit 102 under the control of the delay line 1568 and in which the terminating line store 128 is partially cleared and prevented from making further busy checks in the time slot assigned to the calling line circuit 102. However, if the called line circuit 100 is in an "on-hook" condition indicating that the call can be extended to this line circuit, the output of the half-adder 1416 is held at a more positive potential by the negative-going pulse forwarded through the "OR" gate 1414 in the time slot assigned to the calling line circuit 102, and the busy flip-flop 1520 is not set.

Assuming that the called line circuit 102 is both "on-hook" and is not busy, the busy flip-flop 1520 is not set so that the gate 1530 is disabled and the gate 1528 is enabled. At the end of the time frame in which the busy check and "on-hook" or "off-hook" check is made, the delay line 1526 provides a negative-going pulse in the time slot assigned to the calling line circuit 102 which is forwarded through the gate 1528. The negative-going pulse provided at the output of the gate 1528 is forwarded through an "AND" gate 1532, an "OR" gate 1534, an "OR" gate 1544, and an "AND" gate 1546 to store a pulse in the time slot assigned to the calling line in a line free delay line 1548. The output of the delay line 1548 is returned to its input through the gates 1544 and 1546 so that the delay line 1548 continuously circulates a pulse in the time slot assigned to the calling line. The output inverter of the delay line 1548 is also connected to one of the inputs to the "OR" gate 1504 so that the terminating line and trunk matrix 130 is pulsed with the called line designation in the time position assigned to the calling circuit 100 to connect the called line circuit 100 to the speech highway 110 and the line data highway 112 in the time position assigned to the calling line circuit 102.

The output of the gate 1544 is also forwarded through the "OR" gate 1542 to hte half-adder 1422. Since both of the inputs to the half-adder 1422 are provided with negative-going pulses in the time slot assigned to the calling line circuit 102, the gate 1418 is continuously disabled in the time position assigned to the calling line circuit 102. The trailing edge of the negative-going pulse provided at the output of the gate 1534 is also forwarded through the "OR" gate 1536 to reset the flip-flops 717, 1420 and 1520 in the manner described above. This permits the terminating line store 128 to perform idle-busy and "on-hook" or "off-hook" tests on the next call to be extended.

Since the calling line circuit 102 and the called line circuit 100 are now connected to the speech highway 110 in the calling time slot by the audio gates 204 and 212, the terminating line store 128 includes means for returning a ring-back tone to the calling line circuit 102 and for applying a ring tone to the called line circuit 100 during alternate time frames in the single time slot shared by these two line circuits. More specifically, the negative-going pulse provided at the output of the gate 1534 is forwarded through an "AND" gate 1522 and an "OR" gate 1508 to the input inverter of a ring tone delay line 1524. At the end of the first time frame, the negative-going pulse provided at the output inverter of the delay line 1424 is forwarded through an "AND" gate 1540 to the control input of an audio gate 232. This gate is connected between the speech highway 110 and a ring tone generator 234. When the gate 232 is opened, ring tone is applied to the speech highway 110 in the time position of the calling line 100. The negative-going pulse provided at the output inverter of the delay line 1524 is also applied to the input of an inverter 1538. The ground output of this inverter is connected to one of the inputs to the "AND" gate 430 in the calling line store 122, and the gate 430 is inhibited in the calling time position so that the designation of the calling line circuit 102 cannot be applied to the calling matrix 124. Thus, only the called line circuit 100 is connected to the speech highway 110 in the calling time slot through the audio gate 204 so that only the called circuit receives the ring tone supplied by the generator 234.

The negative-going pulse provided at the output inverter of the delay line 1524 is also forwarded through an "AND" gate 1552 to a ring-back tone delay line 1558. At the end of the next time frame, the negative-going pulse provided at the output inverter of the delay line 1558 is forwarded through an "AND" gate 1562 to an audio gate 236, the output of which is connected to the speech highway 110. The input of the audio gate 236 is connected to a ring-back tone generator 238. Accordingly, at the end of this second time frame, the ring-back generator 238 is connected to the speech highway 110 in the time position shared by the calling line circuit 102 and the called line circuit 100. However, the negative-going pulse provided at the output of the delay line 1558 is also applied to the input of an inverter 1506, the output of which is connected to the "AND" gate 1502. When the inverter 1506 is rendered conductive in the time slot assigned to the line circuits 100 and 102, the gate 1502 is inhibited so that the designation of the called line circuit 100 stored in the terminating line store 128 cannot be applied to the terminating line and trunk matrix 130, and the called line circuit 100 is not connected to the speech highway 110. Thus, only the calling line circuit 102 receives the ring-back tone.

The output of the ring-back tone delay line 1558 is also forwarded from its output inverter to one input of the "OR" gate 1508. This causes the time slot assigned to the calling and called line circuits 100 and 102 to again be circulated through the ring tone delay line 1524. Accordingly, the delay lines 1524 and 1558 operate during alternate time frames to alternately apply ring-back tone to the calling line circuit 102 and ring tone to the line circuit 100.

It should also be noted that the gates 1116 and 1118 in the digit detector and time slot allotter 120 are inhibited in the time slot assigned to the circuits 100 and 102 during the interval in which the ring tone is applied to the called line circuit 100. This is necessary because the called line circuit 100 is connected to the highways 110 and 112 by the terminating line and trunk matrix 124, and the "on-hook" condition presented by this line prior to answering supplies time slot signals to the highway 112 that would operate the counting means in the circuit 120. The more positive or ground potential signal applied to one of the inputs of the gate 430 is also forwarded to one of the inputs of each of the gates 1116 and 1118 to inhibit these gates. This prevents time slot pulses supplied to the line data highway 112 from the called line circuit 100 in the calling time slot from controlling the operation of the digit detector and time slot allotter 120.

The alternate application of ring-back tone and ring tone to the calling and called line circuits 102 and 100, respectively, continues until such time as the call is answered at the called station 202 by this station being placed in an "off-hook" condition. When the station 202 goes "off-hook," the enabling potential is removed from the data gate 208 so that the time slot pulses in the time position shared by the calling line circuit 102 and the called line circuit 100 are no longer supplied to the line data highway 112. The absence of a negative-going pulse on the line data highway 112 in the position assigned to the line circuits 100 and 112 removes the last source of negative potential from an "OR" gate 1560 so that the output of an "AND" gate 1554 rises to a more positive potential. This blocks one of the inputs to the "AND" gate 1552 so that the time slot alotted to the line circuits 100 and 102 is erased from the delay lines 1524 and 1558. This terminates the application of ring tone and ring-back tone to the line circuits 100 and 102 and also prevents the alternate disabling of the signals supplied in the assigned time position by the calling line store 122 and the terminating store 128. Accordingly, the calling station 210 and the called station 202 are placed in continuous communication over the speech highway 110 in the time position initially allotted to the calling line circuit 102.

The communication path between the calling and called stations is maintained until such time as either or both of these line circuits is returned to an "on-hook" condition. At this time, the time slot pulses reappear on the line data highway 112 in the position assigned to the calling and called circuits 100 and 102. These pulses are forwarded through the gate 1118 in the digit detector and time slot allotter 120 in the manner described above so that the counter comprising the delay line storage units 1200–1206 is operated. When this counter reaches a setting corresponding to one hundred and twenty-eight input signals, which represents an elapsed time of five hundred and twelve milliseconds, the half-adder 1211 in the storage unit 1206 forwards a negative-going pulse through a gate 1334 to render an inverter 1336 conductive. When the inverter 1336 is placed in a conductive condition, the more positive potential provided at its output is effective through an "OR" gate 1338 to block the "AND" gate 1332. This prevents the circulation of a signal in the busy time slot delay line 1340 in the time position previously assigned to the line circuits 100 and 102. Since this delay line forwards the negative-going pulses through the gate 1326 to the busy time slot conductor and since the continued presence of these pulses is necessary at the gate 1444 in the terminating line store 128 and the plurality of gates 420 in the calling line store 122 in order to maintain the continuous circulation of the calling and called line designations, the erasure of the time slot from the busy time slot store 1340 clears the called and calling circuit designations from the previously assigned time slot in the calling line store 122 and in the terminating line store 128. This frees this time slot for use in extending subsequent connections and terminates the connection of the line circuits 100 and 102 to the highways 110 and 112 by the calling and called matrices 124 and 130.

OPERATION OF THE SYSTEM WHEN A COMMUNICATION PATH IS EXTENDED FROM A CALLING TRUNK TO A CALLED LINE

The private branch exchange operates in substantially the same manner when a call is extended from a trunk to one of the lines served by the exchange as when a call is extended between a pair of line circuits. However, there are certain variations that are made necessary by the fact that the calling line comprises an incoming trunk to the exchange. One of these modifications is that of rendering recall circuitry in the digit detector and time slot allotter 120 effective so that the application of flashing to the line data highway 112 is effective to bring an operator into the connection.

Assuming that a call is to be extended from the trunk circuit 104, which occupies the position identified as "090" in the scanning cycle of the counter including the flip-flops 300–309, to the line circuit 100, which is identified by the directory number "609", the digit detector and time slot allotter 120 seizes an idle time slot in the manner described in detail above and assigning this time slot to the calling line store 122. When the counter including the flip-flops 300–309 is operated to a setting representing the designation "090" identifying the trunk circuit 104, the idle or busy condition of this trunk circuit is determined in the manner described above, and the calling line and trunk matrix 124 connects the trunk circuit 104 to the highways 110, 116 and 118 in the time slot assigned to this trunk circuit so that the "on-hook" or "off-hook" condition of this trunk circuit can be determined.

In this regard, it should be noted the matrix 124 includes up to one hundred additional gates 560 (FIG. 6) which are connected to the trunk circuits in the system and which are enabled by the calling line store 122 in the settings of the counter representing "000"–"099." The matrix 124 also includes ten "AND" gates representing the calling tens digits "0" and "1"–"9." In FIG. 6, five of these gates 606–610 representing the tens digits "0", "1", "2", "8" and "9", respectively, are illustrated. These gates are all partially enabled by the hundreds digit "0" gate 510 and cooperate with the units digit gates 500–509 to select one of the trunk gates 560 and its connected trunk circuit.

When the designation "090" of the trunk circuit 104 is stored in the calling store 122 in the assigned time slot, the gates 500, 510, 529 and 610 are fully enabled, and the gate 560 connected to the "OR" gate 226 is supplied with negative-going pulses in the assigned time slot. These pulses are applied to the audio gate 220 and the data gates 222 and 224. If the trunk circuit 218 is "on-hook" or not in a calling condition, the slot pulses from the gate 226 are forwarded through the gate 222 and over the receive highway 116 to one input of a gate 1100. The gate 1100 is connected to one input of the gate 1104 and controls the half-adder 1328 to mark the trunk 104 as not in a calling condition in the manner described above. If the trunk 104 is calling, the gate 222 is inhibited, and negative pulses in the assigned time slot are not forwarded over the highway 116 to the gate 1100. The designation "090" of the trunk circuit 104 is now recirculated in the store 122 and this trunk is continuously connected to the highways 110, 116 and 118 in the assigned time slot.

When the gate 510 representing the hundreds digit "0" assigned to the trunk circuits is enabled, the negative-going pulse at the output of this gate in the assigned time position is applied to the input of an inverter 640 so that this inverter provides positive-going pulses in the assigned time position. The output of the inverter 640 is connected to one of the inputs to the gate 1102 so that this gate cannot be controlled by negative-going time slot pulses applied to the line data highway 112 in the position assigned to the calling trunk circuit 104. The negative-going pulse at the output of the gate 510 is also forwarded through the "OR" gate 1364 and the "AND" gate 1366 so that a pulse is stored in the dial tone inhibit delay line 1368 in the time position assigned to the calling trunk circuit 104. It is desirable to store a pulse in this delay line at this time to prevent the enabling of the half-adder 1370 inasmuch as dial tone should not be returned from the dial tone generator 230 to the trunk circuit 104.

When dialing is initiated at the remote calling exchange or station, the trunk and signaling circuit 218 in the calling trunk circuit 104 applies "on-hook" and "off-hook" circuit conditions corresponding to the dialed digits to the control input of the data gate 222. The gate 222 couples bursts of negative-going pulses received from the "OR" gate 226 in the assigned time position to the trunk receive highway 116. These pulses are effective through the gate 1100 to operate the digit detector and time slot allotter 120 in the manner described above so that the dialed digits "609" designating the called line circuit 100 are translated to and stored as the designation "209" in the terminating line store 128 in the manner described above. The terminating line store 128 now performs the busy test and the "on-hook" and "off-hook" tests in the manner described above and also pulses the terminating line and trunk matrix 130 so that the "AND" gate 950 connected to the "OR" gate 206 in the called line circuit 100 is provided with negative-going pulses in the time slot assigned to the calling trunk circuit 104. This connects the called line circuit 100 to the line data highway 112 and the speech highway 110. When the called line is determined to be both "on-hook" and in an idle condition, a pulse in the time slot assigned to the calling trunk 104 and shared by the called line circuit 100 is stored in the line free store delay line 1548 and is also circulated through the delay lines 1524 and 1558 to cause the application of ring-back tone to the calling trunk circuit 104 and ring tone to the called line circuit 100.

To provide a means for signaling the remote calling exchange when the called line circuit 100 has answered, an "AND" gate 1614 is provided having its output connected to the trunk send highway 118. One of the inputs to this gate is connected to the output of the delay line 1548 so that a negative-going pulse is applied to the gate 1614 in the time position assigned to the calling trunk circuit 104 when the called line circuit is found to be idle and "on-hook." However, another input to this gate is connected to the output of an inverter 1618, the input of which is connected to the line data highway 112. As long as the line circuit 100 remains in an "on-hook" condition, the negative-going pulses applied to the input of the inverter 1618 in the time position assigned to the calling trunk circuit 104 holds the output of the gate 1614 at a more positive potential. The other input of the gate 1614 is connected to an "OR" gate 1616 having two inputs. One of the inputs is connected to the output of the delay line 1524 through the inverter 1538, and the other input of this gate is connected to the output of the delay line 1558 through the inverter 1506 and the gate 1502. Accordingly, as long as ring tone or ring-back tone are being applied to the calling and called circuits, the gate 1660 disables one input of the "AND" gate 1614.

When the call is answered at the called line circuit 100, negative-going pulses in the time slot assigned to the calling trunk circuit 104 are no longer applied to the input of the inverter 1618 and one of the inputs of the gate 1560. The gate 1560 is disabled, and the pulse in the time slot assigned to the calling trunk circuit 104 is erased from the delay lines 1524 and 1558. In addition, the inverter 1618 remains in a nonconductive state in the calling time slot. Accordingly, the gate 1614 provides negative-going pulses on the trunk send highway 118 in the time position assigned to the calling trunk circuit 104. These negative-going pulses are forwarded through the line data gate 224 to the trunk and signaling circuit 218 so that an answer supervisory signal is returned to the calling exchange to indicate that the called line circuit 100 has answered. The calling trunk circuit 104 and the called line circuit 100 are now placed in communication over the speech highway 110 in the time position originally assigned to the trunk circuit 104 by the digit detector and time slot allotter 120.

As indicated above, the private branch exchange includes recall means controlled by "flashing" the connection for bringing an attendant or operator into the connection. In order to positively control the establishment of a recall condition, the exchange includes means for counting the time slot signals applied to the line data highway 112 from the called line circuit 100 due to "flashing" at the called station. However, it is desirable to avoid the inclusion of additional counting circuitry in the exchange if possible. Thus, the present system includes means by which the counting means comprising the counter units 1130–1134 can be used to control the establishment of a recall condition following their use in detecting the dialed digits.

More specifically, the negative-going pulses provided at the output of the gate 510 on all calls originating on a trunk circuit, such as the circuit 104, are applied to one input of an "AND" gate 1178. The other input of this gate is supplied with a negative-going signal from the output of the gate 1432 when the third or last digit identifying the calling line has been stored in the terminating line store 128. The negative-going pulse provided by the gate 1178 renders an inverter 1150 conductive so that the gate 1116 is inhibited. The gate 1178 also provides a negative-going pulse to one input of the gate 1124 in the time position assigned to the calling trunk 104 and the called line 100. This pulse enables the gate 1124, which is also gated by the flip-flop 1314, to be controlled by every fiftieth time slot pulse received from the line data highway 112 due to "flashing" at the called line circuit 100. The output of the gate 1124 is connected through the "OR" gate 1120 to the input of the half-adder 1140 in the first counting stage 1130.

In the event that the called line circuit 100 desires to call the operator or attendant into the connection, the station 202 is momentarily operated to an "on-hook" condition so that negative-going pulses in the time slot assigned to the circuits 100 and 104 are forwarded through the data gate 208 to the line data highway 112. These pulses are applied to one input of the gate 1124 so that one out of fifty time slot pulses is effective to develop a negative-going pulse that is forwarded through the gate 1120 to operate the first counter unit 1130. If the "off-hook" condition persists for a period of one hundred and twenty-eight milliseconds, the counter including the units 1130–1134 is advanced through thirty-two steps so that the lower output of the half-adder 1140 in the storage or counter unit 1134 supplies a negative-going pulse in the time position assigned to the trunk circuit 104 and the line circuit 100. This negative-going pulse is applied to the one input of an "AND" gate 1152, the other input of which is provided with a negative-going pulse from the output of the gate 1178. This provides a negative-going pulse that is forwarded through an "OR" gate 1154 and an "AND" gate 1155 to be applied to the input inverter of a delay line 1156. The delay line 1156 now circulates a signal in the time position shared by the line circuit 100 and the calling trunk circuit 104 through the gates 1154 and 1155.

Since an inverter 1174 is rendered conductive in the assigned time position by the signals provided by the gate 1178, the gate 1166 is inhibited, and the signal provided at the lower output of the half-adder 1140 in the unit 1134 cannot perform the resetting functions described above. It should also be noted that the normal counting progression of the units 1130–1134 clears these units to a normal condition when the half-adder 1140 in the last unit 1134 provides the negative-going pulse at its lower output. Thus, the end-of-digit or recall counter is now cleared.

The pulse circulating in the delay line 1156 is applied to the input of an inverter 1158 so that the gate 1124 is inhibited in the time position assigned to the calling trunk circuit 104 to prevent further operation of the counter at this time. Further, the negative-going pulse provided at the output of the delay line 1156 is also applied to the base input terminal of an inverter 1170. The emitter input of this inverter is connected to the line data highway 112 and is maintained at a more negative potential by the time slot pulses as long as the line circuit 100 remains in an "on-hook" condition. If the call has been abandoned by the called circuit 100, the slot pulses will persist, and nothing further takes place until the calling trunk 104 releases. However, if the station 202 is returned to an "off-hook" condition at the end of the "flash," the time slot signals disappear from the line data highway 112 in the time position shared by the called line circuit 100 and the calling trunk circuit 104. This places the emitter input of the inverter 1170 at ground, and the negative-going pulse provided by the delay line 1156 renders the inverter 1170 conductive.

The positive-going signal from the inverter 1170 renders an inverter 1172 nonconductive so that a negative-going pulse is applied through the gates 1122, 1108, 1110 and 1112 to the delay line 1114. The delay line 1114 now stores a pulse in the time slot assigned to the line circuit 100 from which the recall "flash" was received. The negative-going pulse developed at the output of the inverter 1172 is also applied to the emitter input of the inverter 1150. This inverter has been rendered conductive by the negative-going pulses supplied at the output gate 1178 so as to inhibit the gate 1116 in the assigned time slot. However, when the inverter 1172 is rendered nonconductive by the inverter 1170, the inhibiting condition provided by the inverter 1150 is removed.

As described above, the time slot pulse stored in the delay line 1114 is recirculated under the control of the clock pulses applied to the gate 1106. The output of the delay line 1114 is applied to the gate 1116 which is now enabled in the time position of the line circuit requiring the recall because of the disabling of the inverter 1150 in this time position. Thus, the counter comprising the counting stages 1130–1134 is again advanced through thirty-two steps to indicate an elapsed time of one hundred and twenty-eight milliseconds. At this time, the negative-going pulse provided at the lower output of the half-adder 1140 in the storage unit 1134 is applied to one input of a gate 1176. A second input to this gate is provided with a negative-going pulse from the output of the delay line 1156, and the third input of this gate is provided with the negative-going pulse from the gate 1178. Thus, the gate 1176 is enabled to forward a negative-going pulse to the attendant's position 132 to advise the attendant that a recall condition has been established in the exchange. When the pulse at the output of the gate 1176 is received and stored in the attendant's position 132, a positive-going pulse is forwarded to the lower input of the gate 1155 and the middle input of the gate 1112. This pulse inhibits these gates to erase the signal in the recalling time slot from the delay lines 1114 and 1156. The operation of the system under the control of the attendant on a recall condition is set forth in detail below.

When the connection extended between the calling trunk circuit 104 and the called line circuit 100 is to be released, the called line circuit 100 goes "on-hook," and the gate 208 applies time slot signals to the line data highway 112. These signals cannot be used to release the system because the gate 1102 that is controlled by these signals is disabled by the conductive inverter 640. When the calling party in the remote exchange releases, the trunk and signaling circuit 218 in the calling trunk circuit 104 supplies an enabling potential to the data gate 222 so that time slot pulses are applied to the trunk receive highway 116. These signals are forwarded through the gates 1100, 1104, and 1118 to the input of the counter including the units 1200–1206. After this counter has been advanced one hundred and twenty-eight steps, which represent an elapsed time of five hundred and twelve milliseconds, the lower output of the half-adder 1211 in the counter unit 1206 provides a negative-going pulse which is again forwarded through the gate 1334 to render the inverter 1336 conductive. This forwards a more positive potential through the gate 1338 to inhibit the gate 1332 and erase the time slot assigned to the calling trunk circuit 104 from the busy time slot delay line 1340. The removal of this time slot from the busy time slot conductor connected to the output of the gate 1326 causes the release of the connection in the manner described above.

OPERATION OF THE SYSTEM WHEN A CALL IS EXTENDED FROM A LINE CIRCUIT TO AN OUTGOING TRUNK CIRCUIT

When a call is extended from a line served by the private branch exchange to an outgoing trunk, an idle time slot is allotted to a calling line circuit by the digit detector and time slot allotter 120, and the designation of the calling line circuit, such as the circuit 100, is stored in the calling line store 122 in this time position in the manner described above. An access digit, such as the digit "9", is then dialed by the subscriber at the calling line, and this digit is detected by the circuit 120 and forwarded in the manner described above. In response to the receipt of the access digit "9", the circuit 126 supplies the designation of a trunk to the terminating line store 128 in the assigned time position. The circuit 128 then performs the idle or busy and "on-hook" or "off-hook" tests. If the trunk selected by the trunk finder 126 is idle and "on-hook," the connection is extended to the called exchange. However, if the trunk is in an "off-hook" or busy condition, the trunk designation stored in the seized time slot in the terminating line store 128 is erased, and the trunk finder 126 is operated to supply the designation of the next available trunk to the store 128.

The trunk finder 126 (FIGS. 16 and 17) not only includes the means described above for determining and translating the value of the first dialed digit received from a trunk or line circuit, but also includes a counter 1721 that is operable to different settings representing the designations of the trunk circuits. This counter assigns the trunk circuits for use by the line circuits in sequence as outgoing calls from the private branch exchange are made. As indicated above, the trunks in the exchange have been arbitrarily designated as occupying the positions "000" to "099" in the calling and terminating matrices 124 and 130. Since all of the trunks are designated by common hundreds digits "0", the counter 1721 includes means for providing binary coded markings representing the tens and units digits of the designations of the trunks.

More specifically, the counter or counting chain 1721 includes four flip-flops 1720, 1722, 1724 and 1726 that are operable in a binary progression which is modified by a gate 1723 to reset to a normal or initial condition following an operation through ten steps. The outputs of the flip-flops 1720, 1722, 1724 and 1726 are applied to one input of four "AND" gates 1741–1744 to provide marking conditions representing the binary digits "1", "2", "4", and "8", respectively, corresponding to the value of the units decimal digits of the trunk circuit. The flip-flop 1726 provides an operating signal to a tens digit portion of the counter 1721 comprising four flip-flops 1728, 1730, 1732 and 1734 at the completion of each cycle of operation of the units portion of this counter. The tens portion of the counter 1721 is advanced in a normal binary progression, as modified by the provision of a gate 1729 which causes it to return to a normal setting at the completion of ten operating steps. The outputs of the flip-flops 1728, 1730, 1732 and 1734 are connected to four "AND" gates 1745–1748, respectively, representing the binary digits "1", "2", "4", and "8" corresponding to the value of the tens digit of the trunk designation. The outputs of the gates 1741–1748 are connected over a cable 1760 to one of the inputs of the "AND" gate 711 in the delay line storage units 700–706 and 1401 in which are stored the units and tens values of the called circuit designation. At any given instant, the counter 1721 is in a setting representing the designation of one of the one hundred trunks represented by the designations "000"–"099".

Assuming that a call is to be extended from a calling line circuit, such as the line circuit 102, to the trunk circuit 104, the station 210 in the line circuit 102 is placed in an "off-hook" condition to advise the digit detector and time slot allotter 120 that a call is to be extended from the line 102. This circuit operates in conjunction with the calling line store 122 and the calling line and trunk matrix 124 to seize an idle time slot and assign it to the line circuit 102 in the manner described above. When the line circuit 102 is found to be in a calling condition in the manner described above, dial tone is returned to the station 210, and the subscriber is advised that the dialing operation is to be initiated. When calls are to be extended out of the private branch exchange to a called exchange, the subscriber first dials an access digit "9" to obtain an outgoing trunk and then dials the designation of the called station.

When the subscribers at the station 210 dials the access digit "9," this digit is received by the digit detector and time slot allotter 120 and is transferred to the first dialed digit detecting and translating means provided by the gates 1640–1649 in the trunk finder 126. Since the dialed access digit has a value of "9," only the gate 1649 is enabled to provide a negative-going pulse in the time position assigned to the calling line circuit 102. This pulse is forwarded through an "AND" gate 1628 and an "OR" gate 1622 to an "OR" gate 1442 that is connected to the gates 1428 and 1438 in the inputs to the delay lines 1430 and 1440. This stores a pulse in the time slot assigned to the calling line circuit 102 in these two delay lines. The outputs from the two gates 1428 and 1438 inhibits the gates 1402, 1404 and 1406 so that no additional dialed digits from the digit detector and time slot allotter 120 can be stored in the terminating line store 128 in the assigned time slot. Further, at the end of a one time frame delay, the pulses in the delay lines 1430 and 1440 enable the gate 1432 so that the terminating line store 128 applies the selected trunk designation to the terminating line and trunk matrix 130 in the time position of the calling line circuit 102. The enabling of the gate 1432 also performs the other functions described above.

The negative-going pulse at the output of the gate 1628 is also forwarded through an "OR" gate 1704 and an "AND" gate 1706 to the input of a trunk call delay line 1708. The output inverter of the delay line 1708 is returned to the other input of the "OR" gate 1704 so that the delay line 1708 continuously circulates a signal in the position assigned to the calling line circuit 102. The output of the delay line 1708 is used to enable and inhibit certain functions of the private branch exchange to indicate that the call is being extended to an outgoing trunk. An inverter 1702 is connected to the output inverter of the delay line 1708 so that the inverter 1702 provides positive-going or ground pulses in the time slot assigned to the calling line circuit 102. These inhibiting pulses are forwarded to the gates 1540 and 1562 to prevent the application of ring-back tone and ring tone to the line and trunk circuits. This positive-going pulse is also applied to the gates 1522 and 1554 to prevent the circulation of a pulse in the calling time slot in the delay lines 1524 and 1558. Further, this pulse is applied to the gate 1550 to prevent the storage of a pulse in this time slot in the busy tone delay line 1560. The inhibit pulse is also forwarded to the gate 1334 to inhibit the erasure of the seized time slot from the busy time slot delay line 1340 under the control of the counter unit 1206. This positive-going inhibit pulse is also forwarded to one of the inputs of the gate 1100 to block the transfer of time slot pulses in the position assigned to the calling line circuit 102 from the trunk receive highway 116 to the digit detector and time slot allotter 120. The negative-going pulse at the output of the delay line 1708 in the time slot of the calling line circuit 102 partially enables a gate 252 in the toll ticketing equipment 108 and four output gates 1392–1395 controlled by the digit register formed by the storage units 1240–1244.

The negative-going pulse provided at the output of the gate 1628 is also forwarded through an "OR" gate 1716 and an "AND" gate 1718 to the other inputs of the gates 1741–1748. This completes the enabling of the combination of these gates that has been partially enabled by the flip-flops 1720, 1722, 1724, 1726, 1728, 1730, 1732 and 1734. This causes negative-going pulses forming a binary designation of a trunk circuit to be forwarded over the cable 1760 to the "OR" gates 711 in the storage units 700–706 and 1401. Thus, the designation of the trunk circuit to be seized is transmitted to and stored in the tens and units digit storing portions of the terminating line store 128. The trailing edge of the pulse used to transfer the trunk designation to the terminating line store operates the input flip-flop 1720 so that the counter 1721 is advanced one step to a setting representing the next trunk circuit.

When the pulses in the calling time slot stored in the delay lines 1430 and 1440 are applied to the gates 1418 and 1432, the trunk designation stored in the terminating line store 128 is applied to the flip-flops 717 so that the busy-free check is made in the manner described above. Further, since the negative-going pulses provided by the gate 1418 are forwarded through the gate 1504 to the readout gates 805, the selected trunk circuit is also connected to the speech highway 110 and the trunk send and receive highways 118 and 116 to permit the terminating line store 128 to determine the "on-hook" or "off-hook" conditions of the trunk in the manner described above.

If the trunk selected by the trunk finder 126 is in an "off-hook" condition or is busy, the busy flip-flop 1520 is set as described above so that when the negative-going pulse in the time slot of the calling line 102 is provided at the output of the delay line 1526, a negative-going pulse is again provided at the output of the busy gate 1530. This pulse is not effective to store a pulse in the allotted time slot in the delay line 1568, since the gate 1550 is blocked as described above. However, the gate 1572 is enabled by the delay line 1708, and this gate provides a negative-going pulse in the time slot assigned to the calling line circuit 102. This pulse renders an inverter 1570 conductive so that the plurality of gates 715 in the storage units 700–706 and 1401 are blocked, and the previously assigned trunk number is erased from the terminating line store 128.

The negative-going pulse at the output of the gate 1572 is also forwarded through the "OR" gate 1716 to enable the gates 1741–1748. Thus, the next trunk number stored by the counter 1721 is transferred to and stored in the storage units 700–706 and 1401 in the terminating line store 128. The trailing edge of this negative-going pulse again operates the input flip-flop 1720 so that the counter 1721 is advanced to a setting representing the next trunk circuit.

Assuming that all of the trunk numbers marked in sequence by the counter 1721 and stored in the terminating line store are found to be in an "off-hook" or busy condition, the advance of the counter 1721 to its normal setting completes the enabling of an "AND" gate 1740 so that a negative pulse is applied to one input of a half-adder 1710. This provides a negative output on its upper lead which is forwarded through an "AND" gate 1712 in the time position assigned to the calling line to be applied to the input inverter of a delay line 1709. The all-trunks-busy delay line 1709 now stores a pulse in the time slot assigned to the calling line circuit 102. If the counter 1721 then advances through another complete cycle of operation in which all of the one hundred trunks are found to be busy, the counter 1721 again enables the gate 1740 so that a negative pulse is applied to the lower input to the half-adder 1710. At this time, a negative-going pulse is applied to the upper input of this half-adder from the output of the delay line 1709.

This causes a positive-going signal to be applied to the gate 1712 to block further circulation of a signal in this time position. The lower output of the half-adder 1710 provides a negative-going pulse in the time position assigned to the calling line that is applied through the gates 1564 and 1566 to the busy tone delay line 1568. The output from the delay line 1568 is forwarded through the gates 1564 and 1542 to the half-adder 1422 to inhibit the gate 1418. Thus, when an all-trunks-busy condition is established, the gate 1418 is blocked to prevent further storage of trunk numbers in the terminating line store 128 in the time position assigned to the calling line circuit 102. Further, the negative pulse provided at the output of the delay line 1568 in the time position assigned to the calling line circuit 102 is applied to the busy tone audio gate 240 so that busy tone is returned to the calling line circuit 102 to advise the subscriber that the call cannot be completed. This busy tone persists until the calling line circuit 102 is restored to a normal condition.

Assuming that one of the trunk numbers supplied by the counter 1721 to the terminating line store 128 identifies a trunk that is both idle and "on-hook," the busy flip-flop 1520 is not set, and the negative-going pulse provided at the output of the delay line 1526 is forwarded through the gates 1528, 1532, 1534, 1544 and 1546 to the idle time slot delay line 1548. The storage of a signal in the time slot assigned to the calling line 102 in the delay line 1548 provides an enabling potential to the terminating line store 128 in the time position of the calling line 102 so that the tens and units digits of the designation of the called trunk are transferred to the terminating line and trunk matrix 130. In this regard, it should be noted that since the gates 1640–1649 in the trunk finder 126 did not transfer any digital designation to the hundreds digit storage units 1402 and 1403, the "0" gate 910 in the terminating matrix 130 provides a steady negative-going pulse that partially enables only the gates 1007–1011. These gates control the group of gates 950 shown to the right in FIG. 10 which are connected to the trunk circuits. The proper one of these gates 950 is selected by the tens and units digits stored in the storage units 700–706 and 1401 which control the gates 900–909 and 930–939.

The negative-going pulse provided at the output of the gate 1534 also resets the flip-flops 717 in the manner described above so that another busy test can be performed. However, this negative-going pulse is not effective to cause the application of either ring tone or ring-back tone to the highway 110 because of the inhibit pulses supplied by the inverter 1702. The negative-going pulse provided by the delay line 1548 also completes the enabling of the gate 1614 so that negative-going pulses are applied to the trunk send highway 118 in the time position assigned to the calling line circuit 102. This provides an "off-hook" or seize supervisory signal that is forwarded to the called exchange through the data gate 224 and the trunk and signaling circuit 218. The receipt of this signal at the called exchange renders this exchange capable of receiving digits dialed at the station 210 in the calling line circuit 102 designating the called station.

It should be noted that if the first trunk selected by the counter 1721 in the trunk finder 126 is available for use in extending a connection from the private branch exchange to the called exchange and if the busy-free checking facilities in the terminating line store 128 are idle at the time that their use is requested by the calling line circuit 102, this circuit can be connected to an outgoing trunk after a delay of only one hundred and sixty microseconds following the detection of the dialed access digit "9." In the worst possible condition in which all of the one hundred trunks must be checked to find a free and idle trunk and in which the busy-free checking circuits in the terminating line store 128 are busy each time that one of the one hundred trunks is seized, the line circuit 102 can be connected to a trunk circuit following a delay of only thirty-two milliseconds. Since the normal delay between dialed digits is never less than two or three hundred milliseconds, it is not possible to dial the first digit of the called station designation into the private branch exchange before a trunk is connected to the line circuit 102 or the all-trunks-busy tone is returned. Thus, the private branch exchange does not require the provision of additional means for returning a second dial tone to the line circuit when the available trunk circuit has been seized.

The subscriber at the calling station 210 now dials the digits identifying the called station. This dialing operation causes the data gate 216 to apply bursts of signals to the line data highway 112 in the time slot assigned to the calling line 102. These negative-going signals place the inverter 1618 in conduction so that the output of the gate 1614 is blocked during the open circuit period corresponding to the dial impulses. These gaps in the negative-going signals normally supplied to the trunk send highway 118 control the data gate 224 so that the time slot pulses provided by the gate 226 are not forwarded through the gate 224 to the trunk and signaling circuit 218. The gaps in the time slot signals applied to the trunk and signaling circuit 218 cause the dialed digits to be repeated over the trunk line to the called exchange and control the extension of a connection to the called subscriber.

In order to provide the toll ticketing or message accounting equipment 108 with the designation of the called station, the groups of pulses in the time slot assigned to the calling line 102 that are applied to the line data highway 112 are also effective to control the digit detector and time slot allotter 120 so that the value of each of the dialed digits is stored in succession in the counter including the storage units 1240–1244 in the manner described above. At the end of each dialed digit, the gate 1166 again provides an enabling potential to the gates 1380–1383 and to the gates 1392–1395. The gates 1380–1383 are inhibited by the inverter 1376 under the control of the gate 1432, but the gates 1392–1395 are partially enabled by the negative-going pulses in the assigned time slot provided by the delay line 1708. Thus, the values of the dialed digits stored in the units 1240–1244 are forwarded through the gates 1392–1395 and over a cable 254 to a called number register 250 in the total ticketing equipment 108. The calling number register 250 can comprise delay line storage units of the type embodied in the calling line store 122 or the terminating line store 128 which are read out to flip-flops providing steady state signals for controlling an output recorder or register. The outputs of the gates 1392–1395 are also applied to the gates 1388–1391 so that the inverters 1384–1387 are rendered effective to erase the previously transferred digit from the storage unit 1240–1244. In this manner each successive digit dialed at the calling line circuit 102 is transferred to and stored in the calling number register 250.

When the number of digits necessary to extend the connection to the called subscriber in the remote exchange has been dialed, the remote exchange returns ring-back tone or busy tone over the trunk circuit to the trunk and signaling circuit 218, and this tone is forwarded over the audio gate 220, the speech highway 110, and the audio gate 212 to the calling station 210. Prior to answering of the call, the remote exchange continuously returns an "on-hook" condition to the trunk and signaling circuit 218 so that the data gate 222 forwards negative-going pulses in the allotted time slot from the gate 226 to the recive highway 116. This "on-hook" condition is not effective to control the counting and timing circuits in the digit detector and time slot allotter 120 because the gate 1100 is inhibited by the positive-going pulses provided at the output of the inverter 1702.

In order to provide means for timing the duration of the call, the toll ticketing equipment 108 includes an "AND" gate 252, one terminal of which is provided with negative-going pulses in the assigned time slot by the output inverter of the delay line 1708. The other input to the gate 252 is connected to the trunk receive highway 116. Thus, the output of the gate 252 continuously supplies negative-going pulses in the time slot assigned to the calling line 102 as long as the "on-hook" condition persists at the remote called exchange. However, when the called station answers, the trunk and signaling circuit 218 in the local trunk circuit 104 is provided with an "off-hook" supervisory signal that inhibits the data gate 222. The absence of negative-going pulses on the trunk receive highway 116 in the time position assigned to the calling line circuit 102 inhibits the gate 252 so that its output remains in a more positive potential. The absence of the negative-going pulses at the output of the gate 252 places an elapsed time counter 248 in operation so that the timing of the duration of the call is initiated. The elapsed time counter 248 can comprise any suitable timing means, such as a counter driven by a clock pulse source through a gate whose enabled or inhibited condition is controlled by the output of the gate 252.

As in the case of the call extended from a trunk to a line circuit served by the private branch exchange, the communication path is maintained until the calling line circuit 102 is placed in an "on-hook" condition. At this time, the calling station 210 enables the data gate 216 so that negative-going pulses in the siezed time slot are applied to the line data highway 112. These pulses are counted by the counter units 1200–1206 in the manner described above so that, following an elapsed time of five hundred and twelve milliseconds, the lower output of the half-adder 1211 in the storage unit 1206 provides a negative-going signal. This signal is applied to one input of the gate 1334, as described above. However, this gate is inhibited by the positive-going signals supplied to the lower input thereof by the inverter 1702. The negative-going pulse provided at the lower terminal of the half-adder 1211 is also forwarded to a gate 260, the lower input of which is provided with a negative-going pulse in the assigned time slot by the delay line 1708. The output of the gate 260 now provides a negative-going pulse to a recorder control circuit 258.

The receipt of this negative-going pulse by the recorder control circuit 258 terminates the operation of the elapsed time counter 248 so that the duration of the call is determined. The recorder control circuit 258 also connects an output recorder 256 to the called number register 250 and the elapsed time counter 248 so that a permanent record or registration of the called number and the duration of the called is produced. As soon as the recording operation is completed, the recorder 256 forwards an operating signal to the recorder control circuit 258 indicating the completion of the recording operation, and the recorder control circuit 258 supplies a negative-going signal in the time position assigned to the line circuit 102 to the input of an inverter 1342. The conduction of the inverter 1342 inhibits the gate 1338 so that the time slot previously assigned to the calling line circuit 102 is erased from the busy time slot delay line 1340.

The removal of this pulse from the delay line 1340 causes the restoration of the private branch exchange to its normal condition in the manner described above. In this regard, it should be noted that one of the inputs of each of the gates 1706 and 1710 is provided with a negative-going signal over the busy time slot conductor from the output of the gate 1326. Thus, when the time slot previously assigned to the calling line circuit 102 is erased from the delay line 1340, this pulse is also erased from the delay lines 1708 and 1709.

MISCELLANEOUS OPERATIONS OF THE PRIVATE BRANCH EXCHANGE

Although the private branch exchange is capable of extending calls from calling lines in the private branch exchange to outgoing trunks, from incoming trunks to called lines served by the private branch exchange, and between called lines in the exchange, it is not desirable in private branch exchanges to permit calls on an incoming trunk to be extended through the private branch exchange to an outgoing trunk. This is true because toll calls originating outside of the exchange could be charged to the exchange. In order to prevent trunk-to-trunk calls, one of the inputs to the gate 1628 is connected to the output of the inverter 640. If the calling circuit is a trunk circuit, the inverter 640 provides positive-going pulses in the time position assigned to the calling trunk circuit. These pulses inhibit the gate 1628, and the subsequent dialing of a trunk access digit "9" by a calling trunk does not result in the operation of the trunk finder 126 to assign a trunk to the terminating line store 128. In addition, if the calling circuit is a trunk circuit, the gate 510 in the matrix 124 forwards a negative-going pulse to one input of a gate 1620. If the calling trunk circuit dials the trunk access digit "9" so that a negative-going pulse is provided at the output of the gate 1649, this negative-going pulse completes the enabling of the gate 1620 so that a negative-going signal is forwarded through an "OR" gate 1608 to one input of an "AND" gate 1610, the other input of which is connected to the busy time slot conductor.

The "AND" gate 1610 supplies a negative-going pulse to a no-such-number delay line 1612. The output of the delay line 1612 is returned to the gate 1608 so that the stored time slot assigned to the calling trunk circuit requesting an outgoing trunk is circulated in the line 1612. The output of the delay line 1612 is forwarded to an audio gate 244 that is connected between a no-such-number tone generator 246 and the speech highway 110. Accordingly, a no-such-number tone is applied to the speech highway 110 and advises the subscriber connected to the calling trunk circuit that the call cannot be further extended. The output of the delay line 1612 is also applied to the inverter 1376 through the gate 1374 to inhibit the gates 1380–1383 and prevent additional digits from being applied to the store 128. The private branch exchange is restored to its normal condition by returning the calling trunk to an "on-hook" condition so that time slot pulses are forwarded through the gate 1100 to operate the counter stages 1200–1206. At the end of the end-of-call interval, the assigned time slot is erased from the delay line 1340, and the exchange restores to a normal condition.

The private branch exchange also includes means for restricting one or more of the line circuits served by the exchange from access to outgoing trunks. To accomplish this, the outputs of the gates 560 in the calling matrix 124 that are to be afforded only restricted service are connected to one input of an "AND" gate 630. The other input of this gate is connected to the output of the gate 1649 in the trunk finder 126. If a calling line circuit in the private branch exchange dials the trunk access digit "9," the negative-going pulse at the output of the gate 1649 completes the enabling of the gate 630, and the output of this gate forwards a negative-going pulse in the time position assigned to the calling line circuit to the input of an inverter 1714 in the trunk finder 126. This renders the inverter 1714 conductive so that the enabling potential is removed from one input to the "AND" gate 1718. This prevents the enabling of the gates 1741–1748 so that a trunk number cannot be supplied to the terminating line store 128.

In addition, the negative-going pulse at the output of the gate 630 is forwarded through the gates 1564 and 1566 to the busy tone delay line 1568. The output of the delay line opens the audio gate 240 so that busy tone is returned over the speech highway 110 to the calling line. In addition, this negative-going pulse is applied through the gates 1442, 1428 and 1438 to store pulses in the delay lines 1430 and 1440 in the time position assigned to the calling line circuit. As described above, the storage of concurrent pulses in the delay lines 1430 and 1440 prevents the transfer of additional information to the terminating line store 128 from the digit detector and time slot allotter 120. Thus, access to outgoing trunks from the private branch exchange is restricted by strapping the gate 560 of the restricted line in the matrix 124 not only to the related line circuit, but also to one input of the gate 630. The system is restored to a normal condition in the manner described above when the calling station returns to an "on-hook" condition.

When it is desired to have all calls that are extended to a certain line circuit or group of line circuits diverted to the attendant's or operator's position 132, the gate or gates 950 in the terminating line and trunk matrix 130 assigned to these lines are strapped to an intercept conductor 1098 so that the negative-going pulses in the time slot assigned to the call originating circuit are forwarded through a gate 1624 to the attendant's position 132. This negative signal directs the operator's attention to the call and permits the call to be answered by the operator. In addition, the negative-going pulse on the conductor 1098 is applied to the input of an inverter 1556 so that this inverter provides a positive-going pulse in the time position assigned to the calling circuit. This positive pulse inhibits the gate 1552 so that the calling time slot cannot be circulated in the delay lines 1524 and 1558 to provide ring tone and ring-back tone. In addition, the positive-going pulse inhibits an "AND" gate 1446 and the gate 1444 so that the dialed number representing the called circuit is erased from the terminating line store 128.

Whenever some of the lines or trunks in the private branch exchange are not assigned for use, the corresponding gates 950 in the matrix 130 are strapped to an unassigned number conductor 1099 that is connected to one of the inputs to the gate 1608. Thus, the time slot assigned to the calling circuit is stored in the delay line 1612 so that the no-such-number tone generator 2346 is connected to the speech highway 110 to advise the calling station that the connection cannot be established. In addition, the negative-going pulse in the assigned time slot is applied through the "OR" gate 1374 to the inverter 1376 so that the gates 1380–1383 are inhibited to prevent the transfer of additional digits to the terminating line store 128.

In addition, if a directory number having a hundreds digit that is not assigned for use is dialed, the private branch exchange includes means for advising the subscriber that the connection cannot be completed. More specifically, since the exchange includes only three hundred calling lines and the hundreds digits "1" and "3"–"8" are available for assignment to these calling lines, some of the hundreds digit may not be used. Those of the hundreds digit that are not assigned are connected to the input of the "OR" gate 1608 so that the time slot allocated to the calling circuit is stored in the delay line 1612. As described above, this causes the connection of the no-such-number tone generator 246 to the speech highway 110 in the time position of the calling line so that the calling station is advised that the connection cannot be completed. In addition, the inverter 1376 inhibits the gates 1380–1383 in the assigned time position so that additional information cannot be dialed into the terminating line store 128.

OPERATION OF THE SYSTEM ON CALLS EXTENDED TO THE ATTENDANT'S POSITION 132

Calls can be extended from a calling line or trunk circuit to the attendant's position 132 by dialing the access digit "0," by establishing a recall condition on incoming calls to a line circuit in the exchange, or by establishing an intercept condition by strapping one or more of the gates 950 in the terminating matrix 130 to the operator intercept conductor 1098. When the attendant's position 132 is placed in the connection, the operator can converse with either or both of the calling and called parties and can process the call in the desired manner.

Assuming that a call is to be extended from one of the line or trunk circuits in the private branch exchange to the attendant's position 132 (FIGS. 21 and 22), the access digit "0" is dialed and transferred through the detector and time slot allotter 120 to the trunk finder 126. This results in the appearance of a negative-going pulse at the output of the gate 1640 in the time slot assigned to the calling circuit. This negative pulse is forwarded through a gate 1626, the "OR" gate 1624, a pair of "OR" gates 2108 and 2110, and an "AND" gate 2112 to the input of a queue store delay line 2114. The output of the delay line 2114 is returned to its input through the gates 2110 and 2112 so that the time slot assigned to the calling circuit requesting the operator connection is continuously circulated through the delay line 2114. If the circuit requesting the operator abandons the call, the system is cleared in the manner described above, and the busy time slot pulse in the calling time position is removed from the middle input of the gate 2112. This inhibits this gate to erase the circulating pulse in the calling time slot.

The output of the delay line 2114 is also forwarded through a pair of "AND" gates 2118 and 2126 to trigger a holdover circuit 2142 and a monostable multivibrator 2140. When the monostable multivibrator 2140 is operated to its set condition, a lamp 2238 is illuminated over an energizing circuit connected to a potential source in a pulse forming circuit 2235. The illumination of the lamp 2238 advises the operator that at least one call requiring his attention is stored in the delay line 2114. The negative-going pulse provided at the output of the gate 2126 is also forwarded through an "OR" gate 2144 to the audio gate 236 connected to the ring-back tone generator 238. This tone generator is connected to the speech highway 110 in the time position of the calling circuit so that the calling station is advised that the operator is being signaled.

When the call is answered by the attendant operating a key to close a pair of contacts 2234, the lamp 2238 is extinguished, and the pulse forming circuit 2235 provides a positive-going signal that is applied to a flip-flop 2128. This signal operates the flip-flop 2128 to its set condition so that an enabling potential is applied to the lower input of an "AND" gate 2116. The first negative-going pulse provided at the output of the delay line 2114 is forwarded through the gate 2116 and an "OR" gate 2214 to be applied to an operator's calling time slot delay line 2216. The output of the delay line 2216 is returned to the input gate 2214 through an "AND" gate 2218. Thus, the calling circuit associated with the first time slot pulse to be applied by the delay line 2114 to the gate 2116 following the setting of the flip-flop 2128 is now stored in the delay line 2216 to permit the operator to communicate with this calling circuit. The negative-going pulse at the output of the gate 2116 is also returned to an "OR" gate 2124 to render an inverter 2122 conductive. This inhibits the gate 2112 so that the time slot transferred from the delay line 2114 to the delay line 2216 is erased from the delay line 2114. Further, the trailing edge of the negative-going pulse provided at the output of the gate 2116 resets the flip-flop 2128 to its normal condition.

The negative-going pulse at the output of the gate 2116 is also forwarded through an "OR" gate 2204 to an inverter 2202. When the inverter 2202 is rendered conductive in the time slot transferred to the delay line 2216, the positive-going signal provided at the output of the inverter 2202 is forwarded to the "AND" gate 1446 to inhibit the gate 1444. As described above, this causes the erasure of any signals in the terminating line store 128 in the time position stored in the delay line 2216. The disabling of the gate 1444 also clears the pulses stored in the delay lines 1430 and 1440 to permit the operator to dial a called number into the terminating line store 128 and also inhibits the gates 1566 and 1546 so that signals cannot be stored in the line free delay line 1548 and the busy tone store delay line 1568. This permits the operator to control the establishment of the path to the called circuit requested by the party calling the operator.

To control speech and data transmission between the system and the position 132, an operator's line circuit 2260 is provided. This circuit includes an audio gate for connecting it to the speech highway 110 and a data gate connecting it to an operator's data highway 2261. The highway 2261 is connected to one of the inputs to the gate 1104 in the digit detector and time slot allotter 120. In general, the operator's line circuit 2260 is identical to the line circuits 100 and 102. Accordingly, when the delay line 2216 supplies a pulse to the circuit 2260 in the time position of the calling circuit, the operator can converse with the calling party over the speech highway 110. In addition, the operator can connect a called communication circuit to the path by supplying signals over the highway 2261 to the gate 1104 in the calling time slot represented by the pulses supplied by the delay line 2216.

If the operator wishes to split the connection between the called circuit and the calling circuit and to speak to only the subscriber on the calling circuit, a split key is operated to close a pair of contacts 2222. This forwards ground from a coupling or pulse forming circuit 2223 to the emitter input of an inverter 2212, the base input of which is connected to the output of the delay line 2216. The inverter 2212 is rendered conductive in the time slot alloted to the communication path so that positive-going inhibiting pulses are applied to one input of the "AND" gate 1502. This prevents the gate 805 from supplying signals to the terminating line and trunk matrix 130 in the assigned time slot so that the called trunk or line circuit is not connected to the speech highway 110. Thus, the operator is able to converse with only the calling party over the operator's line circuit 2260. When the split key is returned to a normal condition so that the contacts 2222 are opened, the enabling ground potential for the inverter 2212 is removed so that the calling and called parties can converse.

Similarly, if the operator wishes to converse with only the called party, the split key is operated to close a pair of contacts 2224 so that a pulse forming or coupling network 2225 supplies ground to the emitter input of an inverter 2210, the base input of which is connected to the output inverter of the delay line 2216. The positive-going pulses provided at the output of the inverter 2210 in the assigned time position are forwarded to one input of the "AND" gate 430. This gate is disabled so that the delay lines 421 in the calling line store 122 cannot pulse the calling line and trunk matrix 124 in the time position stored in the delay line 2216. Thus, the calling a night transfer key is operated to open a pair of contacts 2226 and to close a pair of contacts 2228. The closure of the contacts 2228 controls a pulse forming circuit 2229 so that a more positive potential is applied to one input of the gate 2126. This inhibits this gate so that ring-back tone is not applied to the speech highway 110 in the time slot of the incoming call and so that the monostable multivibrator 2140 is not operated to illuminate the lamp 2238. The opening of the contacts 2226 operates a pulse forming circuit 2227 to supply a negative potential to one input of a gate 2106.

When any negative-going pulses representing a request for the operator's service are supplied to the gate 2108, these pulses are forwarded through the gate 2106 to the "OR" gate 2124 to render the inverter 2122 conductive in the incoming time slot. This inhibits the gate 2112 so that the queue store delay line 2114 cannot store any time slots. The output of the gate 2106 is also strapped to a plurality of "OR" gates 711 in the terminating line store 128 so that selected ones of the storage units are supplied with pulses representing the designation of the particular line circuit to which all operator calls are to be routed. In the circuit shown in FIGS. 7 and 14, the gate 2106 is strapped to the "OR" gates 711 in the storage units 700, 704, and 1402. Thus, the arbitrarily chosen line circuit to receive calls intended for the operator circuit is designated as "111."

The negative-going pulse from the gate 2106 is also applied to an inverter 730, the output of which is connected to all of the gates 715 in the terminating line store 128. The positive-going pulse provided at the output of the inverter 730 inhibits the gates 715 so that any information previously stored in this time slot in the terminating line store 128 is erased to permit the storage of the designation identifying the line circuit to which the operator calls are to be extended. The output of the gate 2106 is also connected through an "OR" gate 1412 to the "OR" gates 1428 and 1423. This negative-going pulse loads the delay lines 1430 and 1440 to simulate the transfer of the necessary three digits through the digit detector and time slot allotter 120 to the terminating line store 128. In this manner, the circuit 128 and the terminating line and trunk matrix 130 are enabled to extend the connection originally intended for the operator to the arbitrarily selected line circuit.

The attendant's position 132 is returned to a normal operative association with the exchange by restoring the night transfer key to its normal position in which the contacts 2226 are closed and the contacts 2228 are opened.

OPERATION OF THE CONFERENCE FACILITIES IN THE SYSTEM

The conference facilities provided in the private branch exchange include the conference connector 134 (FIG. 18) and the conference control circuit 136 (FIGS. 19 and 20). A conference circuit including up to five of the lines in the exchange can be established under the control of a calling subscriber, primarily under the control of the calling station with assistance from the operator, or primarily under the control of the operator. In addition, the conference control circuit 136 includes means by which the establishment of a recall condition by one of the line circuits in the exchange permits the operator to establish a conference connection. In the conference connection, each of the five parties involved is assigned both an individual time slot and an individual one of five audio gates 1800–1804, such as shown in FIG. 4B of United States Patent 2,979,570, filed August 31, 1959, and issued April 11, 1961, which is assigned to the same assignee as the present application, in the connector 134 that is connected to the speech highway 110. The audio gates 1801–1804 are individually terminated in a five resonant transfer or filter circuits 1805–1809, such as shown in FIG. 18B of said United States Patent 2,979,570 which are connected in common. Thus, common communication between the five parties in the conference connection is established using five separate time slots. Furthermore, no other calls may be initiated while a conference call is being established.

When a conference connection is to be established, a calling line circuit served by the private branch exchange is allotted an idle time slot and is provided with dial tone to indicate that digit "2," which provides access to the conference facilities, is to be dialed. When this digit is dialed, the digit detector and time slot allotter 120 receives the dialed digit and transfers it to the trunk finder 126 in the manner described above so that a negative-going pulse appears at the output of the gate 1642 in the time position assigned to the calling line circuit. If the access digit "2" is received from a trunk circuit, the negative-going pulse at the output of the gate 1642 is combined with a negative-going pulse at the other input of a gate 1606 so that a negative pulse is forwarded through the gates 1608 and 1610 to the delay line 1612. This returns busy tone to the calling trunk and advises the subscriber that a trunk circuit cannot be used to establish a conference connection.

The negative-going pulse provided at the output of the gate 1642 is also forwarded through a gate 1604 to the input of an inverter 1602. The positive-going pulse at the output of the inverter 1602 in the time position assigned to the calling line circuit requesting the conference connection is applied to the inputs of the gates 1426 and 1436 to clear the delay lines 1430 and 1440 in this time position. The negative-going pulse at the output of the gate 1604 is also forwarded through a plurality of gates 1944, 1946 and 1948 to the input of a conference calling time slot delay line 1950. The output inverter of the delay line 1950 is connected to one input of the "OR" gate 1946 so that the calling time slot is continuously circulated in the delay line 1950. The negative-going pulse at the output of the gate 1604 is also forwarded through an "AND" gate 1960, an "OR" gate 1852 and an "AND" gate 1854 to store the calling time slot in a delay line 1856. The output of the delay line 1856 is connected through an "AND" gate 1850 driven by the clock pulse source to the "OR" gate 1852 so that the calling time slot is continuously recirculated through the delay line 1856.

The negative-going pulse provided at the output of the gate 1948 when the calling time slot is stored in the delay line 1950 is applied to a holdover circuit 1956 to operate a monostable multivibrator 1958 to its set condition. When the multivibrator 1958 is set, the gates 1944 and 1960 are inhibited to prevent subsequent access digits "2" from causing the storage of additional calling time slots in the delay lines 1856 and 1950. This operation of the multivibrator 1950 also enables a gate 1964 so that negative-going pulses from the trunk finder 126 due to subsequently dialed access digits "2" result in negative-going pulses provided at the output of the gate 1964 in the calling time slots of the subsequent calling circuits. These negative-going pulses are forwarded through an "OR" gate 1954 and the gate 1564 so that the time slots of the subsequent calling circuits are stored in the busy tone delay line 1568. As described above, this results in the return of busy tone to the calling line circuits to advise these circuits that the conference facilities are not available. The multivibrator 1958 is held in its set condition for so long as the calling line time slot is circulated in the delay line 1950.

With the conference facilities now seized by the first calling circuit, it is necessary to determine whether four additional time slots are idle for assignment to the other parties to be included in the conference connection. When the negative-going pulse is provided at the output of the gate 1960, the trailing edge of this pulse is applied to a flip-flop 1914 to operate this flip-flop to its set condition. The negative-going pulse provided by the setting of the flip-flop 1914 forwards a negative potential through an "OR" gate 1912 to an inverter 1942. This renders the inverter 1942 conductive so that a gate 1940 is circuit is disconnected from the speech highway 110, and the operator can converse with only the called party over the speech highway 110. When the split key is restored to its normal position, the contacts 2224 are opened to disable the inverter 2210.

When the attendant's position 132 is to be dropped out of the established communication path, the answer key is restored to its normal position so that the contacts 2234 are opened. This removes the more positive potential from an inverter 2130 so that this inverter restores to a conductive condition and is effective through an "OR" gate 2134 to apply a positive-going pulse to a flip-flop 2136. This operates this flip-flop to its set condition to remove the negative enabling potential from one input of the gate 2218. When the gate 2218 is inihibited, the pulse circulating in the delay line 2216 is erased. The flip-flop 2136 remains in this set condition until such time as the next time slot is read out of the queue store delay line 2114. The trailing edge of the negative-going pulse provided at the output of the gate 2116 is forwarded through an "OR" gate 2138 to provide a positive-going trailing edge that operates the flip-flop 2136 to its reset condition in which an enabling potential is again applied to the gate 2218. In the event that any other time slot signals are circulating in the delay line 2114 at the time that the attendant's position 132 is dropped out of a previously established connection, the monostable multivibrator 2140 remains set so that the lamp 2238 becomes illuminated to indicate that additional calls remain to be processed. These calls are disposed of by the operator in the manner described above.

Assuming that a recall condition is established by the called line circuit in the private branch exchange in the manner described above in detail, a negative-going signal is provided at the output of the gate 1176 that is forwarded to one input of an "OR" gate 2150. This pulse passes through an "AND" gate 2151 to store a pulse in a recall time slot delay line 2152 in the time position in which the recall condition is established. The negative-going pulse provided at the output of the delay line 2152 is returned to the input of this delay line through an "AND" gate 2148 and the gates 2150 and 2151. This pulse also renders an inverter 2147 conductive to inhibit the gates 1112 and 1155 so that the pulse in the recalling time slot is erased from the delay lines 1114 and 1156. Thus, the time slot in which the recall condition has been established is continuously circulated in the delay line 2152. If the recall is abandoned, the recalling time slot is erased from the delay line 1340 and the corresponding negative-going pulse is removed from the busy time slot conductor. This inhibits the gate 2151 at its lower input, and the recalling time slot is erased from the delay line 2152.

The output of the delay line 2152 is also applied to a holdover circuit 2246 so that a monostable multivibrator 2248 is operated to its set condition. This terminates the energization of an inverter 2250 so that a negative enabling potential is supplied to the upper input of an "AND" gate 2252. The other input of this gate is connected to a terminal 2251 to which a series of negative-going pulses from a pulse generator is applied. This causes the flashing of a lamp 2254 to visibly indicate to the operator that a recall condition has been established in the attendant's position 132.

When the recall condition is to be answered, a recall answer key is actuated to close a pair of contacts 2244. The closure of the contacts 2244 control a pulse forming circuit 2243 to apply ground to the input of a normally conductive inverter 2236 so that its output drops to a more negative potential. In addition, the positive-going signal provided by the circuit 2243 sets a flip-flop 2242 so that an enabling potential is applied to an "AND" gate 2240. When the next negative-going pulse from the delay line 2152 is applied to the other input of the gate 2240, a negative-going pulse is forwarded through the "OR" gate 2214 to store the time slot in which the recall condition has been established in the operator's time slot store delay line 2216. This negative-going pulse is also forwarded through the gate 2138 to reset the flip-flop 2136 so that the recirculating gate 2218 for the delay line 2216 is enabled. The circulation of the recall time slot in the delay line 2216 enables the operator's line circuit 2260 in the manner described above so that the operator can converse with the two parties in the established connection to determine the circuit to which the call is to be transferred.

The negative-going pulse at the output of the gate 2240 also renders an inverter 2146 conductive in the time slot transferred from the recall delay line 2152 to the operator's line 2216. The positive-going pulse provided at the output of the inverter 2146 inhibits the gate 2148 so that the transferred recalling time slot is erased from the delay line 2152. The pulse provided at the output of the gate 2240 is also returned to the flip-flop 2242 so that its trailing edge restores this flip-flop to its set condition in which the enabling potential is removed from the gate 2240. Thus, only a single recalling time slot can be transferred from the delay line 2152 to the delay line 2216.

The negative-going pulse provided at the output of the gate 2240 is also forwarded through an "OR" gate 2230 so that the positive-going trailing edge of this pulse operates a flip-flop 2232 to its set condition. In this condition, a negative enabling potential is applied to one input of an "AND" gate 2208. When the recalling time slot is provided at the output of the gate 2218, the gate 2208 is enabled to apply a negative-going pulse to the lower input of an "AND" gate 2206. The other input of this gate is connected to a pair of off-normal contacts in the operator line circuit 2260. When the operator first dials the directory number of the line circuit that is to replace the present called circuit, a negative potential is supplied to the upper input of the "AND" gate 2206 so that a negative-going pulse is forwarded through the "OR" gate 2204 to the inverter 2202. This renders the inverter 2202 momentarily conductive to erase the present called circuit designation from the terminating line store 128 in the time position in which the recall condition has been established. This pulse also erases any signals in the delay lines 1430, 1440, 1548 and 1568 in this time position so that the terminating line store 128 is conditioned to receive the new designation. The trailing edge of the negative-going pulse provided at the output of the gate 2206 is also returned to the flip-flop 2232 to restore this flip-flop 2232 to its set condition in which the enabling potential for the gate 2208 is removed. The designation of the new called party is now dialed into the digit detector and time slot allotter 120 in the manner described above under the control of the signals applied to the highway 2261 by the operator's line circuit 2260.

When the recalling condition has been satisfied by the operator's completion of the call to the new called party, the recall answer key is released so that the contacts 2244 are opened. This removes the more positive potential from the inverter 2236 so that this inverter returns to a conductive condition to provide a positive-going pulse that is forwarded through the gate 2134 to operate the flip-flop 2136 to its set condition. In this condition, the flip-flop 2136 removes the enabling potential from the gate 2218 so that the recalling time slot is erased from the operator's delay line 2216. The flip-flop 2136 is restored to its normal condition to return the enabling potential to the gate 2218 by transferring a time slot out of either of the delay lines 2114 and 2152 in the manner described above.

When an operator is not present at the attendant's position 132, this position is rendered ineffective by the operation of a night transfer key, and all calls routed to the position 132 are transferred to a particular one of the line circuits in the private branch exchange. More specifically, when the attendant's position 132 is unattended, inhibited. This negative potential from the "OR" gate 1912 also partially enables an "AND" gate 1966.

In its set condition, the flip-flop 1914 inhibits the gate 1346 so that free time slot pulses cannot be applied to the delay line 1350 in the digit detector and time slot allotter 120. The setting of the flip-flop 1914 also forwards a negative potential to one input of an "AND" gate 1324 so that the idle time slot pulses provided at the output of the half-adder 1344 are not forwarded through the gate 1324 to both the "OR" gate 1852 and an "OR" gate 1916 that is connected to an assigned conference time slot delay line 1920 through an "AND" gate 1918. Accordingly, the next occurring idle or free time slots are directed to and stored in the delay lines 1856 and 1920. Since these time slots are being seized for use in setting up the conference connection, the output of the gate 1324 is also connected to the "OR" gate 1330 so that these slots are stored in the busy time slots delay line 1340. This marks these time slots as busy and unavailable for use in extending other connections.

Since only four additional free time slots are necessary to establish the conference connection, the conference control circuit 136 includes a pair of flip-flops 1902 and 1904 connected as a binary counter to provide means for counting the number of free time slots forwarded to and stored in the delay lines 1856 and 1920. The trailing edge of the first negative-going pulse provided at the output of the gate 1324 sets the flip-flop 1902 and the trailing edge of the second negative-going pulse at the output of this gate resets the flip-flop 1902 and sets the flip-flop 1904. The trailing edge of the third allotted time slot sets the flip-flop 1902, and the trailing edge of the fourth time slot pulse allotted to the conference circuit resets both of the flip-flops 1902 and 1904.

The outputs of the flip-flops 1902 and 1904 are connected either directly or through a pair of inverters 1906 and 1908 to the four inputs to an "OR" gate 1910. From the time that the first time slot pulse is received and until the trailing edge of the fourth time slot is received, at least one of the inputs to the gate 1910 is at a negative potential so that the output of the "OR" gate 1910 is held at a negative potential. However, when the fourth time slot pulse resets the flip-flops 1902 and 1904 to the normal position shown in FIG. 19, the output of the gate 1910 returns to its normal state to which a more positive or ground potential is provided at its output. The positive-going signal provided at the output of the gate 1910 when this gate is restored to its normal condition resets the flip-flop 1914 so that the gate 1346 is again enabled and the gate 1324 is inhibited. This returns the digit detector and time slot allotter 120 to its normal operating condition and terminates the application of idle time slots to the storage means 1856 and 1920 in the conference control circuit 136. Further, the inhibiting signal is removed from the gates 1940 and the enabling signal is removed from the gate 1966.

The above described operations take place during the first frame interval following the receipt of the calling time slot pulse by the delay line 1950. At the end of this time frame, the delay line 1950 supplies a negative-going pulse through the "AND" gate 1940 and an "OR" gate 1938 to the input of an inverter 1936. The output of this inverter is connected to one of the inputs to the "AND" gate 1366 so that this gate is inhibited in the time position assigned to the calling line. This prevents the storage of a pulse in the delay line 1368 in the time position assigned to the calling line. The inhibiting of the gate 1366 erases the signal previously stored in the delay line 1368 when the access digit "2" was dialed so that the half-adder 1370 once again provides a negative-going pulse in the time slot of the calling line to cause dial tone to be returned over the speech highway 110 to the calling line circuit. This advises the calling subscriber that the conference control circuit 136 has been able to seize the four idle time slots necessary to set up the conference connection and that the dialing of the designations of the four other calling lines to be connected to the conference circuit can be initiated.

The trailing edge of the negative-going pulse at the output of the gate 1940 operates a flip-flop 1934 to its set condition so that the enabling potential supplied to the upper input of the "AND" gate 1940 is removed. The gate 1940 is now inhibited to prevent the erasure of any slot pulse subsequently stored in the delay line 1368 in the time position assigned to the calling line. The negative-going pulse at the output of the gate 1940 is also forwarded through an "OR" gate 2032 and an "AND" gate 2034 to store a pulse in the calling time slot in a permanent time slot store delay line 2036. The calling time slot is stored in the delay line 2036 after the availability of the conference circuit 136 and the availability of the four idle time slots has been determined. A pulse in this slot remains circulating in the delay line 2036 through the gates 2032 and 2034 until such time as the conference facilities are released.

Assuming that no time slots or only one, two or three idle time slots are available for use by the conference control circuit 136, the flip-flop 1914 remains set to supply a negative enabling potential to one of the inputs of the "OR" gate 1912. If one, two or three slots are available, the gate 1910 provides a negative potential to the other input of the "OR" gate 1912. Accordingly, when the delay line 1950 provides a negative-going pulse at the end of the first frame interval, the gate 1940 remains inhibited by the inverter 1942, and the negative-going pulse at the output of the delay line 1950 is forwarded through the gates 1966 and 1954 to the busy tone delay line 1568. This causes the return of busy tone to the calling line circuit in the time slot assigned thereto to provide an indication that a further extension of the connection is not possible. In order to reset the conference facilities at this time, the trailing edge of the pulse provided at the output of the gate 1966 is forwarded through an "OR" gate 2046 to set a reset flip-flop 2042. When the flip-flop 2042 is operated to its set condition, an inverter 2064 is rendered conductive so that a more positive or ground potential is supplied to the resetting leads of all of the flip-flops in the conference control circuit 136. This restores this circuit to its normal condition.

Further, when the flip-flop 2042 is set, a negative potential is forwarded through an "AND" gate 2052 so that its leading edge controls a holdover circuit 2050 to set a monostable multivibrator 2048. This renders an inverter 2044 nonconductive. At the end of the one hundred microsecond delay interval of the monostable multivibrator 2048, it restores to its normal condition and renders the inverter 2044 conductive. The positive-going edge of the pulse provided at the output of the inverter 2044 resets the flip-flop 2042 to its normal condition so that the inverter 2064 is again rendered non-conductive to remove the ground clamping signal from the plurality of flip-flops in the conference control circuit 136. This completes the restoration of this circuit to its normal condition to permit its use and that of the conference connector 134 in establishing other conference connections.

Assuming, however, that all of the necessary four time slots are idle and available, dial tone is returned to the calling line circuit in the manner described above and the subscriber at the calling line circuit dials the three digits identifying the first called station in the conference circuit. These three digits are received by the digit detector and time slot allotter 120 in the calling time slot and are transferred to the terminating line store 128 under the control of the trunk finder 126 in the manner described in detail above. When this information is stored in the terminating line store 128 in the calling time slot, the idle-busy and "on-hook" and "off-hook" tests are performed in the manner described above. If the called line is busy or "off-hook," the flip-flop 1520 is set in the manner described above so that a negative-going pulse in the time slot assigned to the calling circuit is forwarded from the delay line 1526 through the gates 1530 and 1550 to be stored in the busy time slot delay line 1568. This causes the return of busy tone to the calling line circuit in the manner described above and inhibits further extension of the connection in the manner described above. In addition, the trailing edge of this pulse is effective through the gate 1536 to reset the busy flip-flop 1520.

When the busy tone is returned to the calling line circuit in the time slot allotted thereto, the calling subscriber is advised that the desired conference party is busy and that the connection cannot be completed. In order to continue the processing or establishment of the conference connection, the calling subscriber now dials the access digit "2" which is effective to remove the busy tone, to clear the delay lines 714, 1430 and 1440 in the calling time slot, and to return dial tone to the calling subscriber to advise him that the dialing of the designation of the next called station can be initiated.

Since the dialing of the three digit designation of the first called party to be connected to the conference circuits results in the filling of the digit counter comprising the delay lines 1430 and 1440, the gate 1406 as well as the gates 1402 and 1404 are disabled so that it would not be possible to transfer a dialed access digit "2" from the digit detector and time slot allotter 120 to the gates 1640–1649 in the trunk finder 126. However, when a signal is stored in the busy tone delay line 1568 in the time slot assigned to the calling party, an "AND" gate 1437, whose other two inputs are connected to the output of the delay line 1950 and the output of the gate 1432, is enabled by the negative-going pulse appearing at the output of the delay line 1568 in the time slot assigned to the calling line circuit. The negative-going pulse provided at the output of the gate 1437 renders an inverter 1435 conductive so that the gates 1426 and 1436 are inhibited. This clears the delay lines 1430 and 1440 so that when the access digit "2" is dialed, this digit is transferred from the digit detector and time slot allotter 120 to the inputs of the gates 1640–1649.

At this time, the gate 1642 is again enabled so that a negative-going pulse appears at the output thereof. This negative-going pulse is forwarded through the gate 1604 to again render the inverter 1602 momentarily conductive to erase the pulse stored in the calling line time slot from the delay line 1430, this pulse having been stored therein when the access digit "2" was dialed. The negative-going signal provided at the output of the gate 1604 is also forwarded to one input of a plurality of gates 1944, 1952, 1960 and 1964 in the conference control circuit 136. This pulse is not effective at the gates 1944 and 1960 inasmuch as the other inputs to these gates are clamped at a more positive potential by the multivibrator 1958. Since the negative-going pulse from the gate 1604 occurs in the time slot assigned to the calling line circuit, the negative-going pulse provided at theoutput of the delay line 1950 renders an inverter 1962 conductive so that the gate 1964 is inhibited.

However, the gate 1952 is enabled by the simultaneously occuring negative-going pulses from the gate 1604 and the delay line 1950 so that a triggering signal is supplied to a monostable multivibrator 2040. This signal operates this multivibrator to its set condition to inhibit a gate 2022 and to partially enable a pair of gates 2018 and 2010. The other two inputs to the gate 2010 are enabled by the negative-going pulses in the same time slot provided at the outputs of the delay lines 1568 and 1950. The negative-going pulse provided at the output of the gate 2010 is forwarded through an "OR" gate 2004 to render an inverter 2002 momentarily conductive. This inhibits the gate 1444 so that the terminating line store 128 is cleared of all information stored in the calling time position and the pulse in the calling time slot is cleared from the delay line 1568. The latter removes the busy tone applied to the calling circuit. Thus, the exchange is conditioned to receive the next dialed designation representing a circuit to be connected to the conference circuit.

The negative-going pulse at the output of the gate 1952 is also forwarded through the "OR" gate 1938 to render the inverter 1936 momentarily conductive in the slot assigned to the calling circuit. The inverter 1936 inhibits the input gate 1366 to the dial tone delay line 1368 so that the pulse stored in the time slot of the calling line in this delay line is removed. This permits the half-adder 1370 to again return dial tone to the calling circuit to advise the subscriber that the dialed information representing the busy called line has been removed from the exchange and that the dialing of the next designation can be initiated.

The subscriber then dials the three digit designation of the next called line to be connected to the conference circuit and the flip-flop 1520 again performs an "on-hook" and "off-hook" and idle-busy test on the called line circuit. As set forth above, the flip-flop 1520 remains in its reset condition if the line is both idle and "on-hook." When a negative-going pulse in the calling time slot appears at the output of the timing delay line 1526, this negative-going pulse is forwarded through the idle gate 1528. The gate 1532 is inhibited in the calling time slot by the inverter 1962 so that the calling line time slot is not stored in the delay line 1548. However, this negative-going pulse is applied to the gate 2008 which is enabled in the calling time slot. The output of the gate 2008 is again forwarded through the "OR" gate 2004 to the inverter 2002 so that the gate 1444 is inhibited to clear the digit counter including the delay lines 1430 and 1440 and to clear the dialed designation from the calling time slot in the terminating line store 128. It should be noted, however, that although the gate 1444 inhibits the gates 713 to clear the called line designation from the delay lines 714 in the calling time position, the previously dialed designation remains stored in the selected pattern of set and reset conditions of the flip-flops 717. This flip-flop has not been reset because the gate 1532 which controls the gates 1534 and 1536 is inhibited by the inverter 1962.

The trailing edge of the negative-going pulse provided at the output of the gate 2008 also sets a flip-flop 1932 so that a negative potential is forwarded through a gate 1928 to one input of a gate 1924 at the output of the delay line 1920 in which are stored the four idle time slots previously allocated to the conference connection. The enabling of the gate 1924 permits the next occurring time slot in the delay line 1920 to be applied to the input of an inverter 1922 as a negative-going signal. This renders the inverter 1922 momentarily conductive to inhibit the gate 1918 so that this first selected one of the four circulating time slots is now erased from the delay line 1920. The negative-going pulse at the output of the delay line 1924 is also forwarded through an "AND" gate 1926, an "OR" gate 2020, and an "AND" gate 2022 to be applied to the input of an individual time slot storing delay line 2024. The output of this delay line is returned to its input through the gates 2020 and 2022 so that the time slot read out of the delay line 1920 is now circulated in the delay line 2024.

In order to store the designation of the called conference party in the terminating line store 128 in the time position read out of the delay line 1920, the negative-going pulse at the output of the gate 1926 is forwarded to one of the inputs of each of the gates 712. The other inputs to these gates are connected to the outputs of the flip-flops 717. The outputs of the gates 712 are connected to the "OR" gates 711. Thus, the previously dialed designation of the called party to be added to the conference connection is now stored and circulated in the delay lines 714 in one of the time positions previously allocated to the conference connection and stored in the delay line 1920. The negative-going pulse at the output of the gate 1926 is also forwarded through the "OR" gate 1412 to store a negative-going pulse in the delay lines 1430 and 1440 in the first used one of the four time slots assigned to the called parties in the conference connection.

The negative-going pulse at the output of the gate 1926 is also forwarded through the gates 1534, 1544 and 1546 to be stored in the idle time slot delay line 1548. The storage of a pulse in this used one of the four time slots allotted to the called parties inhibits the gate 1418 so that the flip-flops 717 cannot be set by the delay lines 714 and also provides operating signals to the gates 805 so that the identity stored in the delay lines 714 can be applied to the terminating line and trunk matrix 130 to pulse the called circuit in the time slot previously read out of the delay line 1920. In addition, the negative signal from the output of the gate 1534 is forwarded through the gates 1522 and 1508 to store the first one of the four called party time slots in the ring tone delay line 1524.

The trailing edge of the negative-going pulse at the output of the gate 1534 is effective through the gate 1536 to reset the plurality of flip-flops 717 and 1420 so that the terminating line store 128 is conditioned to perform further idle-busy and "on-hook" and "off-hook" checks. The trailing edge of the negative-going pulse at the output of the gate 1924 is also applied to the flip-flop 1932 to reset this flip-flop so that the enabling potential is removed from the gate 1924. This prevents the readout of the remaining three time slots stored in the delay line 1920 at this time.

The calling party is now connected to the line speech highway 110 and the line data highway 112 in the calling time slot, and the first called line circuit is connected to the line data highway 112 and the speech highway 110 in the first used one of the time slots allotted to the conference circuit. At the end of the first following time frame delay, the delay line 1524 triggers the ring tone audio gate 232 through the gate 1540 in the first called time slot so that the first called circuit is provided with ring tone from the generator 234. The negative-going pulse at the output of the line 1524 is also applied to the "AND" gate 1552. The remaining inputs of the gate 1552 are enabled inasmuch as the called circuit connected to the line data highway 112 in the first used called time slot is in an "on-hook" condition. Thus, the delay line 1558 stores the called line time slot pulse and, after a one time frame delay, applies it to the ring-back tone audio gate 236. This connects the ring-back tone generator 238 to the speech highway 110 in the first called time slot. However, the calling circuit is not connected to the speech highway 110 in this position and does not receive the ring-back tone. It should also be noted that the delay line 1524 inhibits the calling line matrix 124 and the delay line 1558 inhibits the called line matrix 130 in the manner described above. The output of the inverter 1538, which is pulsed by the ring tone delay line 1524, is not only effective to inhibit the calling line matrix 124, but also to inhibit the gate 1118 so that the counter including the storage units 1200–1206 does not count the time slot pulses appearing on the line data bus 112 in the time position assigned to the "on-hook" first called line to provide a spurious end-of-call indication.

As noted above, the time pulses circulating in the delay lines 1524 and 1558 provides a means for applying ring tone to the first called circuit in the first assigned called line time slot. However, it is also necessary to supply ring-back tone in the calling time slot to the calling circuit to advise the subscriber requesting the conference connection that the called subscriber is being rung. Accordingly, the negative-going pulse provided at the output of the gate 1926 when the first called time slot is read out to the delay line 2024 sets a flip-flop 2014 so that one input to a gate 2006 is provided with an enabling potential. The other input to the gate 2006 is connected to the output of the delay line 1950 in which is stored the calling time slot. Thus, the gate 2006 provides a negative-going pulse in the calling time slot which is forwarded through the "OR" gate 1508 to the delay line 1524. The trailing edge of the negative-going pulse at the output of the gate 2006 resets the flip-flop 2014 to its normal condition. During the first time frame following the transfer of the first called time slot in the delay line 1920 to the delay line 2024, the calling time slot passes through the delay line 1524.

When the first called time slot is transferred to the delay line 2024, the trailing edge of the negative-going pulse at the output of the gate 2022 operates a flip-flop 2016 to its set condition so that one input of a gate 2012 is enabled. The other input of this gate is connected to the output of the delay line 1950 in which is stored the calling time slot. Thus, the gate 2012 provides a negative-going pulse in the calling time slot through the gates 1560 and 1554 to one input of the gate 1552. This enabling for the gate 1552 in the calling time slot replaces that normally provided at the right hand input of the gate 1560 from the line data highway 112 when the called circuit is "on-hook" and in the same time slot as the calling line.

When the calling time slot reaches the end of the delay line 1524 at the end of the first time frame, the calling matrix 124 is inhibited, and the ring tone generator 234 is connected to the speech highway 110 in the calling time position. However, no communication circuits are connected to the speech highway 110 in the calling time slot, and the ring tone is not applied to any circuit. The enabling provided by the flip-flop 2016 and the gate 2012 permits this calling time slot to be forwarded through the gate 1552 to be stored in the delay line 1558. At the end of the second or next time frame, the ring-back tone gate 236 is connected to the speech highway 110 in the calling time position so that the subscriber at the line circuit requesting the conference connection is provided with an audible indication that the first called line is being rung. Thus, the delay lines 1524 and 1558 continuously circulate not only the calling time slot, but also the time slot assigned to the first called circuit. In view of the fact that the calling and called circuits are connected in different time slots, the ring tone is applied to only the first called circuit in the time slot assigned to the first called circuit, and the ring-back tone is applied to the calling circuit in the calling time slot originally assigned to the calling line. Therefore, ring tone and ring-back tone are applied to the calling and called circuits on alternate time frames.

If the first called party does not answer the call even though supplied with ring tone under the control of the delay line 1524 in the assigned time slot, the circuit requesting the conference connection can terminate the application of ring tone and ring-back tone and restore the first used time slot to the delay line 1920 for use in establishing a connection to another called circuit. As described above, the digit counters 1430 and 1440 as well as the delay lines 714 in the terminating line store 128 are cleared in the calling time slot by the inverter 2002 when the called line is found to be idle and "on-hook." Thus, when the calling subscriber dials "2," this digit is transferred from the digit detector and time slot allotter 120 to the translating means in the trunk finder 126 so that a negative-going pulse appears at the output of the gate 1642. This negative-going pulse again pulses the gate 1604 so that the inverter 1602 clears the delay lines 1430 and 1440. This negative-going pulse is also forwarded to the conference control circuit 136 so that the monostable multivibrator 2040 is operated to its set condition. In this condition, the "AND" gate 2022 is inhibited so that all time slots are erased from the delay line 2024. However, the multivibrator 2040 also enables a gate 2018 so that the time slot stored in the delay line 2024 is transferred through the gates 1916 and 1918 to the delay line 1920 prior to its erasure at the inhibited gate 2022. Thus, the time slot read out of the delay line 1920 for use in ringing the first called circuit has now been returned to the delay line 1920 and is available for subsequent use.

The negative-going pulse at the output of the gate 2018 is also forwarded through the "OR" gate 2004 to render the inverter 2002 momentarily conductive in the called time slot. This inhibits the gate 1444 in the called time slot so that the delay lines 1430 and 1440 are cleared and so that the delay lines 714 in the terminating line store 128 are cleared to prevent the terminating line matrix 130 from connecting the called circuit to the line data highway 112 and the speech highway 110 in the called time slot. The inhibit applied to the gate 1444 also clears the called time slot from the line free delay line 1548 and the delay lines 1524 and 1558 to erase these delay lines in the called time slot. The trailing edge of the negative-going pulse at the output of the gate 2018 is forwarded through an "OR" gate 2017 to reset the flip-flop 2016. This removes the enabling potential from the one input to the gate 2012 to prevent additional pulses in the calling time slot from being stored in the delay lines 1524 and 1558.

Further, the multivibrator 2040 partially enables the gate 2010 so that this gate delivers a negative-going pulse under the control of the delay line 1950 in the calling time slot in the manner described above. This operates the inverter 2002 so that the delay lines 714, 1430, 1440, 1548, 1524 and 1558 in the terminating line store 128 are cleared in the calling time slot. In addition, the negative-going pulse provided at the output of the gate 1952 is again forwarded through the gate 1938 and the inverter 1936 to clear the busy tone delay line 1368 in the manner described above. This permits the audio gate 228 to return dial tone in the calling time slot to the calling subscriber requesting the conference connection. Since the terminating line store 128 and the conference control circuit 136 are now restored to the operating condition provided immediately before the dialing of the designation of the called party that did not answer, the subscriber at the calling circuit can now dial another number identifying the next called party to be connected to the conference circuit.

The circuit 136 now extends the connection in the calling time slot and then transfers the called circuit to the first called slot in the manner described above. If the called station answers, it is necessary to remove the pulses in the calling time slot and the first allotted called time slot now circulating in the delay line 1524 and 1558 so as to remove the ring-back and ring tones. When the first called party goes "off-hook," the negative-going time slot signals in the called time slot disappear from the line data highway 112, and the enabling potential for the gate 1552 which is forwarded through the gates 1554 and 1560 is removed. Thus, the circulation of the first called time slot is removed from the delay lines 1524 and 1558.

To remove the calling time slot from the delay lines 1524 and 1558, a half-adder 2028 in the conference control circuit 136 continuously compares clock pulses on one input against negative-going pulses on the other input from the line data bus 112 in all time positions. Thus, the output of the half-adder 2028 remains at a more positive potential in all of the time slots in which the lines assigned to particular time slots are in "on-hook" conditions. When the called line goes "off-hook," the negative-going time slot pulses in the first called time slot disappear from the line data highway 112, and the output of the half-adder 2028 provides a negative-going pulse in the called time slot. This negative-going pulse is applied to one input of an "AND" gate 2026, the other input of which is connected to the output of the delay line 2024 which supplies negative-going pulses in the time position assigned to the first called circuit. The output of the gate 2026 forwards a negative-going pulse through the "OR" gate 2017 to the reset lead of the flip-flop 2016. The trailing edge of this pulse operates the flip-flop 2016 to its reset condition so that the enabling potential for the gate 2012 is removed. Thus, the negative-going pulse in the delay line 1950 in the calling time slot is no longer forwarded through the gates 1560 and 1554 to the "AND" gate 1552. Therefore, the circulation of the calling time slot in the delay lines 1524 and 1558 is terminated. This completes the removal of the calling time slot and the first called time slot from these delay lines and terminates the application of ring-back and ring tone.

The negative-going pulse provided at the output of the gate 2026 is also used to erase this first called time slot from the delay line 2024 and to cause the storage of this time slot in the permanent time slot store delay line 2036. This delay line now stores the calling time slot which was transferred thereto in the manner described above. The negative-going pulse at the output of the gate 2026 is applied to an inverter 2030 so that the gate 2022 is inhibited in the first called time slot. The negative-going pulse is also applied through the "OR" gate 2032 and the "AND" gate 2034 to be stored or circulated in the delay line 2036 until the established connection is released. Thus, the delay line 2036 now stores the calling time slot and the first allotted called time slot on which the first called station has answered.

The calling subscriber now dials the digital designations identifying the remaining called parties that are to be connected to the conference circuit, and these dialed digits are processed by the trunk finder 126, the terminating line store 128, the terminating line and trunk matrix 130, and the conference control circuit 136 in the manner described above so that each of the called parties is connected to the speech highway 110 and the line data highway 112 in different ones of the three remaining time slots stored in the delay line 1920. As each of these time slots is allocated for use, it is transferred to and temporarily stored in the delay line 2034 during ringing, and it is then transferred to the delay line 2036 in response to the receipt of answering supervisory signals from the called line. At the conclusion of all of the dialing operations, the calling time slot is continuously circulated in the delay lines 1856, 1950, and 2036 and the called time slots are continuously circulated in the delay lines 1856 and 2036.

As described above, the calling time slot and each of the four idle time slots allotted to the conference circuit are stored in the delay line 1856 and are continuously circulated in this delay line under the control of the gate 1850 that is driven by the clock pulse source. When the calling time slot pulse is first applied to the delay line 1856, it is effective through the gate 1858 to set the monostable multivibrator 1860 which has a delay interval slightly greater than one time frame. At the end of the first time frame during which the four additional called time slots are stored in the delay line 1856, the multivibrator 1860 resets and operates a flip-flop 1862 to its set condition. In this condition, the gate 1858 is inhibited, and an enabling potential is forwarded through a gate 1816 to one input of each of five-gates 1810–1814, the other input of the gate 1816 being returned to a negative potential in a supervisory circuit. The gates 1810–1814 are controlled by a ring counter comprising a plurality of flip-flops 1840–1844 that are operated step-by-step through a complete operating cycle during each time frame by the five time slot pulses stored in the delay line 1856. This counter controls the gates 1810–1814 to render the audio gates 1800–1804 effective in sequence in time positions corresponding to those stored in the delay line 1856. To accomplish this, the output of the gate 1850 is connected to one input of each of the gates 1810–1814, and another input to each of these gates is connected to one of the flip-flops 1840–1844.

Assuming that the flip-flops 1840–1844 are in a condition shown in FIG. 18 in which the flip-flop 1840 is set and the flip-flops 1841–1844 are reset, the gates 1810 and 1820 are partially enabled and the gates 1811–1814 and 1821–1824 are inhibited. The first negative-going pulse at the output of the delay line 1856 is coupled through the gates 1850 and 1810 to open the audio gate 1800 in one of the time positions so that the audio modulation appearing on the speech highway 110 in this time position is transferred through the open gate 1800 to the connected filter or storage circuit 1805 from wihch it is transferred over the common connection to the filter or storage circuits 1806–1809. Similarly, the opening of the gate 1800 permits any audio signals stored in any of the units 1806–1809 to be transferred through the network 1805 and the open audio gate 1800 to the speech highway 110. Thus, the calling or called circuit connected to the highway 110 in the time position in which the audio gate 1800 is opened is effective to transmit to or receive information from all of the networks 1805–1809.

The first negative-going pulse provided at the output of the delay line 1856 is also applied to all of the gates 1820–1824. However, only the gate 1820 is partially enabled to provide a negative-going pulse whose trailing edge is effective to reset the flip-flop 1840 and to set the flip-flop 1841. An enabling potential is now applied to the gates 1821 and 1811, and the remaining gates are inhibited. When the next negative-going pulse representing the next calling or called time slot is supplied at the output of the delay line 1856, the gate 1811 is fully enabled to open the audio gate 1801. Thus, any audio information stored in the networks 1805–1809 is transferred to the speech highway 110 through the gate 1801 in this time slot or information received from the highway 110 through the gate 1801 in this time slot is transferred to the networks 1805–1809. The trailing edge of the negative-going pulse in this second time slot which appears at the output of the gate 1821 resets the flip-flop 1841 and sets the flip-flop 1842.

In this manner, the five time slot pulses stored in the delay line 1856 are effective during each time frame to advance the flip-flops 1840–1844 through a single cycle of operation so that each of the filter or storage networks 1805–1809 is connected to the speech highway 110 through the related one of the gates 1800–1804 in the proper one of the five time slots. Since the five line circuits involved in the conference connection are also connected to the speech highway 110 by the calling line matrix 124 and the terminating line matrix 130 in the same five time positions that are stored in the delay line 1856, all five calling and called circuits can communicate over the single speech highway 110 even though different time slots are assigned thereto. This common communication circuit remains for so long as the five time slots are circulated in the delay line 1856.

As each of the calling or called parties goes "on-hook" at the end of the call, the half-adder 1211 in the storage unit 1206 in the digit detector and time slot allotter 120 produces a negative-going signal in the time slot in which the "on-hook" condition is detected. This negative-going pulse is again effective through the gate 1334, the inverter 1336, and the gates 1338 and 1332 to erase the time slot from the busy time slot delay line 1340. This negative-going pulse is also forwarded to an inverter 2038 in the conference control circuit 136 so that the gate 2034 is inhibited in the time slot in which the "on-hook" condition is detected. This erases this time slot from the delay line 2036. Accordingly, as each of the five called circuits that is involved in the conference connection returns to an "on-hook" condition, the corresponding time slot is erased from the busy time slot delay line 1340 and the permanent store delay line 2036 in the conference control circuit 136.

To provide means for resetting the conference connector 134 and the conference control circuit 136 to a normal condition when all of the calling and called circuits have been restored to a normal condition, the delay line 2036 controls the operation of the reset flip-flop 2042. More specifically, when the first negative-going pulse appears at the output of the delay line 2036, this negative-going pulse is effective through the "OR" gate 2052 and the holdover circuit 2050 to operate the monostable multivibrator 2048 to its set condition in which the inverter 2044 is maintained in a nonconductive condition. The time delay provided by the multivibrator 2048 and the holdover circuit 2050 is such that the mutlivibrator 2048 remains in a set condition for so long as any pulses are circulating in the delay line 2036. However, when all of the time slot pulses are erased from this delay line at the conclusion of the conference connection, the multivibrator 2048 restores to a normal condition and renders the inverter 2044 conductive. This forwards a positive-going pulse to the flip-flop 2042 to operate this flip-flop to its set condition so that the inverter 2064 is rendered conductive. This applies a more positive or ground potential to the resetting inputs of all of the flip-flops in the conference connector 134 and the conference control circuit 136 so that these flip-flops are restored to their normal condition.

In addition, the more positive signal from the inverter 2064 inhibits the gate 1948 so that the delay line 1950 is cleared and inhibits the gate 1854 so that the delay line 1856 is cleared. This ground potential also inhibits the gate 1918 so that any unused time slots remaining stored in the delay line 1920 are cleared. The clearing of the delay line 1950 permits the monostable multivibrator 1958 to restore to its normal condition after its delay interval. The flip-flop 2042 is restored to its reset condition under the control of the components 2044, 2048, 2050, 2052 after a one hundred microsecond delay interval in the manner described above so that the clamping potential is removed from the plurality of flip-flops and gates. Thus, the private branch exchange is returned to a normal condition following the complete release of the conference connection.

If the conference connection is to be established from the attendant's position 132 by the operator, the calling station requesting the conference connection first dials "0" to obtain access to the operator's position. As described above, this results in the storage of the calling time slot in the delay line 2114. When the call is answered by the operator, the time slot is transferred from the delay line 2114 to the delay line 2216 and circulated therein during the establishment of the call. When the operator is advised that a conference connection is desired, the operator dials the access digit "2" which results in the storage of the time slot assigned to the operator, which is the calling time slot, in the delay lines 1950 and 1856.

The negative-going pulse at the output of the delay line 2216 in the calling time slot is forwarded through the gate 2218 to one input of a gate 2072 in the conference control circuit 136, and the negative-going pulse at the output of the gate 2218 is also forwarded through an "OR" gate 2104 to one input of a gate 2062. The other inputs of the two gates 2062 and 2072 are connected to the output of the gate 1850. When the calling time slot stored in the delay line 1856, which is the same as that stored in the delay line 2216, appears as a negative-going pulse at the inputs to the gates 2062 and 2072, these gates are enabled so that a pair of holdover circuits 2056 and 2070 operate a pair of monostable multivibrators 2054 and 2068 to their set conditions. The multivibrator 2068 inhibits a gate 2066, and the multivibrator 2054 enables a gate 2058. The other input to the gate 2058 is connected to the output of the delay line 1950 in which the calling time slot is also stored. Thus, an inverter 2060 is rendered momentarily conductive in the calling time slot to supply an inhibit condition to the gates 1100 and 1102 so that dialed digits from the calling circuit cannot control the digit detector and time slot allotter 120. However, the operator has access to the digit detecting facilities in the circuit 120 through the operator's line circuit 2260 and the operator's data bus 2261 that is connected to one input of the "OR" gate 1104.

The operator can now perform all of the functions performed by the calling circuit in the manner described above so that the conference connection is established in whole or in part. Whenever the operator retires from the connection, the erasure of the calling time slot from the delay line 2216 removes the enabling condition from the gates 2062 and 2072 so that the monostable multivibrators 2064 and 2068 restore to their normal conditions. In doing so, the inhibit pulses provided by the inverter 2068 are removed, and the original calling circuit regains the control over the conference connection. Since the operator establishes the conference connection using the time slot assigned to the original calling circuit, the original calling circuit is placed in control of the connection in its original calling time slot when the attendant's position 132 is removed from the connection.

It is also possible for the attendant's position 132 to be used in controlling the extension of a conference circuit that has been at least partially completed under the control of the information dialed from the calling circuit. At any point in the establishment of the conference connection at which the operator's assistance is required to call the next party, "0" is dialed at the calling station so that the gate 1640 provides a negative-going pulse. Since this pulse coincides with the negative-going pulse provided at the output of the delay line 1950, a gate 1630 is enabled to forward a negative-going pulse to the flip-flop 1930 so that this flip-flop is operated to its set condition. When the flip-flop 1930 is set, a negative potential is forwarded to an "AND" gate 1927 and through the "OR" gate 1928 to the "AND" gate 1924. The setting of the flip-flop 1930 also inhibits the gate 1926 to prevent any unused time slots stored in the delay line 1920 from being applied to and stored in the delay line 2024. When the gates 1924 and 1927 are enabled, the next idle time slot occurring at the output of the delay line 1920 is returned through the inverter 1922 to erase this slot from the delay line 1920 and is forwarded through the gates 1927, 2108, 2110 and 2112 to be stored in the delay line 2114. The trailing edge of this pulse restores the flip-flop 1930 to its reset condition. Thus, the delay line 2114, which comprises the queue store in the attendant's position 132, now stores one of the idle time slots that was allocated for use in establishing the conference circuit.

The called party time slot stored in the delay line 2114 is forwarded through the "OR" gate 2104 during each time frame and is applied to one input of the gate 2062. When this same called time slot is applied to the other input of the gate 2062 from the delay line 1856, the trailing edge of the negative-going pulse provided at the output of the gate 2062 operates the holder circuit 2056 so that the monostable multivibrator 2054 is set to enable one input of the gate 2058. When the next pulse appears at the output of the delay line 1950 in the calling line time slot, the negative-going pulse is provided at the output of the gate 2058 operates the inverter 2060 to inhibit the gates 1100 and 1102 for the reasons described above. In addition, since the monostable multivibrator 2068 has not been set, the negative-going pulse provided at the output of the gate 2058 is forwarded through the gate 2066 to the audio gate 236 that is connected to the ring-back tone generator 238. Ring-back tone is now returned to the calling circuit in the time slot allotted thereto to advise the calling subscriber that the operator is being rung.

When the call is answered by the operator in the manner described above, the time slot that is to be assigned to one of the called parties now stored in the delay line 2114 is transferred to the delay line 2216 so that at the end of a one time frame delay, a negative-going pulse in this time position is forwarded through the gates 2218 and 2072 and the holdover circuit 2070 to set the multivibrator 2068. This inhibits the gate 2066 to terminate the application of ring-back tone in the calling time slot to the calling circuit. The operator then establishes a connection to the desired called party in the manner described above. Upon completion of this operation, the operator retires from the connection by restoring the answer key to its normal position in which the contacts 2234 are opened. When the contacts 2234 are opened, a negative potential is supplied to one input of a gate 2220. Another input to this gate is connected to the output of the delay line 1856, and the remaining input to the gate 2220 is connected to the output of the delay line 2216.

When the time slot stored in the delay line 2216 which has been assigned to the party called by the operator is applied to the gate 2220, a negative-going pulse is forwarded through the gates 2220, 2020, and 2022 to store the time slot assigned to this called party in the delay line 2024. This time slot is transferred from the delay line 2024 to the delay line 2036 in the manner described above when the called party answers. Further, this pulse is erased from the delay line 2216 in the manner set forth above in the description of the operation of the attendant's position 132. The restoration of the attendant's position 132 to its normal position permits the subscriber at the calling station to continue the extension of the conference circuit in the manner described above if any additional parties remain to be called.

In certain instances, it may be desirable for the operator to establish a conference connection when the operator is placed in the connection as the result of a recall condition. When a recall condition is answered by the operator, the subscriber at the recalling station in the exchange is advised to return his circuit to "on-hook" condition, and the operator then dials the access digit "2" followed by the directory number of the recalling station. The operator can then establish the conference connection in the manner described above. When the operator retires from the connection, the time slot used by the operator in establishing the conference circuit is transferred back to the recalling party.

Although the present invention has been described with reference to a single embodiment thereof, it will be understood that numerous other modifications and embodiments can be devised by those skilled in the art that will fall within the spirit and scope of the principles of this invention.

What is claimed and desired to be secured by Letters Patent of the United States is:

1. In an automatic communication system, a plurality of communication circuits each identified by an individual designation, a common communication channel, conference means for connecting more than two of said circuits for communication over said channel, a plurality of signal circulating means for controlling the connection of said circuits to said channel, and means in said conference means for storing the designation of each circuit involved in a conference connection in said signal circulating means in a different one of a plurality of distinct time positions in a repetitive time frame.

2. In an automatic communication system, a plurality of communication circuits, a common communication channel, control means for extending paths from a plurality of said circuits over said channel in different ones of a plurality of distinct time positions in a repetitive time frame, and means for connecting said paths for communication including both a signal transfer circuit and delay means for circulating signals in said different ones of said time positions to connect said signal transfer circuit to all of said paths.

3. In an automatic communication system, a common communication channel, a plurality of communication circuits connected to said channel, a plurality of audio gate means each having one terminal thereof connected to said channel, means including storage means interconnecting the other terminal of each gate means to each other, a counter operable to successive settings for enabling said gate means in sequence, a delay means for circulating signals in a plurality of different time positions in a repetitive time frame, and means connecting said delay means to said counter and said gate means to operate said counter and to open said gates in succession and in the time positions represented by the signals stored in said delay means.

4. An automatic communication system comprising a calling communication circuit, a plurality of called communication circuits, a common communication channel, first control means connecting said calling circuit to said channel in one of a plurality of distinct time positions in a repetitive time frame, storing means for circulating signals representing different time positions in said repetitive time frame, means responsive to directive signals received from said calling circuit for successively extending communication paths to said called circuits over said channel in said one time position, and means including said storage means for transferring the time position of each called communication circuit after a path has been extended thereto from said one time position to different ones of the time positions represented by signals circulating in said storing means.

5. An automatic communication system comprising a calling communication circuit, a called communication circuit, a common communication channel, first control means connecting said calling circuit to said channel in one of a plurality of distinct time positions in a repetitive time frame, storing means for circulating signals representing different time positions in said repetitive time frame, means responsive to directive signals received from said calling circuit in said one time position for extending a communication path to said called circuit in said one time position, and means including said storing means for transferring the time position of said called communication circuit after said path has been extended thereto from said one time position to one of the time positions represented by the signals circulating in said storing means.

6. In an automatic communication system; a plurality of communication circuits; a common communication channel; and conference means for connecting a calling one of said circuits to more than one called circuit, said conference means including first delay means for circulating a signal in the one of a plurality of time positions in a repetitive time frame identifying the calling circuit and a second delay means circulating signals in the plurality of time positions identifying the called circuits.

7. The communication system set forth in claim 6 including control means controlled by said first delay means for preventing the use of said conference means by other calling circuits until the signal stored in said first delay means is erased.

8. In an automatic communciation system, a plurality of communication circuits, a common communication channel, control means operable to extend a communication path from a calling one of said circuits and to determine the idle or busy condition of a called one of said circuits, said control means including means for temporarily allotting for the duration of a communication separate idle ones of a plurality of distinct time positions in a repetitive time frame to said calling and called ones of said circuits, respectively, and extending said path and determining said idle or busy condition of the called circuit in that one of said plurality of distinct time positions allotted to said calling one of said circuits, and means operable only if the called circuit has been determined to be idle for applying a ringing signal to said called circuit in that one of said plurality of time positions allotted to said called one of said circuits.

9. In an automatic communication system, at least two communication circuits adapted to be placed in communication with each other, a signal transfer circuit for transferring signals between the two communication circuits, first gate means for connecting one of said communication circuits to said signal transfer circuit in a first time position in a repetitive time frame, second gate means for connecting the other of said communication circuits to said signal transfer circuit in a second of the time positions in said time frame, and signal circulating means connected to said first and second gate means and circulating signals in said first and second time positions for operating said first and second gate means.

10. In an automatic communciation system, a plurality of communication circuits, first control means for connecting a calling one of said circuits and a plurality of called ones of said circuits to a common communication path in a plurality of different time positions in a repetitive time frame, signal circulating means for storing signals in said different time positions, second control means for transferring a signal in one of said time positions from said signal circulating means to said control means as each called circuit is connected to said common communication path, and third control means for returning said signals in said time positions to said signal circulating means for use in other connections if attempted connections to said called circuits cannot be completed.

11. In an automatic communication system, a plurality of communciation circuits, first signal circulating means for circulating signals representing idle time positions in a repetitive time frame, first control means for receiving signals from said first signal circulating means to connect different ones of said circuits to a common communication channel, second circulating means for circulating signals in said different time positions in said time frame, and second control means for returning signals in one of said time positions from said first control means to said first signal circulating means when an attempted connection to said path cannot be completed and for transferring said signal to said second signal circulating means when an attempted connection to said path is completed.

12. In an automatic communciation system, a plurality of communication circuits, a common communication channel, conference means for connecting a group of said circuits to said channel in different time positions in a repetitive time frame for common communication over said channel, signal circulating means for circulating a signal in each of said different time positions, means operable as each of the circuits in said group is disconnected from said channel for removing the signal in the corresponding time position from said signal circulating means, reset means for resetting said conference means to a normal condition, and means controlled by the signals circulating in said signal circulating means for operating said reset means.

13. In an automatic communication system, a communication circuit, a source of signals representing idle time positions in a repetitive time frame, storage means for circulating signals in said time positions, and control means responsive to signals received from said communication circuit for rendering said source effective to store a selected number of signals from said source in said storage means.

14. The system set forth in claim 13 in which said signals received from said communication circuit represent a digit, and including detecting means controlled by the signals received from said communication circuit for determining the value of the digit represented thereby, and means controlled by said detecting means for placing said control means in operation when the received signals represent a digit having a predetermined value.

15. An automatic communication system comprising a plurality of communication circuits, conference circuit means for connecting more than two of said communication circuits for common communication, said conference circuit including means controlled by signals representing more than two different time positions in a repetitive time frame, a source of signals representing the idle or busy condition of the different time positions in said repetitive time frame, and means controlled by said signal source for controlling the effectiveness of said conference circuit means in accordance with the presence or absence of more than two idle time positions.

16. In an automatic communication system, a calling communication circuit, a plurality of called communication circuits, a common communication channel, first control means for connecting said calling circuit to said channel in one of a plurality of distinct time positions in a repetitive time frame, storage means for storing signals representing idle time positions, a source of signals representing idle time positions, means for supplying signals from said source to said storage means in accordance with the number of called circuits that are to be connected to said calling circuit, and second control means controlled by said storage means for connecting said called circuits to said calling circuit over said channel in the time positions stored in said storage means.

17. The communication system set forth in claim 16 including means for arresting operation of said second control means when signals representing an insufficient number of idle time positions are stored in said storage means.

18. In an automatic communciation system, a plurality of communication circuits, conference means controllable from a calling one of said circuits in one time position in a repetitive time frame for connecting a plurality of called ones of said circuits to a common communication channel in other time positions in said time frame, an operator position, and means controllable from said calling circuit for transferring control over said conference means in said one time position to said operator position.

19. The system set forth in claim 18 including means at said operator position for returning control over said conference means to said calling circuit in said one time position.

20. In an automatic communication system, a calling communication circuit, a called communication circuit, a common communication channel over which said calling and called circuits can be placed in communication, means for temporarily allotting for the duration of a communication separate idle ones of a plurality of distinct time positions in a repetitive time frame to a calling circuit and a called circuit, respectively, delay means for circulating signals in the time position allotted to said calling circuit identifying said calling circuit and in the time position allotted to said called circuit identifying said called circuit, and signaling means controlled by said delay means for applying a ringing signal to said called circuit in the time position allotted to said called circuit and a ring-back signal to said calling circuit in the time positton allotted to said calling circuit.

21. In an automatic communciation system, a plurality of communication circuits having individual designations, a common communication channel, first control means for extending a communication path over said channel between a pair of said circuits in one of a plurality of distinct time positions in a repetitive time frame, said first control means including delay line means for circulating the designation of at least one of said lines in one of said time positions, and second control means for removing said designation from said delay line means in said one time position and inserting said designation into said delay line means in another one of said distinct time positions.

22. In an automatic communication system, a plurality of communication circuits having individual designations, a common communication channel, first control means for extending a communication path over said channel between a pair of said circuits in one of a plurality of distinct time positions in a repetitive time frame, said first control means including delay line means for circulating the designation of at least one of said pair of circuits in a first one of said time positions, storage means controlled by said delay line means for storing said circulating designation, and second control means controlled by said storage means for inserting the designation stored in said storage means into said delay line means for circulation in a second time position.

23. The automatic communication system set forth in claim 22 in which said second control means includes a delay line for circulating a signal in said second time position.

References Cited in the file of this patent

UNITED STATES PATENTS

| | | |
|---|---|---|
| 1,554,999 | Gardner | Sept. 29, 1925 |
| 1,626,034 | Gardner | Apr. 26, 1927 |
| 2,892,035 | Trousdale | June 23, 1959 |
| 2,894,070 | Dayonnet et al. | July 7, 1959 |
| 2,917,583 | Burton et al. | Dec. 15, 1959 |
| 2,968,697 | Rager | Jan. 17, 1961 |